US012553214B2

(12) United States Patent
Honda et al.

(10) Patent No.: US 12,553,214 B2
(45) Date of Patent: Feb. 17, 2026

(54) WORKING MACHINE

(71) Applicant: KUBOTA CORPORATION, Osaka (JP)

(72) Inventors: Keigo Honda, Osaka (JP); Keigo Sato, Osaka (JP); Daiki Ryu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/959,898

(22) Filed: Nov. 26, 2024

(65) Prior Publication Data
US 2025/0179767 A1 Jun. 5, 2025

(30) Foreign Application Priority Data

| Dec. 1, 2023 | (JP) | 2023-203938 |
| Dec. 1, 2023 | (JP) | 2023-203939 |
| Dec. 1, 2023 | (JP) | 2023-203943 |
| Jun. 27, 2024 | (JP) | 2024-103835 |
| Jun. 27, 2024 | (JP) | 2024-103836 |

(51) Int. Cl.
*E02F 9/16* (2006.01)
*B60R 13/08* (2006.01)
(Continued)

(52) U.S. Cl.
CPC .......... *E02F 9/166* (2013.01); *B60R 13/0823* (2013.01); *B60R 13/083* (2013.01);
(Continued)

(58) Field of Classification Search
CPC ..... E02F 9/16; E02F 9/166; E02F 9/08; E02F 9/0858; E02F 9/0866; E02F 9/0891;
(Continued)

(56) References Cited

U.S. PATENT DOCUMENTS 4,225,176 A * 9/1980 Moser ............... E02F 9/24
  237/12.3 R
5,042,602 A * 8/1991 Nakatani ............... B60K 11/04
  165/41

(Continued)

FOREIGN PATENT DOCUMENTS

CN 113815730 A * 12/2021 ............ B62D 25/06
JP H069934 U * 2/1994
(Continued)

OTHER PUBLICATIONS

Official Communication issued in European Patent Office (EPO) Patent Application No. 24216123.0, dated Apr. 3, 2025.
(Continued)

*Primary Examiner* — Keith J Frisby
(74) *Attorney, Agent, or Firm* — GREENBLUM & BERNSTEIN, P.L.C.

(57) ABSTRACT

Example embodiments of the present invention include a prime mover, an operator's seat provided at a distance from the prime mover, and a partition wall provided between the prime mover and the operator's seat, wherein the partition wall includes a pair of metal plates facing each other with a space therebetween and arranged in a direction from the prime mover toward the operator's seat.

8 Claims, 35 Drawing Sheets

(51) Int. Cl.
   *B62D 33/06* (2006.01)
   *E02F 3/32* (2006.01)
   *E02F 9/08* (2006.01)

(52) U.S. Cl.
   CPC ...... *B60R 13/0838* (2013.01); *B62D 33/0604* (2013.01); *E02F 3/325* (2013.01); *E02F 9/0833* (2013.01); *E02F 9/0858* (2013.01); *E02F 9/0866* (2013.01); *E02F 9/0891* (2013.01); *E02F 9/16* (2013.01); *E02F 9/163* (2013.01); *B60Y 2200/412* (2013.01)

(58) Field of Classification Search
   CPC ....... E02F 9/163; E02F 9/0833; E02F 9/0808; E02F 3/32; E02F 3/325; B62D 33/06; B62D 33/0604; B62D 33/0617; B60Y 2200/41; B60Y 2200/412; B60R 13/08; B60R 13/0815; B60R 13/0823; B60R 13/083; B60R 13/0838
   USPC ............... 180/89.1, 89.12; 296/39.3, 190.01, 296/190.08

See application file for complete search history.

(56) References Cited

U.S. PATENT DOCUMENTS

| | | |
|---|---|---|
| 2004/0212221 A1 | 10/2004 | Sato |
| 2011/0074182 A1 | 3/2011 | Kotani et al. |
| 2013/0001983 A1* | 1/2013 | Case ...................... B62D 25/10 296/190.01 |
| 2020/0190774 A1 | 6/2020 | Nishigori et al. |
| 2023/0323629 A1 | 10/2023 | Horii et al. |

FOREIGN PATENT DOCUMENTS

| | | | | |
|---|---|---|---|---|
| JP | H 8-333772 A | | 12/1996 | |
| JP | H11117351 A | * | 4/1999 | |
| JP | 2000-038743 A | | 2/2000 | |
| JP | 2011-074606 A | | 4/2011 | |
| JP | 2017002592 A | * | 1/2017 | |
| JP | 2019-116174 A | | 7/2019 | |
| JP | 2022-114944 A | | 8/2022 | |
| KR | 19980032908 U | * | 9/1998 | ........... B60R 13/083 |

OTHER PUBLICATIONS

Official Communication issued in European Patent Office (EPO) Patent Application No. 24216126.3, dated Apr. 3, 2025.
Co-pending U.S. Appl. No. 18/959,866, filed Nov. 26, 2024.

* cited by examiner

WORKING MACHINE

CROSS REFERENCE TO RELATED APPLICATIONS

This application claims the benefit of priority to Japanese Patent Application No. 2024-103835 filed on Jun. 27, 2024, to Japanese Patent Application No. 2023-203943 filed on Dec. 1, 2023, to Japanese Patent Application No. 2023-203938 filed on Dec. 1, 2023, to Japanese Patent Application No. 2023-203939 filed on Dec. 1, 2023, and to Japanese Patent Application No. 2024-103836 filed on Jun. 27, 2024. The entire contents of these applications are hereby incorporated herein by reference.

BACKGROUND OF THE INVENTION

1. Field of the Invention

The present invention relates to working machines each including a prime mover and an operator's seat where an operator sits.

2. Description of the Related Art

In the related art, there is known a working machine including a prime mover chamber in which a prime mover is accommodated, an operator's component that is located forward of the prime mover chamber, and a partition wall that is provided between the prime mover chamber and the operator's component (see, for example, Japanese Unexamined Patent Application Publication No. 2019-116174). By providing the partition wall between the prime mover chamber and an operator's seat, it is possible to block noise that leaks from the interior of the prime mover chamber toward the operator's seat, thereby improving the quietness in the operator's seat.

SUMMARY OF THE INVENTION

As described above, by providing a partition wall between a prime mover chamber and an operator's seat, it is possible to block noise that leaks from the interior of the prime mover chamber toward the operator's seat, thereby improving the quietness in the operator's seat. However, in recent years, there has been an increasing demand for improved comfort in operator's seats of working machines, and there has been a demand for further improvement in the quietness in such operator's seats.

Example embodiments of the present invention provide working machines each capable of further improving the quietness in an operator's seat.

A working machine according to an aspect of an example embodiment of the present invention includes a prime mover, an operator's seat provided at a distance from the prime mover, and a partition wall provided between the prime mover and the operator's seat, wherein the partition wall includes a pair of metal plates facing each other with a space therebetween and arranged in a direction from the prime mover toward the operator's seat.

The partition wall may include a sound-absorbing member provided between the pair of metal plates.

The sound-absorbing member may be provided between the pair of metal plates such that surfaces of the sound-absorbing member face surfaces of the pair of metal plates with a gap between the sound-absorbing member and at least one of the pair of metal plates.

The sound-absorbing member may be in tight contact with one of the pair of metal plates and is separated from the other of the pair of metal plates with the gap between the sound-absorbing member and the other of the pair of metal plates.

The sound-absorbing member may be in tight contact with the one of the pair of metal plates that is closer to the operator's seat than the other of the pair of metal plates and is separated from the other of the pair of metal plates with the gap between the sound-absorbing member and the other of the pair of metal plates.

The one of the pair of metal plates may be greater in plate thickness than the other of the pair of metal plates.

The partition wall may include an elastic seal member sandwiched between the pair of metal plates such that the seal member surrounds the sound-absorbing member provided between the pair of metal plates.

The seal member may be provided along an outer peripheral portion of at least one of the pair of metal plates.

The sound-absorbing member may be in tight contact with the pair of metal plates.

The sound-absorbing member may include a foamed resin.

The pair of metal plates may include a first metal plate and a second metal plate, the first metal plate being located closer to the operator's seat than the second metal plate, the second metal plate being located closer to the prime mover than the first metal plate. The partition wall may include an inspection port to allow access from an area where the operator's seat is present to an area where the prime mover is present, and a closure body configured to close the inspection port. The first metal plate may include a first opening included in the inspection port. The second metal plate may include a second opening included in the inspection port. The closure body may include a first closure plate made of metal to close the first opening such that the first closure plate is placed on a surface, facing the operator's seat, of a portion of the first metal plate that surrounds the first opening, and a second closure plate made of metal to close the second opening such that the second closure plate is placed on a surface, facing the operator's seat, of a portion of the second metal plate that surrounds the second opening.

The first opening may have a shape to allow the second closure plate to pass therethrough in a direction from the operator's seat toward the second metal plate.

The first closure plate may be screw-fastened to the first metal plate, and the second closure plate is screw-fastened to the second metal plate.

A seal member may be provided at at least one of an overlap portion where the first closure plate and the first metal plate overlap each other or an overlap portion where the second closure plate and the second metal plate overlap each other.

The partition wall may include a spacing member provided between the pair of metal plates to maintain a space between the pair of metal plates.

The second metal plate may have provided thereon a support to support thereon the second closure plate, the support projecting toward the first metal plate.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
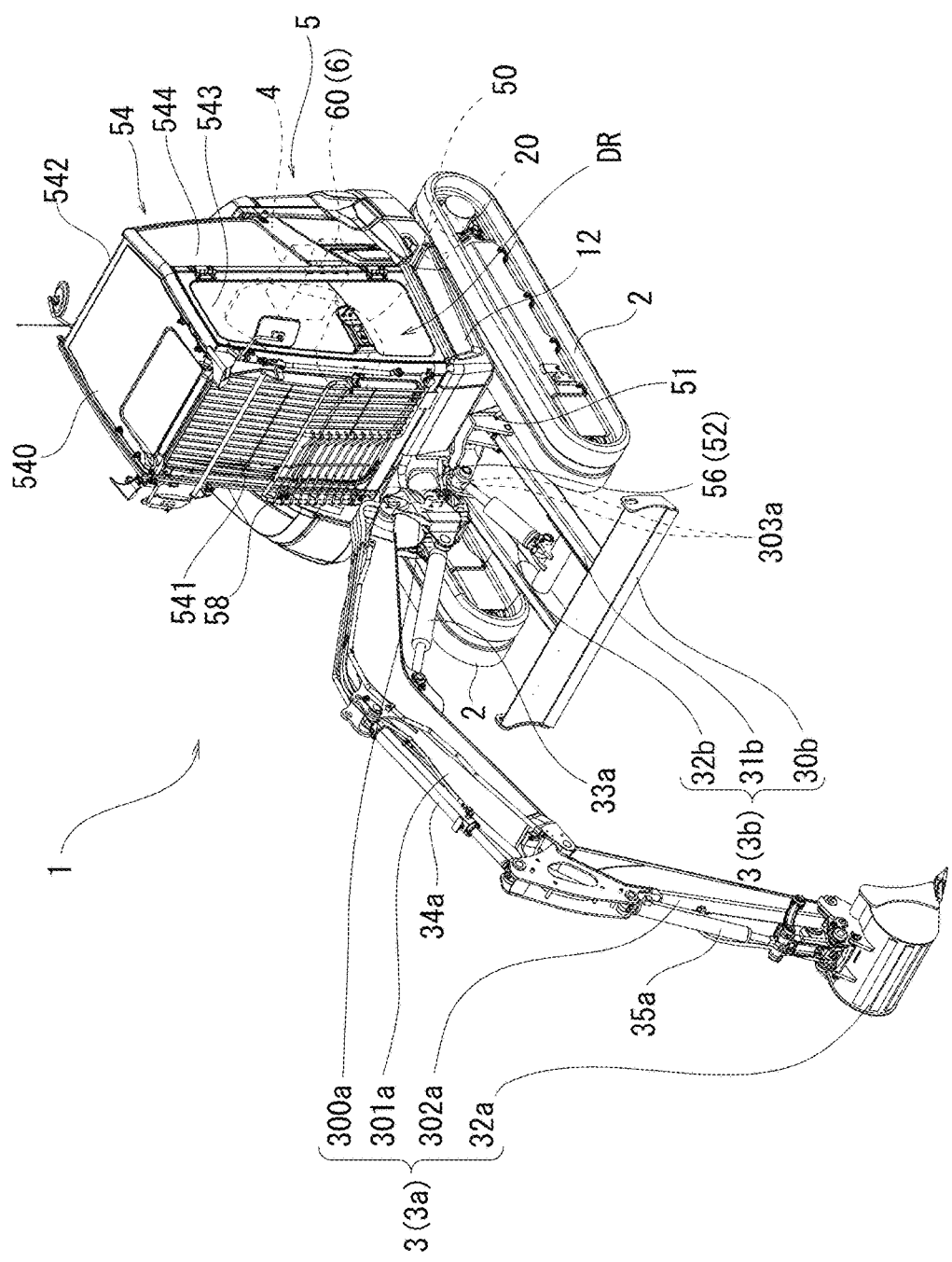
FIG. 1 is an overall perspective view of a working machine according to a first example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

A first example embodiment of the present invention will be described below with reference to the drawings as necessary.

Figure 2:
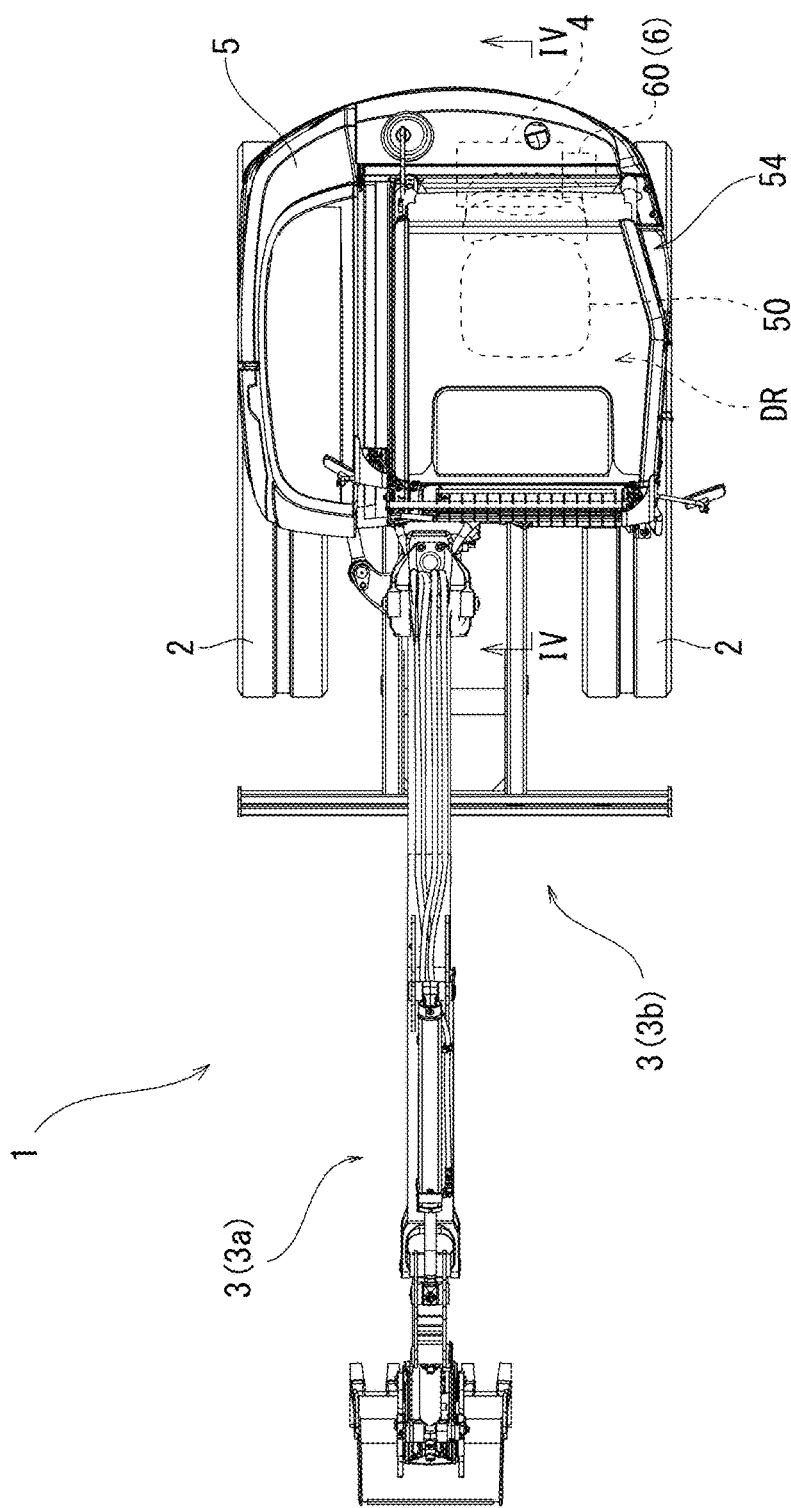
FIG. 2 is a plan view of the working machine according to the first example embodiment.

As illustrated in FIG. 1 and FIG. 2, a working machine 1 includes traveling devices 2 that can move forward and backward, a working device 3 that performs a predetermined work, and a machine body 5 that is supported by the traveling devices 2 and supports the working device 3. In the following description, directions in which the traveling devices 2 travel straight (moves forward and backward) will be referred to as a longitudinal direction, and a direction that is perpendicular to the longitudinal direction will be referred to as a transverse direction.

Figure 3:
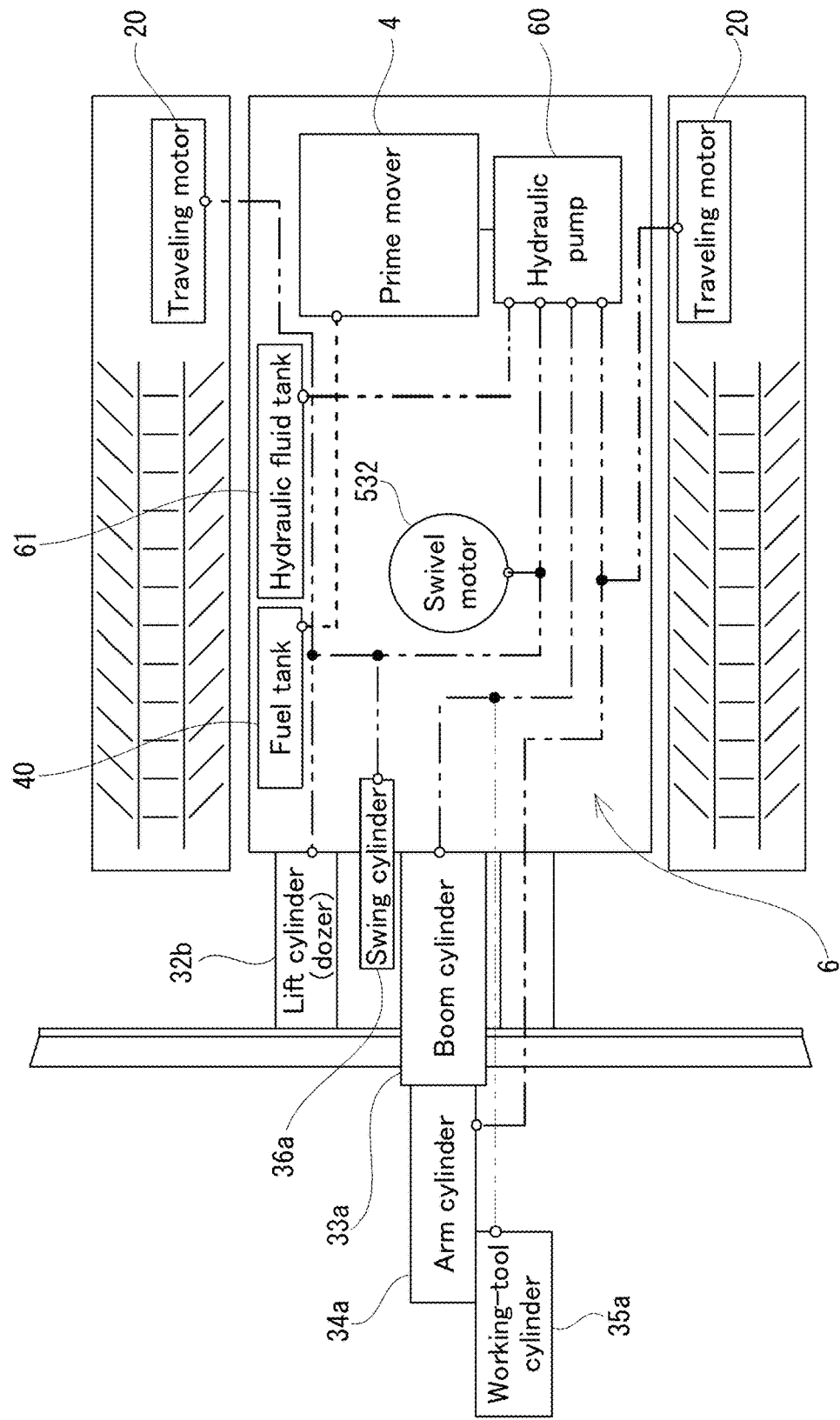
FIG. 3 is a schematic diagram illustrating a configuration of a hydraulic system of the working machine according to the first example embodiment.

The working machine 1 further includes a hydraulic system 6 that causes the traveling devices 2 and the working device 3 to operate, a prime mover 4 that drives a hydraulic pump 60, which is included in the hydraulic system 6, and an operator's seat 50. In the present example embodiment, the operator's seat 50 and the prime mover 4 are included in the machine body 5. As illustrated in FIG. 3, the hydraulic system 6 includes a hydraulic fluid tank 61 that stores a hydraulic fluid, the hydraulic pump 60 that delivers the hydraulic fluid to actuators, the actuators including hydraulic cylinders (a boom cylinder 33a, an arm cylinder 34a, a working-tool cylinder 35a, a swing cylinder 36a, and a lift cylinder 32b), hydraulic motors (a swivel motor 532 and traveling motors 20), and the like, a valve device that controls the hydraulic fluid to be supplied to each of the actuators 33a, 34a, 35a, 36a, 32b, 532, and 20, and pipes that connect these members to each other. In FIG. 3, the valve device is not illustrated, and the pipes are schematically illustrated.

Returning to FIG. 1 and FIG. 2, the traveling devices 2 are arranged such that one of them is located on one side of the machine body 5 and the other is located on the other side of the machine body 5 in the transverse direction. In other words, the working machine 1 includes the pair of traveling devices 2 and 2. In the present example embodiment, a crawler-type traveling device is employed as each of the pair of traveling devices 2 and 2. Each of the traveling devices 2 is provided with one of the traveling motors 20 as a driving source (see FIG. 1). In the present example embodiment, the traveling motors 20 are each a hydraulic motor that receives the hydraulic fluid supplied from the hydraulic system 6.

The working machine 1 according to the present example embodiment is a backhoe and includes a shovel (an excavator) 3a and a dozer 3b each serving as the working device 3.

As illustrated in FIG. 1, the shovel 3a includes a swing bracket 300a that is coupled to the machine body 5 so as to be swingable around a vertical axis (a coupling pin 303a), a boom 301a that has a base end portion coupled to the swing bracket 300a in a swingable manner around a horizontal axis, an arm 302a that has one end portion coupled to a distal end portion of the boom 301a in a swingable manner around a horizontal axis, a working tool 32a (a bucket) that is coupled to the other end portion of the arm 302a in a swingable manner around a horizontal axis.

The dozer 3b is coupled to the machine body 5 and extends forward in the longitudinal direction from the machine body 5. The dozer 3b includes a lift arm 31b and a blade 30b. The lift arm 31b is coupled to the machine body 5 (a traveling base 51) via a shaft extending in the transverse direction and is swingable in the up-down direction about the shaft. The blade 30b is coupled to an end of the lift arm 31b and has a surface that is oriented in one of the traveling directions of the traveling devices 2 (the direction in which the traveling devices 2 move forward).

The shovel 3a includes the boom cylinder 33a that tilts the boom 301a, the arm cylinder 34a that tilts the arm 302a with respect to the boom 301a, the working-tool cylinder 35a that tilts the working tool 32a with respect to the arm 302a, and the swing cylinder 36a (see FIG. 9) that swings the swing bracket 300a about the coupling pin 303a (axis). The dozer 3b further includes the lift cylinder 32b that swings the lift arm 31b. These cylinders 33a, 34a, 35a, 36a, and 32b are driven by the hydraulic fluid supplied from the hydraulic system 6.

Figure 4:
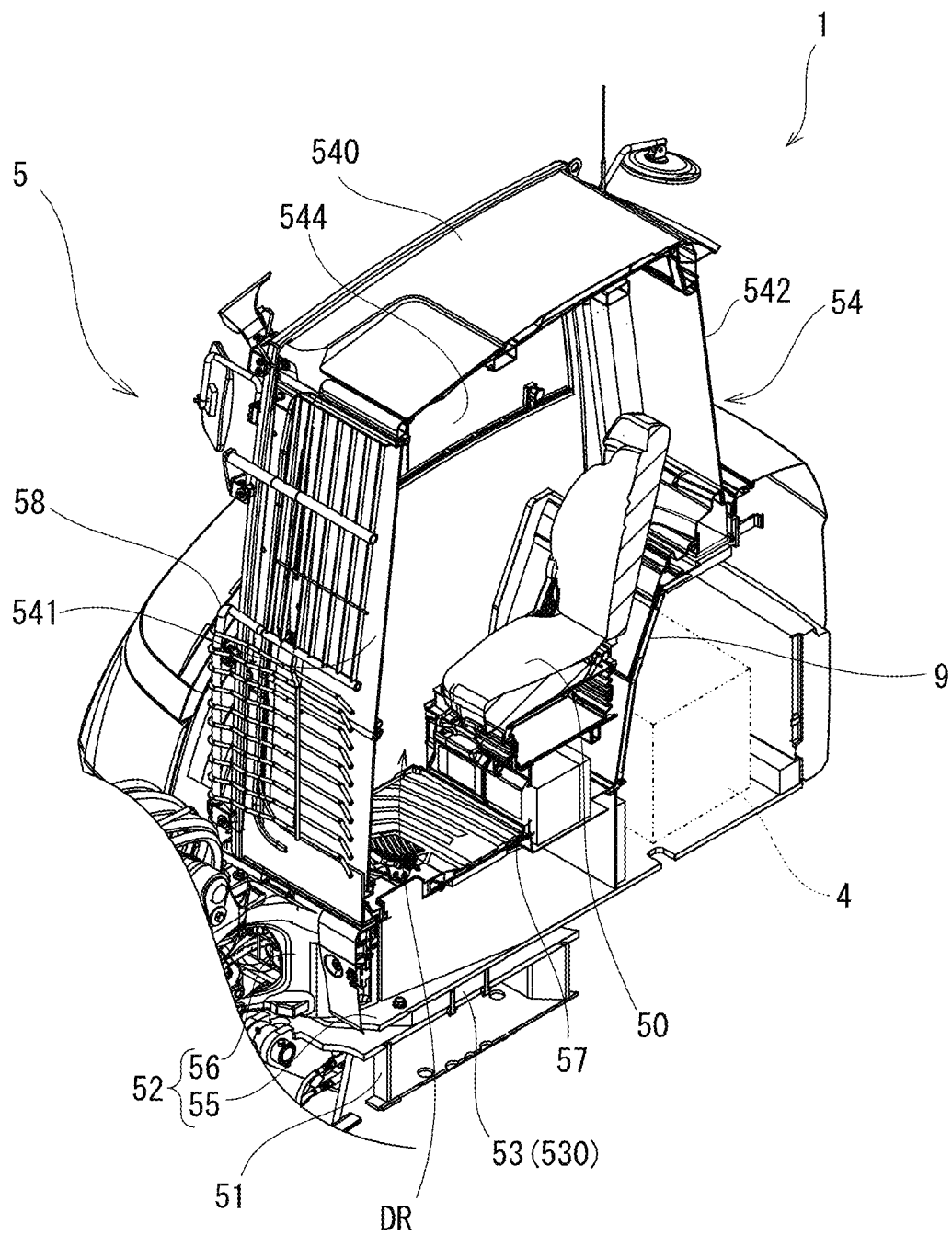
FIG. 4 is a schematic partial perspective view including a cross section IV-IV of FIG. 2.

As illustrated in FIG. 4, the prime mover 4 is provided on a swivel base 52 that is located behind an operator's cab DR (operator's seat 50). In the present example embodiment, although a diesel engine is employed as the prime mover 4, the prime mover 4 is not limited to this and may be, for example, a gasoline engine, an LPG engine, a hydrogen engine, or the like. The prime mover 4 is also not limited to an internal combustion engine and may be an electric motor.

Figure 5:
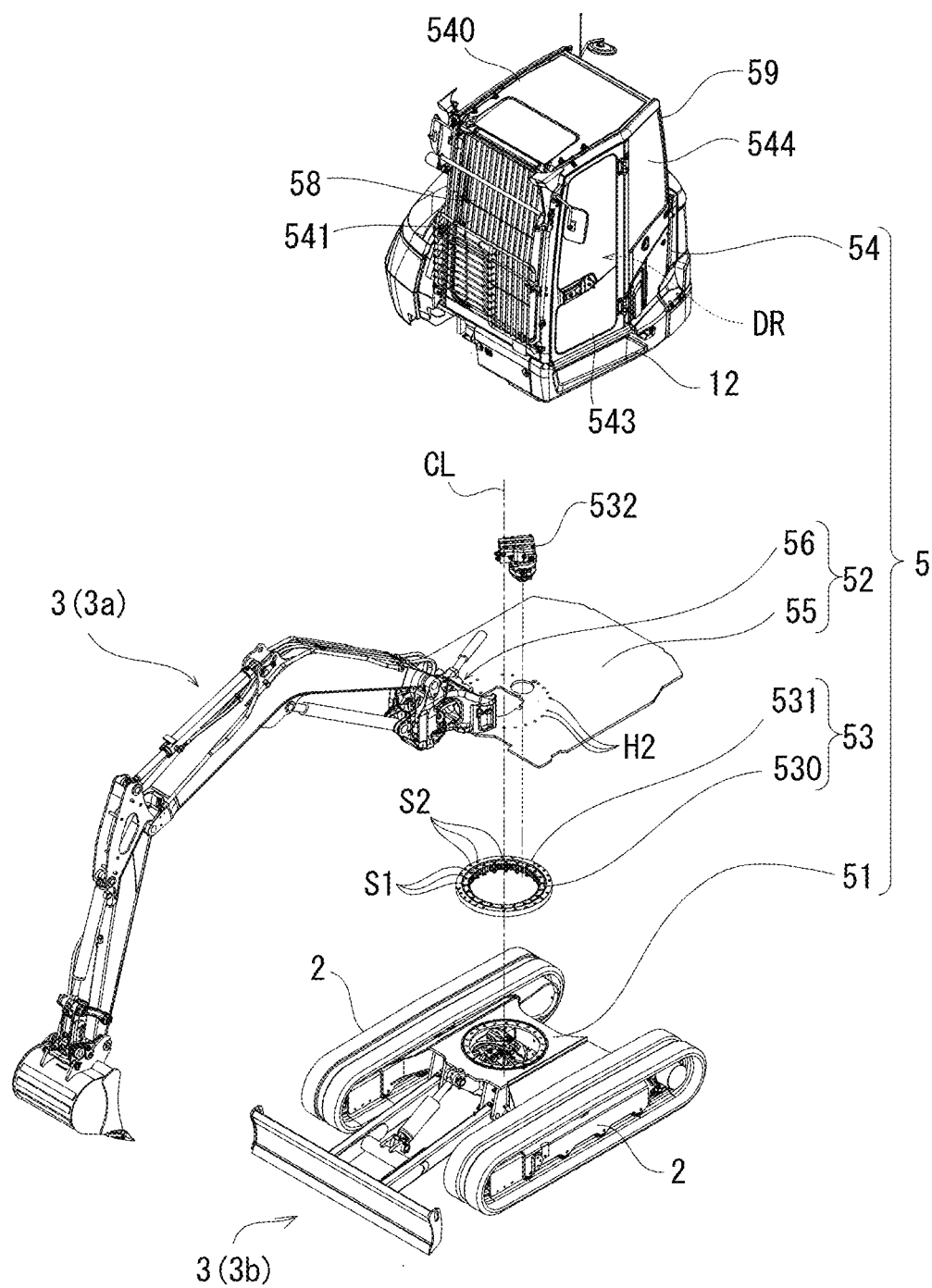
FIG. 5 is an exploded perspective view of the working machine according to the first example embodiment.

As illustrated in FIG. 5, the machine body 5 includes the traveling base 51 that is coupled to the pair of left and right traveling devices 2 and 2, the swivel base 52 that is provided above the traveling base 51, an annular swivel bearing 53 that is interposed between the traveling base 51 and the swivel base 52, and an operator's seat protector 54 that is provided on the swivel base 52 and that defines the operator's cab (a riding space) DR.

Prior to the description of the swivel base 52, the swivel bearing 53 will now be described. The swivel bearing 53 includes an inner ring 530 and an outer ring 531 that is concentric with the inner ring 530 and rotatable. A plurality of engagement teeth (an annular gear) capable of meshing with a pinion that is attached to an output shaft of the swivel motor 532 are arranged circumferentially on the inner periphery of the inner ring 530 or the outer periphery of the outer ring 531.

One of the inner ring 530 and the outer ring 531 is coupled to the traveling base 51, and the other of the inner ring 530 and the outer ring 531 is coupled to the swivel base 52. As a result, when the swivel bearing 53 is driven by the swivel motor 532, the swivel bearing 53 causes the inner ring 530 and the outer ring 531 to rotate relative to each other, about a swivel axis CL extending in the up-down direction, thus swiveling (rotating) the swivel base 52 with respect to the traveling devices 2 (traveling base 51).

Figure 6:
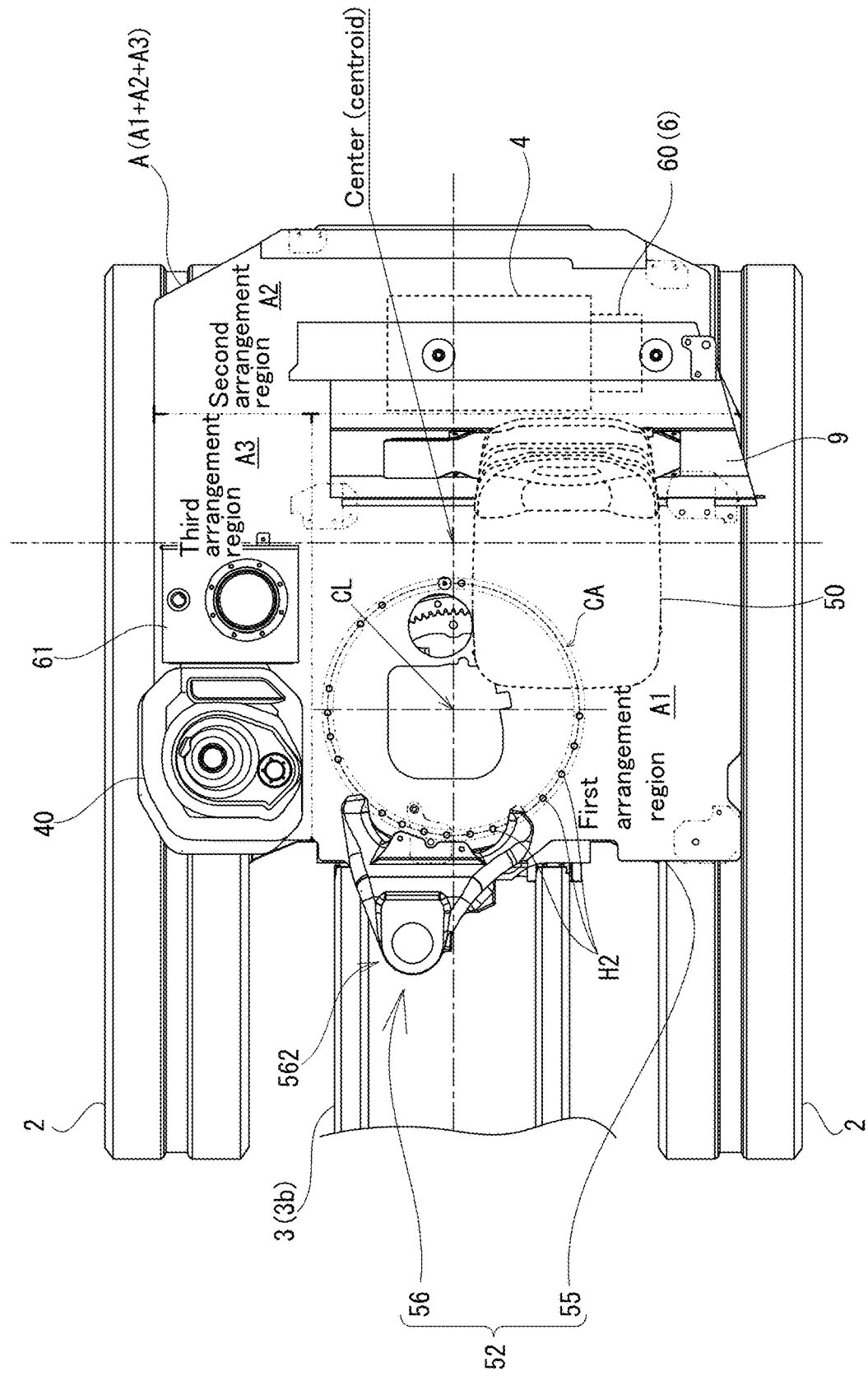
FIG. 6 is a schematic plan view of the working machine according to the first example embodiment in a state where an operator's seat protector and the like are removed.
Figure 7:
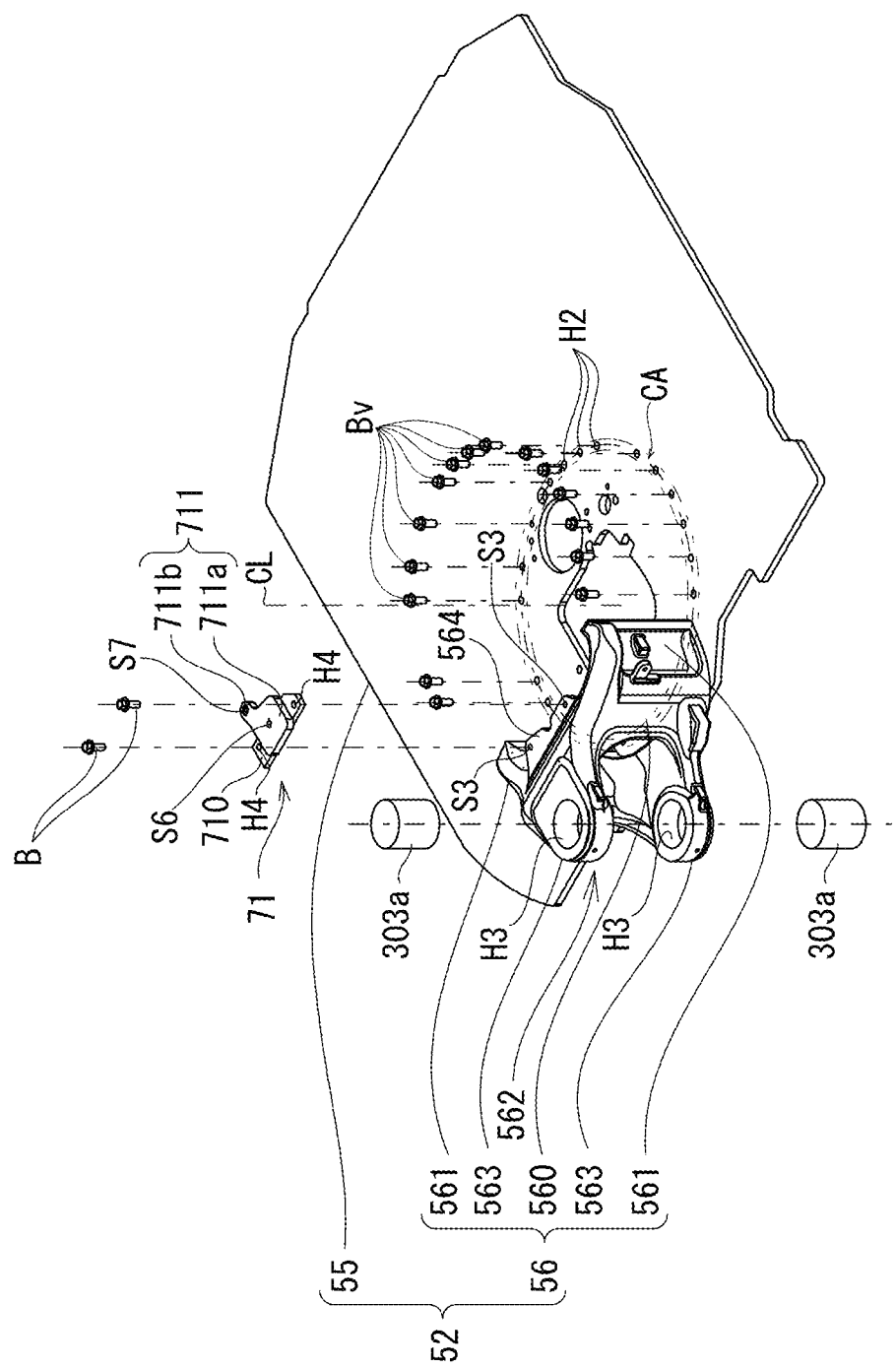
FIG. 7 is a schematic overall perspective view of a swivel base of the working machine according to the first example embodiment.
Figure 8:
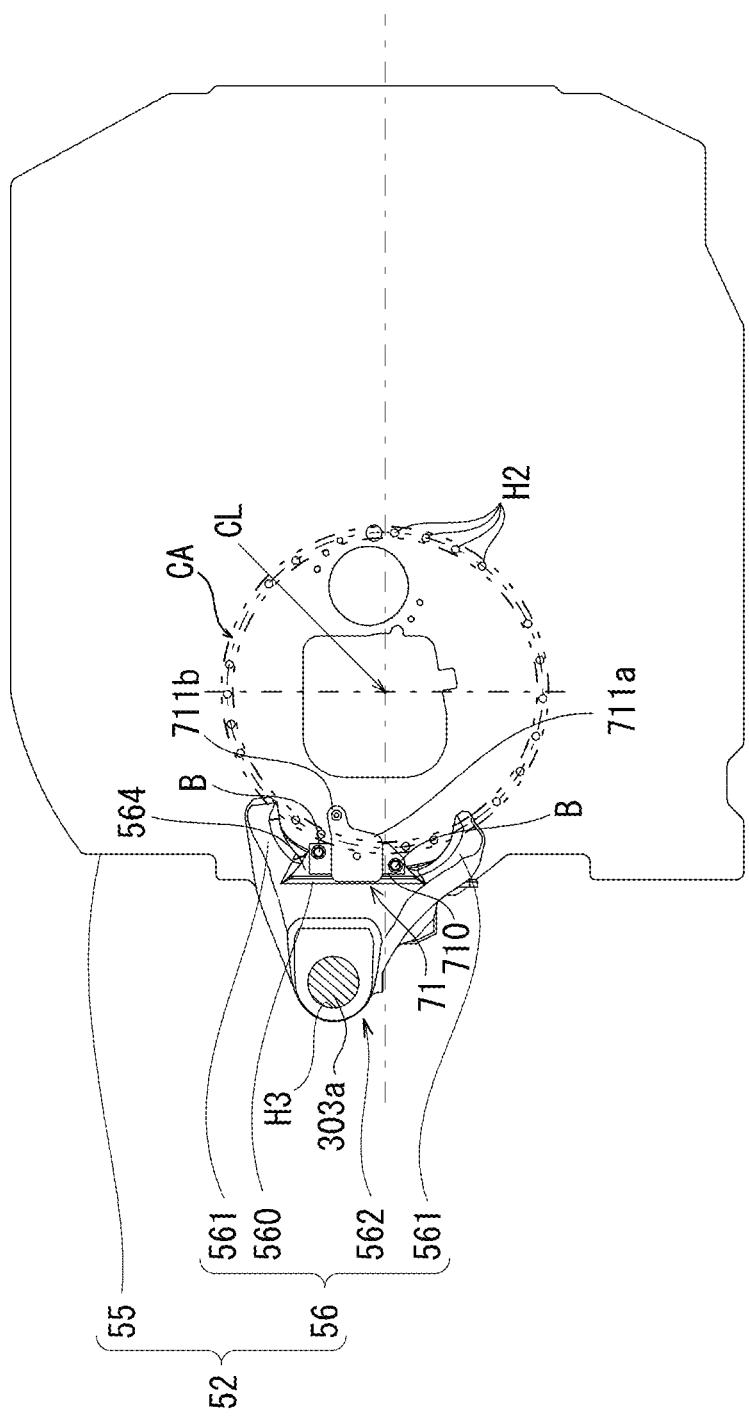
FIG. 8 is a schematic plan view of the swivel base of the working machine according to the first example embodiment.

In the present example embodiment, the inner ring 530 is coupled to the traveling base 51, and the outer ring 531 is coupled to the swivel base 52 (a base plate 55) (see FIG. 6 to FIG. 8). In the present example embodiment, the plurality of engagement teeth (annular gear) are provided on the inner periphery of the inner ring 530. Thus, in the present example embodiment, the swivel base 52, which is coupled to the outer ring 531, rotates (slews) as a result of being driven by the swivel motor 532. In the present example embodiment, similar to the traveling motors 20, the swivel motor 532 is a hydraulic motor that receives the hydraulic fluid supplied from the hydraulic system 6.

The inner ring 530 and the outer ring 531 are provided with a plurality of threaded holes S1 and S2 that are arranged circumferentially so as to be spaced apart from each other and into which externally threaded fasteners Bv (see FIG. 7) are screwed for fixation. More specifically, a surface of the inner ring 530 that faces downward has the plurality of threaded holes S1 that are formed and arranged circumferentially so as to be spaced apart from each other and into which the externally threaded fasteners that couple the swivel bearing 53 to the traveling base 51 are screwed. In contrast, a surface of the outer ring 531 that faces upward has the plurality of threaded holes S2 that are formed and arranged circumferentially so as to be spaced apart from each other and into which the externally threaded fasteners Bv that couple the swivel bearing 53 to the swivel base 52 are screwed.

In the following description, although machined (flat machined) portions may be mentioned, it is assumed that these machining processes are performed after welding or other heat-affected processes (processes that cause distortion due to heat) in order to ensure machining accuracy.

The swivel base 52 includes the base plate 55 and a device support (a support bracket) 56. The base plate 55 supports the operator's seat protector 54 and the prime mover 4. The device support 56 is attached to the base plate 55 and supports the working device 3 (3*a*).

The base plate 55 is a metal plate and has, on its lower surface, a surface to be mounted on the swivel bearing 53 (outer ring 531). The surface to be mounted on the swivel bearing 53 is a flat surface and has a plurality of through holes H2, extending in the up-down direction, for insertion of the plurality of externally threaded fasteners Bv to fix the base plate 55 to the swivel bearing 53 (outer ring 531) (see FIGS. 6 to 8). The arrangement of the plurality of through holes H2 corresponds to the arrangement of the plurality of threaded holes S2 (see FIG. 5), which are formed in the swivel bearing 53 (outer ring 531).

More specifically, the plurality of through holes H2 are arranged on an imaginary circle that is concentric or substantially concentric with a rotation center (swivel axis CL) of the swivel bearing 53 within an annular region CA that overlaps the swivel bearing 53 (the outer ring 531 in the present example embodiment) in projection view as seen in the up-down direction, and the plurality of through holes H2 are arranged so as to be spaced apart from each other in the circumferential direction of the imaginary circle. In the working machine 1 of the present example embodiment, when the base plate 55 slews (rotates) about the swivel axis CL, the position of the working device 3 changes (the longitudinal direction of the base plate 55 may become parallel to the transverse direction, or the front and rear directions of the base plate 55 may switch). However, a posture in which the working device 3 is located in front of the traveling devices 2 (traveling base 51) in the direction in which the traveling devices 2 move forward is defined as a standard posture, and thus, the following description is based on the standard posture.

As illustrated in FIG. 6, the center (centroid) of the base plate 55 in a plan view is shifted rearward in the longitudinal direction with respect to the swivel axis CL (the center of rotation by the swivel bearing 53).

The base plate 55 has a hole into which an output shaft of the swivel motor 532 is inserted and an opening for positioning a swivel joint (not illustrated) that connects a hydraulic system on the traveling devices 2 side and a hydraulic system on the machine body 5 side to each other.

In an entire region A of the base plate 55 according to the present example embodiment (the entire region A as viewed from above), a region on the front side in the longitudinal direction and on one side in the transverse direction is set as an area (hereinafter referred to as a "first arrangement region") A1 in which the operator's seat protector 54 is positioned, and a region on the rear side in the longitudinal direction is set as an area (hereinafter referred to as a "second arrangement region") A2 in which the prime mover 4 is positioned. A region on the front side in the longitudinal direction and a region on the other side in the transverse direction are set as an area (hereinafter referred to as a "third arrangement region") A3 in which a fuel tank 40, the hydraulic fluid tank 61, which stores the hydraulic fluid of the hydraulic system 6, and the like are positioned.

The device support 56 is provided such that the device support 56 at least does not overlap the externally threaded fasteners Bv within the annular region CA in projection view as seen in the up-down direction. The device support 56 is coupled to the base plate 55 by welding.

As illustrated in FIG. 7 and FIG. 8, the device support 56 is provided on the upper surface of the base plate 55 and includes a main body 560 that is provided at a front end portion of the base plate 55 in the longitudinal direction of the base plate 55, a pair of legs 561 that extend rearward from the main body 560 in the longitudinal direction, and a device coupling portion 562 that extends forward from the main body 560 in the longitudinal direction and to which the working device 3 is coupled.

At the upper surface of the main body 560, an placement surface 564 on which a support member (a second support member) 71 that supports a frame 59 of the operator's seat protector 54 is installed is provided in a region between the legs 561. The placement surface 564 is a flat surface facing upward, and its flatness is ensured by machining.

Threaded holes S3 are formed downward in the placement surface 564, and externally threaded fasteners B, which are threaded fasteners to fix a support member 71 in place, are screwed into the threaded holes S3. In the present example embodiment, a pair of threaded holes S3 and S3 are formed in the placement surface 564 so as to be spaced apart from each other in the transverse direction. Between the pair of threaded holes S3 and S3 formed in the placement surface 564, an end edge of the placement surface 564 on the rear side in the longitudinal direction is recessed to the front side in the longitudinal direction. More specifically, a center portion of the placement surface 564 between the pair of threaded holes S3 and S3 is partially recessed from the rear side toward the front side in the longitudinal direction (see FIG. 6 and FIG. 7). The support member 71 will be described in detail in the description of the operator's seat protector 54 that defines the operator's cab DR.

The pair of legs 561 are arranged so as to be spaced apart from each other in the transverse direction. In the present example embodiment, the pair of legs 561 are arranged such that the distance between them in the transverse direction increases toward the rear side in the longitudinal direction. The pair of legs 561 are arranged in such a manner as to avoid the plurality of through holes (through holes through which the externally threaded fasteners Bv that fix the swivel bearing 53 in place are inserted) H2 formed in the base plate 55.

Figure 11:
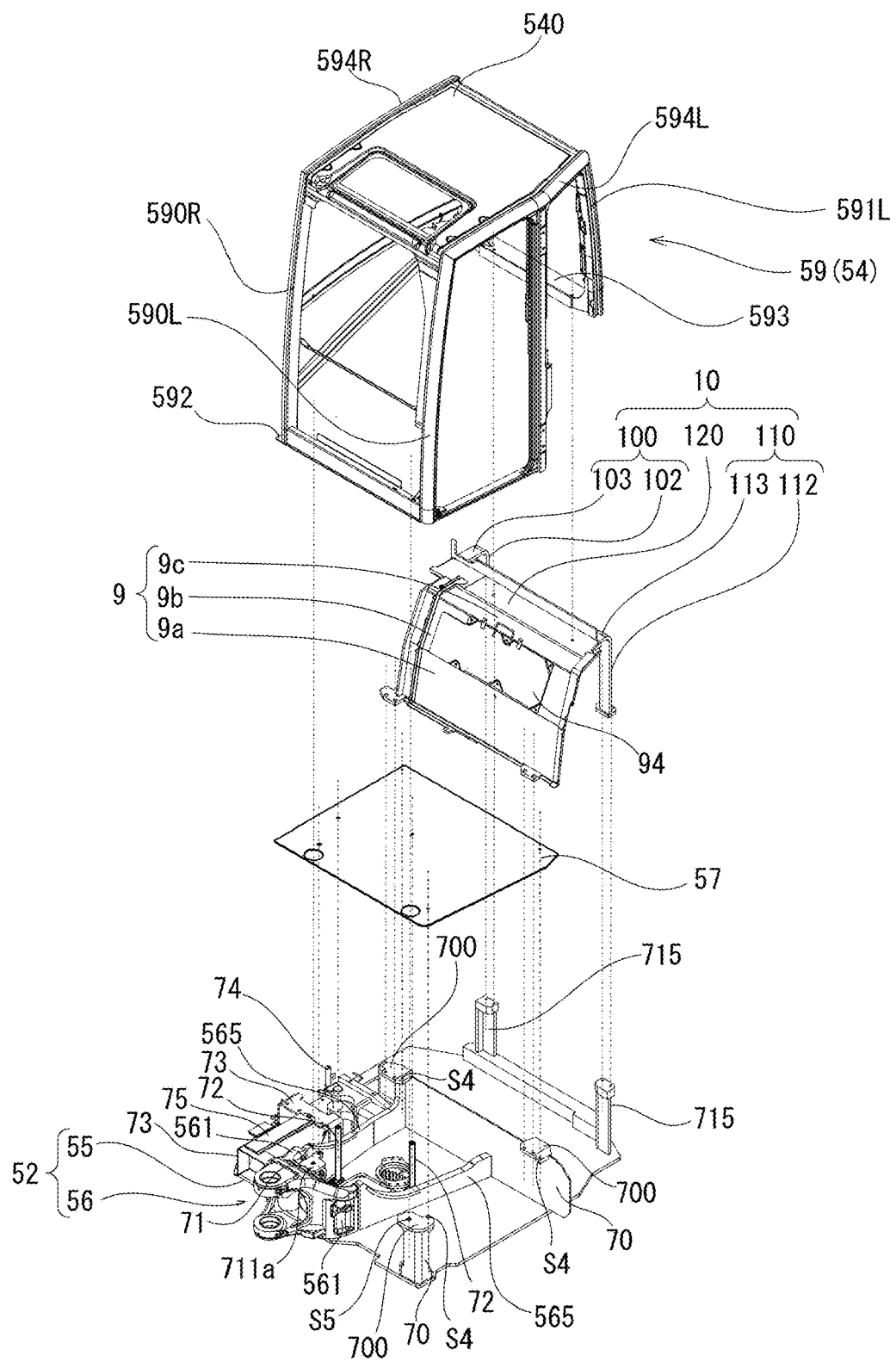
FIG. 11 is an exploded perspective view of a portion of the working machine according to the first example embodiment.

The lower end of the main body 560 and the lower ends of the pair of legs 561 are welded to the base plate 55. As a result, in the swivel base 52 according to the present example embodiment, the base plate 55 and the device support 56 are integrated with each other. In FIG. 6 to FIG. 8 and the like, although illustration is omitted for convenience of description, a pair of vertical ribs 565 and 565 that extend rearward from the pair of legs 561 in the longitudinal direction are vertically provided on the upper surface of the base plate 55 as illustrated in FIG. 11. The pair of vertical ribs 565 and 565 are each a plate member that is in an upright position on the upper surface of the base plate 55 so as to increase the bending strength of the base plate 55.

As illustrated in FIG. 7, the device coupling portion 562 includes a pair of extension portions 563 and 563 that extend forward from the main body 560 and that are arranged so as to be spaced apart from each other in the up-down direction. The pair of extension portions 563 and 563 each have a through hole H3 formed at its end portion so as to extend therethrough in the up-down direction, and the coupling pin 303*a* for coupling the working device 3 is inserted into the through holes H3. The through holes H3 of the pair of extension portions 563 and 563 are concentric with each other, and the coupling pin 303*a* can be concentrically inserted into each of the through holes H3.

In the device support 56, the main body 560, the pair of legs 561, and the device coupling portion 562 are integrally formed. The device support 56 of the present example embodiment is made of a cast material (a cast product). In other words, the device support 56 is made of cast iron. The device support 56 is not limited to being made of a cast material, and for example, it may be formed by combining (appropriately welding) a plurality of metal members or may be formed of a sheet metal formed by processing a plate material.

As illustrated in FIG. 1, FIG. 2, and FIG. 4, a lower portion of the operator's cab DR and the operator's seat 50 are located forward of the prime mover 4 in the longitudinal direction.

As illustrated in FIG. 4, the operator's cab DR is defined by a step 57 that constitutes a floor (a floor plate) and on which the operator's seat 50 (a seat) is placed and the operator's seat protector 54 that covers the operator's seat 50 on the step 57.

Figure 9:
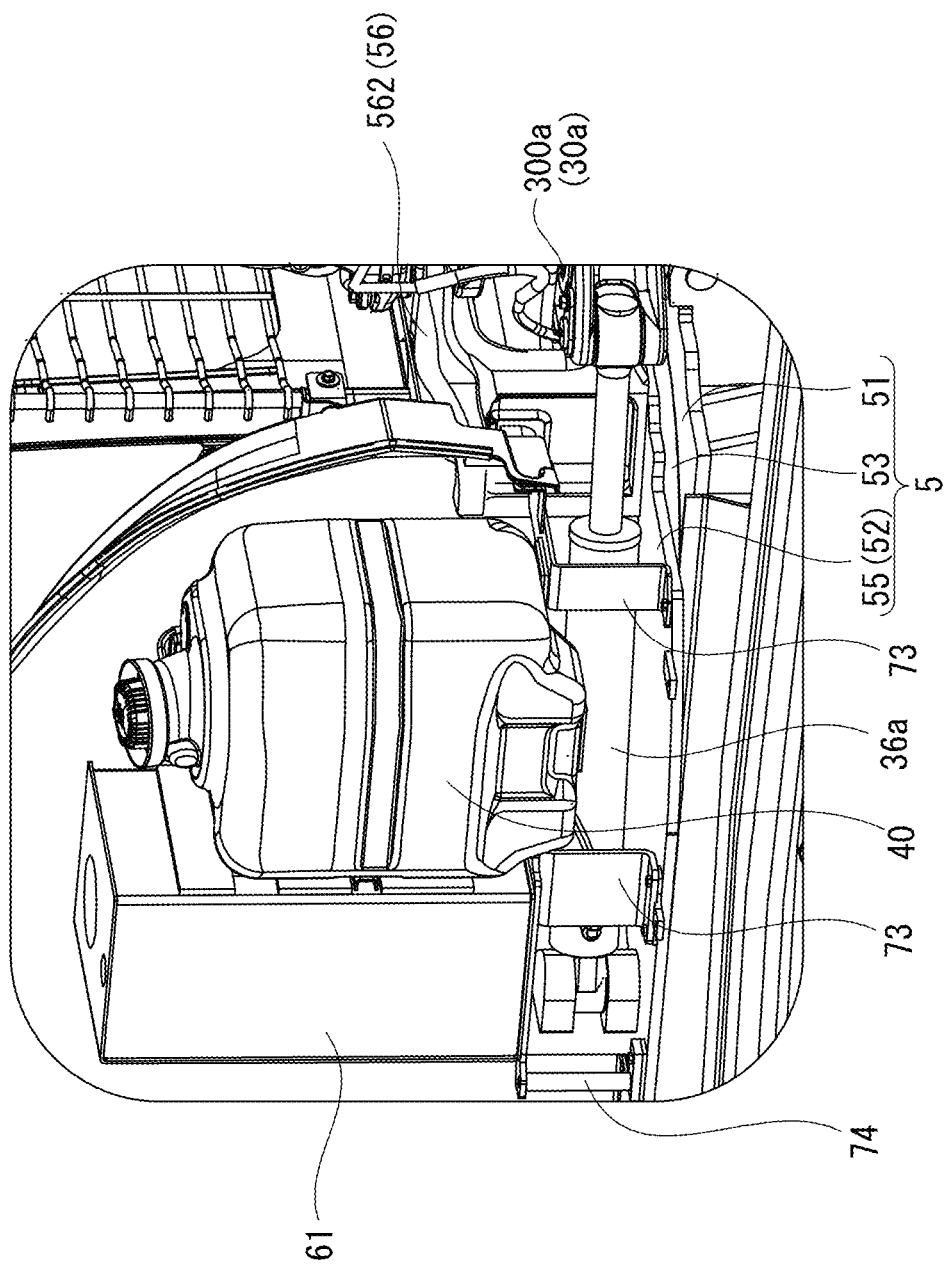
FIG. 9 is a partial perspective view of the working machine according to the first example embodiment in a state where a cover (an exterior) is removed and is a partial schematic perspective view including installed components arranged on the swivel base.

The step 57 is an installed component of the working machine 1. In the present example embodiment, the step 57 is a metal plate and is provided above the swivel base 52. In other words, the step 57 is provided so as to be spaced apart from the swivel base 52 in the up-down direction. As illustrated in FIG. 9, the working machine 1 includes, as installed components, the fuel tank 40, the hydraulic fluid tank 61, and the like, in addition to the step 57. The fuel tank 40 and the hydraulic fluid tank 61 are arranged so as to be spaced apart from the swivel base 52 in the up-down direction.

Figure 10:
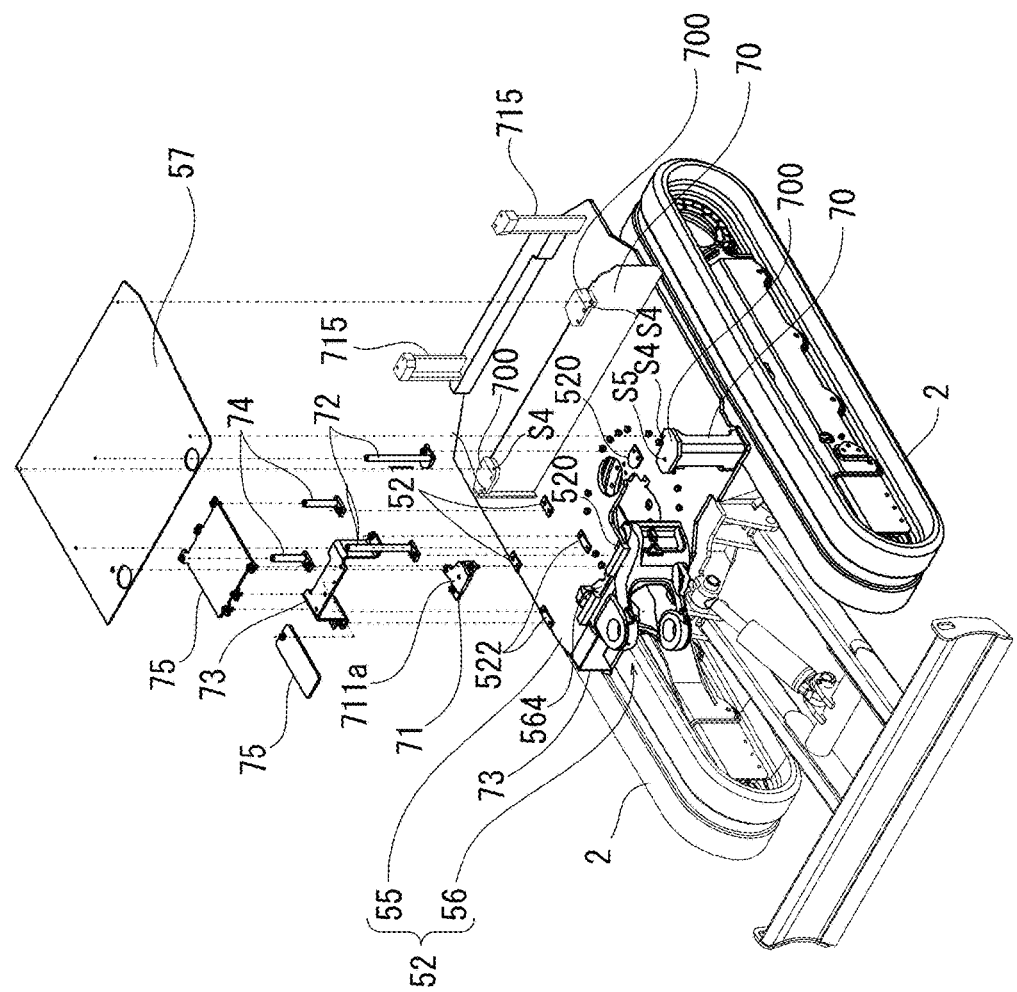
FIG. 10 is an exploded perspective view of a portion of the working machine according to the first example embodiment.

As illustrated in FIG. 10, the working machine 1 includes support members 70, 71, 72, 73, and 74 that support the installed components such as the step 57, the fuel tank 40, and the hydraulic fluid tank 61 in a state where the installed components are spaced apart from the swivel base 52 (the base plate 55). More specifically, the working machine 1 includes the first support member(s) 70 fixed to the swivel base 52 by welding, the second support member(s) 71 attachable and detachable to and from the device support 56, and the third support member(s) 72 detachably attached to the base plate 55.

The working machine 1 further includes the fourth support member(s) 73 and the fifth support member(s) 74 detachably attached to the base plate 55 as support members that support the fuel tank 40 and the hydraulic fluid tank 61. As illustrated in FIG. 10 and FIG. 11, the working machine 1 further includes rear-end support members 715 and 715 that partially support a support frame 10, which will be described later.

The first support members 70 extend in the up-down direction and each have one end (a lower end) welded to the base plate 55 of the swivel base 52. The first support members 70 each have a leg that is welded to the base plate 55 so as to be in an upright position on the upper surface of the base plate 55. In the present example embodiment, the first support members 70 are arranged at a plurality of positions (three positions) on the base plate 55 so as to support three (three portions) that are a left front corner, a left rear corner, and a right rear corner among four corner portions (four corners) of the step 57, which has a rectangular shape when viewed in plan view. In the present example embodiment, one of the first support members 70 that supports the left front corner of the step 57 has an individual leg, while the other two of the first support members 70 that support the left rear corner and the right rear corner of the step 57 share a common leg formed in a plate-like shape extending in the transverse direction.

The first support members 70 each have, above the leg, a placement surface 700 for placement of the step 57. In other words, each of the plurality of first support members 70 has the placement surface 700 at the other end (an upper end) thereof, and the step 57 is provided on the placement surface 700. The placement surfaces 700 of the first support members 70 each have a threaded hole S4 into which an externally threaded fastener is screwed in the up-down direction. Among the plurality of first support members 70, the first support member 70 that supports the left front corner of the step 57 has, in addition to the above-mentioned threaded hole S4, a threaded hole S5 formed therein in the up-down direction for fixing the operator's seat protector 54 in place. The threaded hole S5 is provided so as to correspond to the arrangement of a through hole H12 of a front fixed portion 592, which will be described later. In contrast, the other two first support members 70 that support the left rear corner and the right rear corner of the step 57 each have a threaded hole into which a threaded fastener to fix the support frame 10 in place is screwed, in addition to the above-mentioned threaded holes S4.

Figure 12:
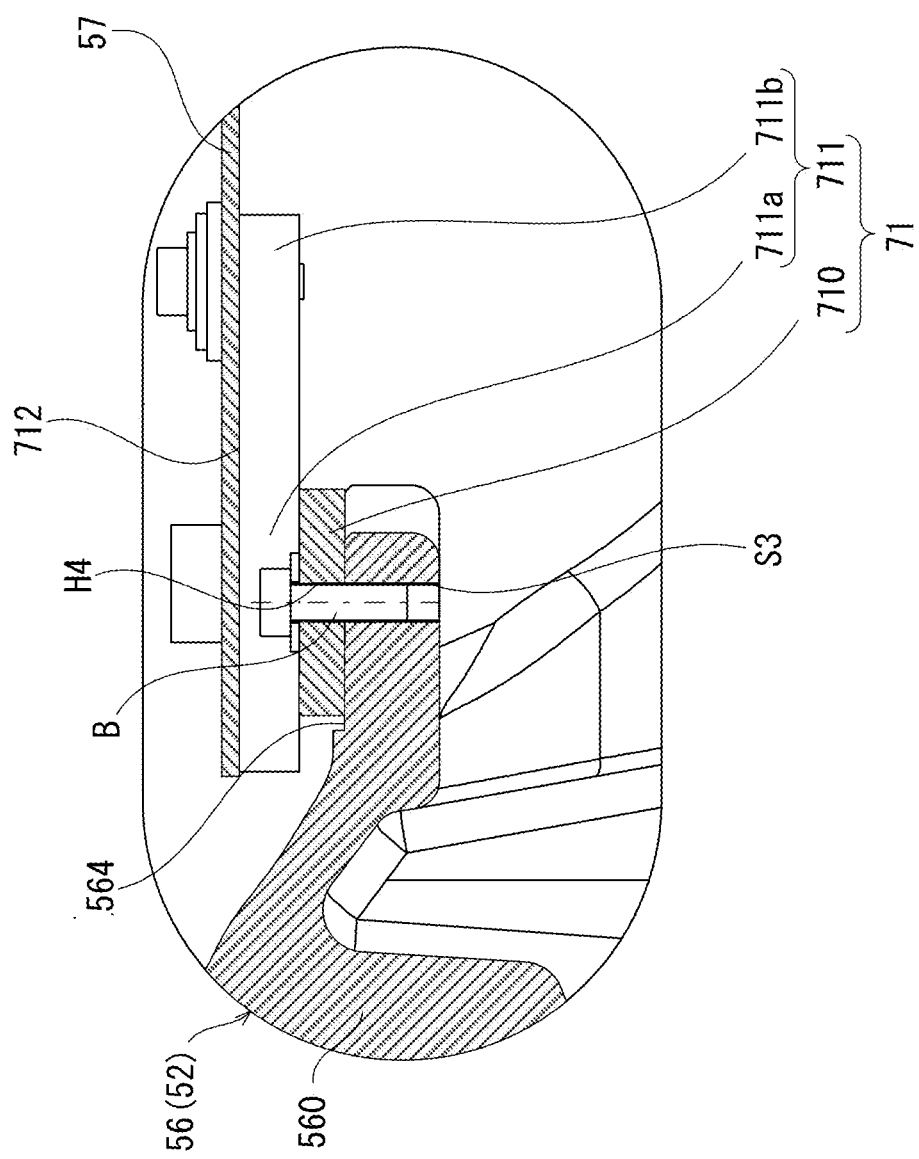
FIG. 12 is a partially enlarged cross-sectional view including a support member (a second support member) of the working machine according to the first example embodiment.

As illustrated in FIG. 7 and FIG. 12, the second support member 71 includes a base portion 710 that is detachably attached to the placement surface 564 of the device support 56 and a support main body 711 that is coupled to the base portion 710. The support main body 711 includes a protector support 711*a* that can support the operator's seat protector 54 and a step support 711*b* that supports the step 57.

As described above, the base portion 710 is provided on the placement surface 564 of the device support 56. A lower surface (a surface facing downward) of the base portion 710 is a flat surface, and its flatness is ensured by machining. In the present example embodiment, in a state where the base portion 710 is provided on the placement surface 564 of the device support 56, the base portion 710 projects rearward from the placement surface 564 of the device support 56 (a rear edge of the placement surface 564 (a boundary)) in the longitudinal direction.

A pair of through holes H4 and H4 are formed in the base portion 710 in the up-down direction at positions where they communicate with the pair of threaded holes S3 and S3, which are formed in the placement surface 564 of the device support 56, and the externally threaded fasteners B that fix the second support member 71 to the device support 56 are inserted into the pair of through holes H4 and H4.

The length of the support main body 711 in the longitudinal direction is longer than the length of the base portion 710 in the same direction. One end portion of the support main body 711 is fixed to the upper surface of the base portion 710 by welding while being overlapped with the upper surface of the base portion 710, and the other end portion of the support main body 711 extends further rearward than the base portion 710 in the longitudinal direction (projects rearward from the base portion 710 in the longitudinal direction). The support main body 711 is positioned in an area of the upper surface of the base portion 710 that excludes the through holes H4, and is coupled to the base portion 710. In the present example embodiment, the one end portion of the support main body 711 is fixed between the pair of through holes H4 and H4, which are arranged at the base portion 710 so as to be spaced apart from each other in the transverse direction.

The support main body 711 is formed of a single plate material. The protector support 711*a* is formed at a front portion of the support main body 711 so as to have a substantially square shape when viewed in plan view, and the step support 711b is formed at a rear portion of the support main body 711 so as to project rearward from the protector support 711a. The protector support 711a overlaps the upper surface of the base portion 710 in a state where a front end portion of the protector support 711a slightly projects forward from a front end portion of the base portion 710. The protector support 711a is fixed to the base portion 710 so as to avoid the pair of through holes H4 and H4 (is fixed between the pair of through holes H4 and H4). In the present example embodiment, the base portion 710 provided on the placement surface 564 of the device support 56 projects rearward from the placement surface 564 of the device support 56 in the longitudinal direction, and the protector support 711a projects rearward from the base portion 710 in the longitudinal direction.

As illustrated in FIG. 8, in a state where the base portion 710 is fixed to the placement surface 564 of the device support 56, the protector support 711a is spaced apart from the base plate 55 and overlaps the annular region CA in projection view as seen in the up-down direction (overlaps the annular region CA in plan view). In other words, a portion of the protector support 711a that projects rearward from the placement surface 564 faces the base plate 55 located below and overlaps, in projection view as ween in the up-down direction, a region (the annular region CA) where the externally threaded fasteners Bv that fix the base plate 55 to the swivel bearing 53 are present.

Accordingly, in the present example embodiment, the protector support 711a overlaps the entire width of the annular region CA (a band-shaped region with a non-terminal annular width). Thus, when the second support member 71 is not detachable, it is difficult to perform an operation on the externally threaded fasteners Bv located below the protector support 711a by using a tool such as a wrench or the like. In contrast, in the present example embodiment, the second support member 71 can be removed by removing the externally threaded fasteners B, and thus, a tool can be accessed from above to the externally threaded fasteners Bv, so that an appropriate operation can be performed. As a result, it is possible to improve workability for tasks such as attaching and detaching the base plate 55 to and from the swivel bearing 53 and torque management of the externally threaded fasteners Bv.

In the present example embodiment, since the protector support 711a can be detachably attached to the placement surface 564 of the device support 56, even in the case where the swivel bearing 53 (outer ring 531) is provided in the vicinity of the device support 56, the degree of freedom in the installation position of the protector support 711a can be improved. This makes it possible to, for example, increase the size of the operator's seat protector 54 without interfering with the working device 3, thereby improving an operator's comfort. For example, even in the case where a guard member 58 is provided in front of a front window 541 as illustrated in FIG. 1, the operator's seat protector 54 can be installed at a position where the interference between the working device 3 and the guard member 58 can be prevented and where the size of the operator's seat protector 54 can be maximized.

Figure 18:
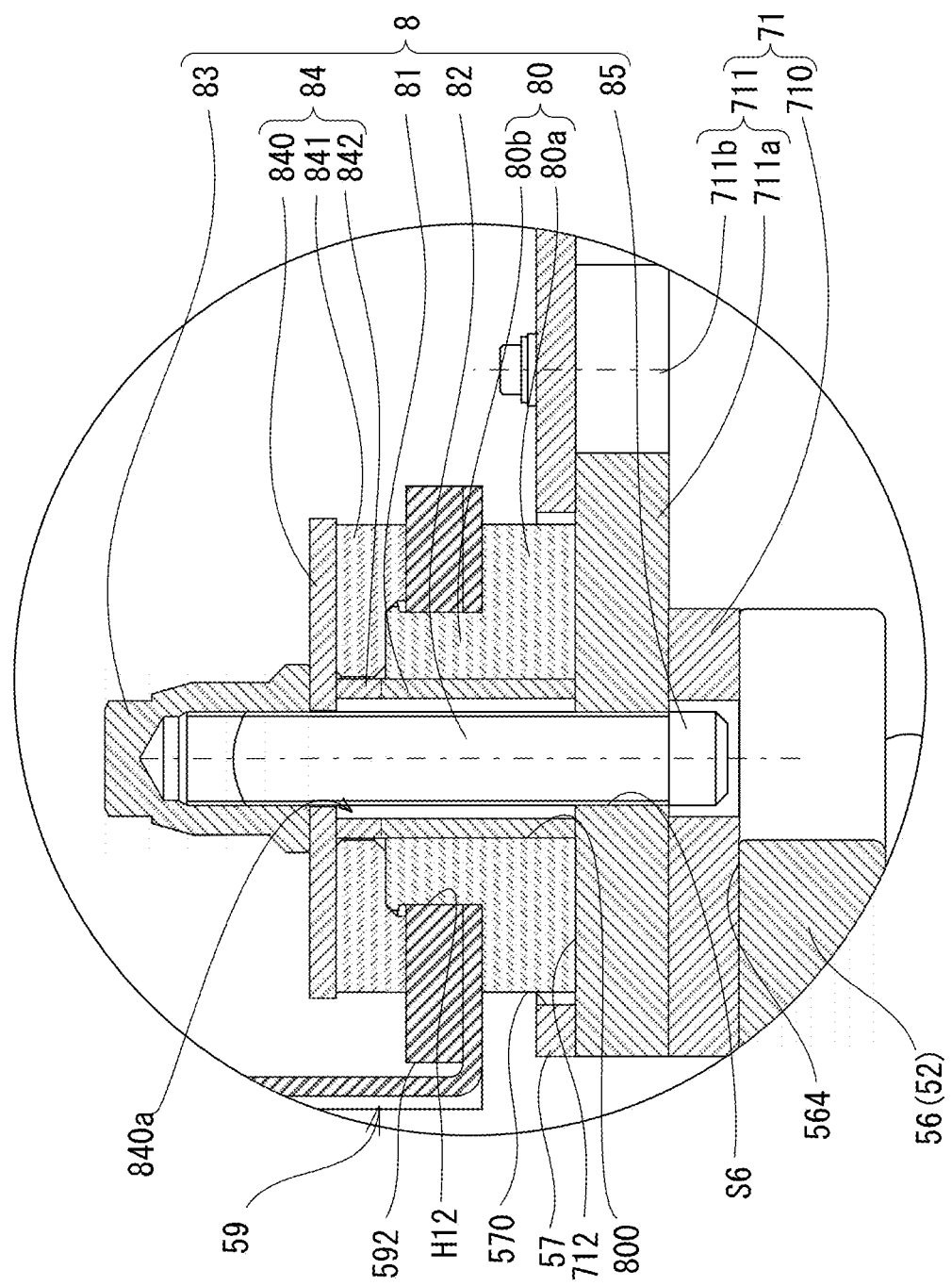
FIG. 18 is an enlarged cross-sectional view of a vibration isolation mechanism of the working machine according to the first example embodiment.

A portion of the protector support 711a that projects rearward from the placement surface 564 of the device support 56 has a threaded hole S6 into which one of externally threaded fasteners (threaded fasteners) 82 for fixing the operator's seat protector 54 (frame 59) in place is screwed in the up-down direction (see FIG. 18). In the protector support 711a of the present example embodiment, the threaded hole S6, into which the externally threaded fastener 82 is screwed, is provided at a portion projecting rearward from a rear end edge of the placement surface 564 of the device support 56 in the longitudinal direction, the rear end edge being partially recessed between the pair of threaded holes S3 and S3 from the rear side toward the front side (see FIG. 18).

The step support 711b projects rearward from the protector support 711a in the longitudinal direction. As illustrated in FIG. 12, the upper surface of the step support 711b serves as an placement surface 712 on which the step 57 is installed. In the present example embodiment, the upper surface of the protector support 711a and the upper surface of the step support 711b are a continuous common plane, and the entire upper surface of the support main body 711 (the upper surface of the protector support 711a and the step support 711b) constitutes the placement surface 712 of the step 57. The flatness of the upper surface of the protector support 711a and he flatness of the upper surface (placement surface 712) of the step support 711b is ensured by machining.

Figure 13:
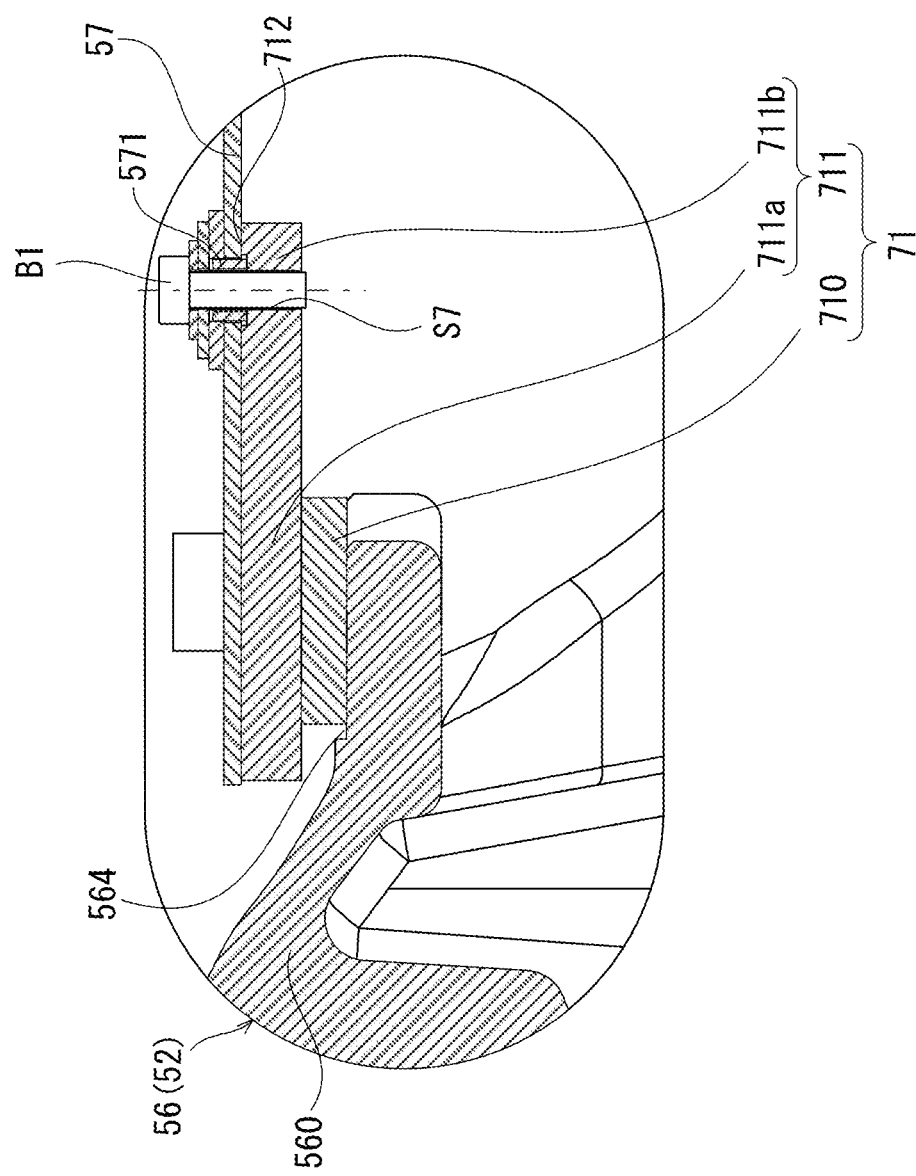
FIG. 13 is a partially enlarged cross-sectional view including the support member (second support member) of the working machine according to the first example embodiment.

As illustrated in FIG. 13, the step support 711b (placement surface 712) has a threaded hole S7 formed therein in the up-down direction, and an externally threaded fastener B1 for fixing the step 57 in place is screwed into the threaded hole S7. In the present example embodiment, the externally threaded fastener B1 is fitted with a cylindrical collar 571 on its exterior, and both the externally threaded fastener B1 and the collar 571 are inserted through a through hole of the step 57, so that the step support 711b is fixed to the step 57. Accordingly, a counterbore that is concentric or substantially concentric with the threaded hole S7 is provided at the upper surface of the step support 711b, and the collar 571 is received by the bottom surface of the counterbore. As a result, even when a load, vibration, or the like of the working device 3 (shovel 3a) acts on the device support 56, the externally threaded fasteners B1 fixing the step 57 in place are prevented (suppressed) from loosening.

Since the step support 711b projects rearward from the protector support 711a, as illustrated in FIG. 8, the step support 711b extends beyond the region (annular region CA) where the externally threaded fasteners Bv to fix the base plate 55 to the swivel bearing 53 are present, and overlaps the base plate 55 in projection view as seen in the up-down direction.

As illustrated in FIG. 12, the externally threaded fasteners B that fix the second support member 71 in place each have a head and a threaded portion that has a diameter smaller than that of the head, and the threaded portions are inserted through the through holes H4 of the base portion 710 and screwed into the threaded holes S3 of the placement surface 564. The thickness of the support main body 711 in the up-down direction is set to be thicker than the length (thickness) of the head of each of the externally threaded fasteners B in the up-down direction. As a result, when the step 57 is provided on the step support 711b, the step 57 is prevented from interfering with the heads of the externally threaded fasteners B (the step 57 is prevented from lifting).

Figure 14:
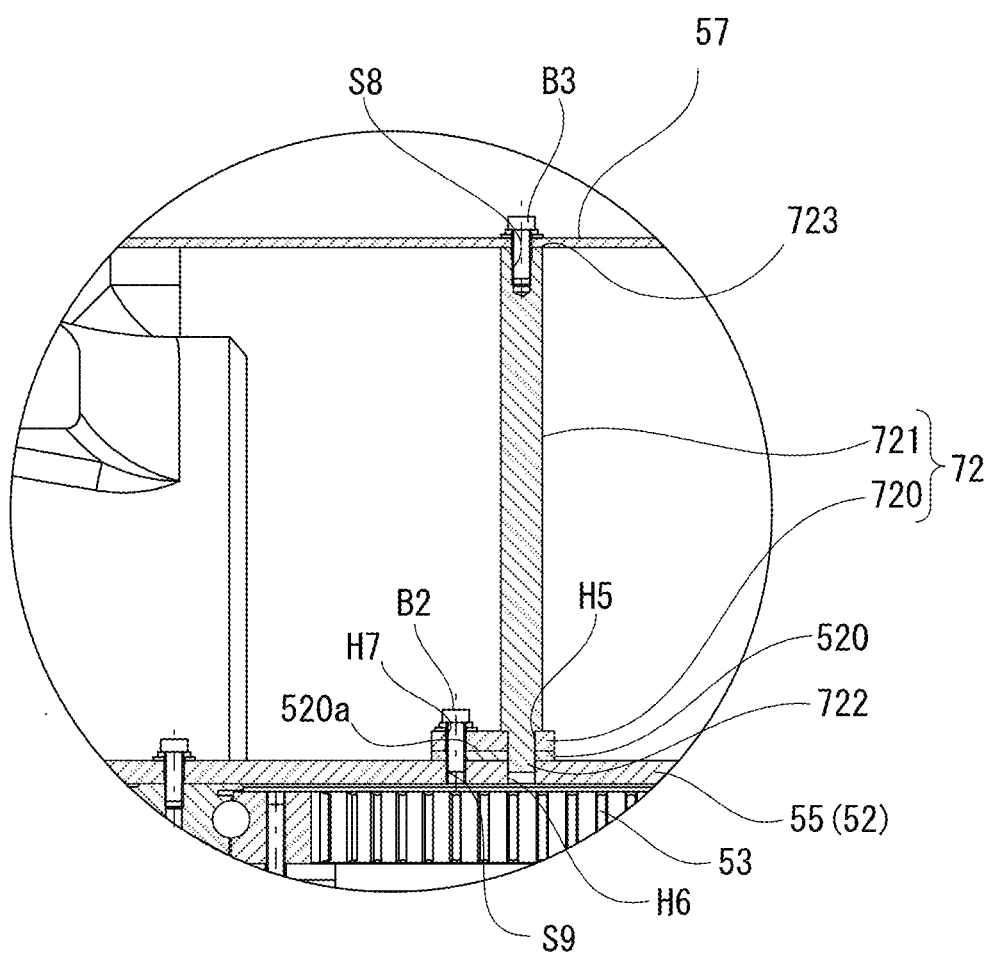
FIG. 14 is a partially enlarged cross-sectional view including a support member (a third support member) of the working machine according to the first example embodiment.

As illustrated in FIG. 14, the third support members (support members) 72 are attached to the base plate 55 via threaded fasteners B2. More specifically, each of the third support members (support members) 72 includes a base 720 and a pillar portion (a upright portion) 721 and directly or indirectly supports the installed component 57 at an upper end of the pillar portion 721. Each of the bases 720 serves as a fixed portion that is fixed to the base plate 55 via one of the threaded fasteners B2, and each of the pillar portions 721 extends in the up-down direction and has a lower end connected to the corresponding base 720.

Each of the bases 720 is a metal plate and has a through hole H5 formed at a position that is offset (a position that is shifted) toward one end of the base 720 from a center portion of the base 720, and a lower portion of the corresponding pillar portion 721 is inserted into the through hole H5. Each of the bases 720 further has a through hole H7 formed at a position that is offset toward the other end of the base 720 from the center portion, and one of the threaded fasteners B2 is inserted into the through hole H7. The lower portions of the pillar portions 721 are fitted into the through holes H5 of the bases 720, and the periphery of each of the pillar portions 721 is welded to the corresponding base 720 in a state where a lower end portion (a projecting portion 722) projects downward from the lower surface of the corresponding base 720. In the present example embodiment, a bar-shaped member that constitutes each of the pillar portion 721 is a round bar, and a lower portion of each of these bar-shaped members that is inserted into one of the through holes H5 is formed to have a diameter smaller than that of a principal portion of the bar-shaped member. However, the present invention is not limited to this, and each of the projecting portions 722 may have the same diameter as the principal portion of the pillar portion 721.

Support protrusions 520 are provided at the positions where the third support members 72 are provided on the base plate 55 of the swivel base 52. The support protrusions 520 and the base plate 55 have positioning holes H6 to allow the projecting portions 722 to be fitted therein and threaded holes S9 to allow the threaded fasteners B2 to be screwed such that each of the positioning holes H6 passes through the corresponding support protrusion 520 and the base plate 55 in a plate-thickness direction and that each of the threaded holes S9 passes through the corresponding support protrusion 520 and the base plate 55 in the plate-thickness direction. Accordingly, the third support members 72 can be fixed to the base plate 55 by using the threaded fasteners B2, and the projecting portions 722 inserted into the positioning holes H6 can prevent the third support members 72 from rotating, so that the third support members 72 can be attached at a lower cost compared to the case of using a plurality of threaded fasteners. The positioning holes H6 may be through holes or non-through holes (recesses) as long as the projecting portions 722 can be fitted therein.

Upper end surfaces of the third support members 72 serve as placement surfaces 723 on which the step 57 is installed and are each formed in a planar shape that is perpendicular to the centerline thereof. Threaded holes S8 are formed in upper end surfaces (placement surfaces 723) of the pillar portions 721 in the up-down direction, and externally threaded fasteners B3 that are threaded fasteners that fix the step 57 in place are screwed into the crew holes S8.

In the present example embodiment, the step 57 and the operator's seat 50 are arranged at positions shifted to one side (the left side in the drawings) from the center of the swivel base 52 in the transverse direction.

Lower surfaces (the surfaces facing downward) of the bases 720 are surfaces machined to be flat, and their flatness is ensured by this machining process. The support protrusions 520 are metal plate members that are welded to the upper surface of the base plate 55, and upper surfaces of the support protrusions 520 are flat receiving surfaces (surfaces placed on received surfaces of the bases 720) 520a each of which has its flatness ensured by machining. Thus, the third support members 72 can be accurately attached to the base plate 55 without machining the entire upper surface of the base plate 55. However, the support protrusions 520 are not essential, and the third support members 72 may be attached to the upper surface of the base plate 55.

In the up-down direction, the positions of the placement surfaces 700, 712, and 723 of the first, second, and third support members 70, 71, and 72 for placing the step 57 are located on the same (common) imaginary plane. In a space (an accommodation space) formed between the step 57 and the swivel base 52 (base plate 55), a hydraulic hose, valves, and the like constituting a hydraulic circuit are arranged. An open portion of the accommodation space that is located on the side of the machine body 5 is covered with a cover 12 that is an exterior of the working machine 1 (see FIG. 1 and FIG. 5). In the working machine 1, a partition wall that isolates the first arrangement region A1 and the second arrangement region A2 from each other is vertically provided on the rear side of the accommodation space in the longitudinal direction.

Figure 15:
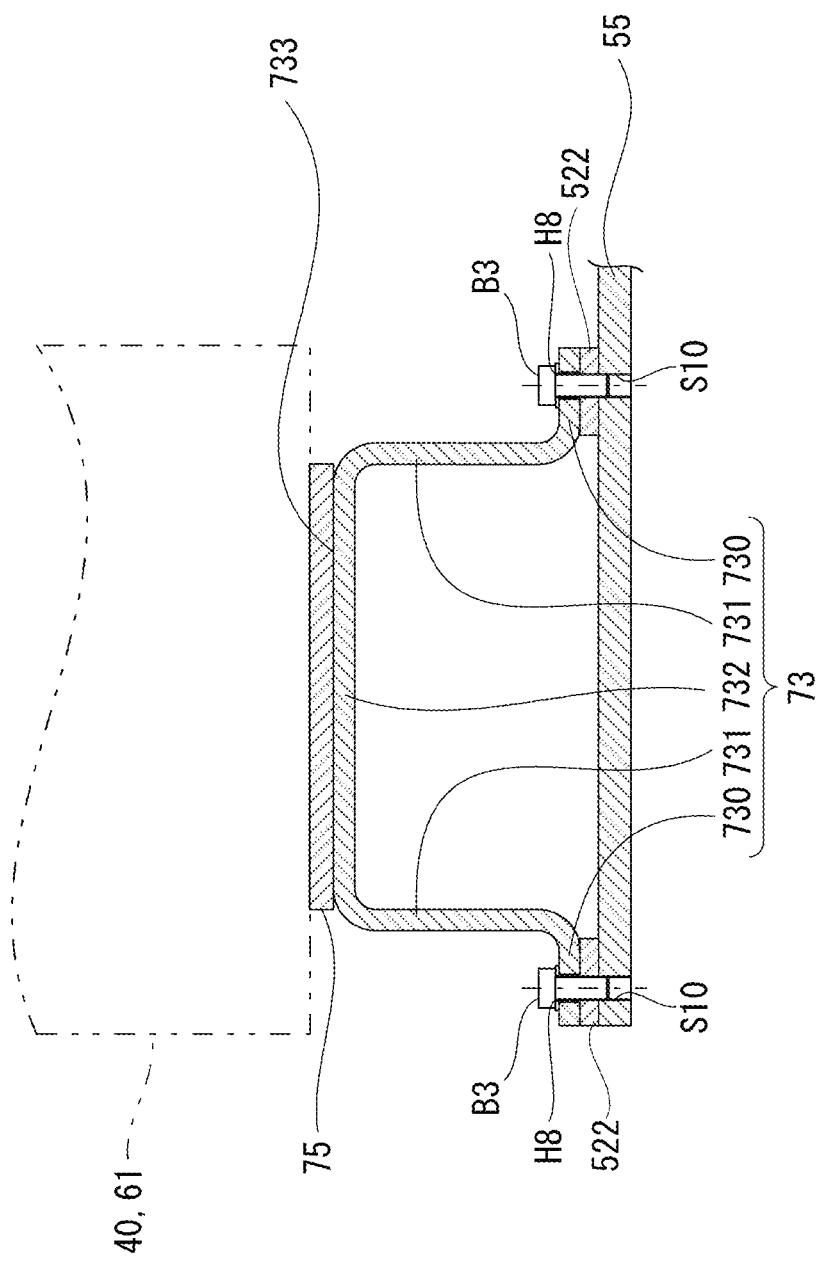
FIG. 15 is a partially enlarged cross-sectional view including a support member (a fourth support member) of the working machine according to the first example embodiment.
Figure 16:
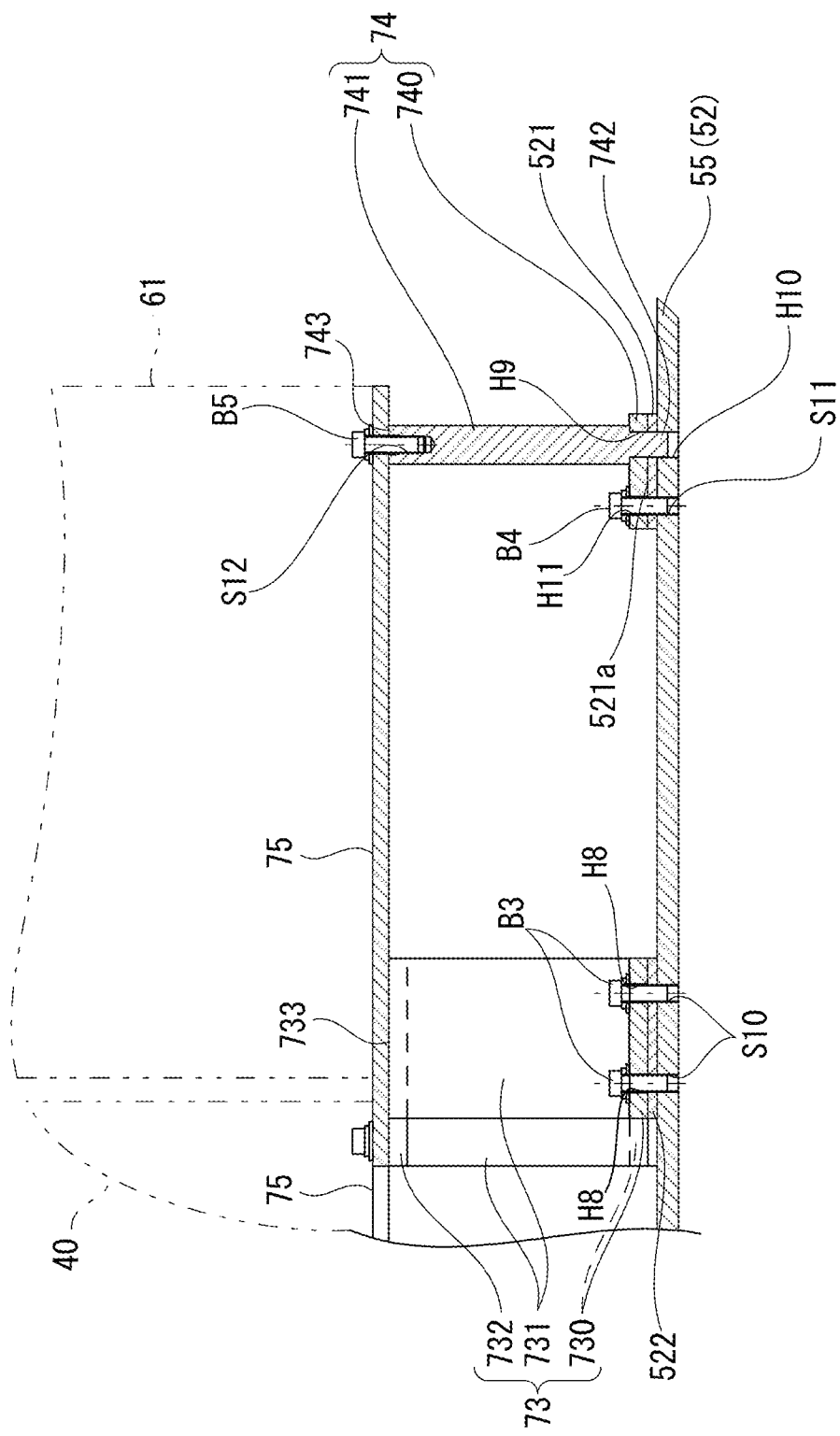
FIG. 16 is a partially enlarged cross-sectional view including support members (the fourth support member and a fifth support member) of the working machine according to the first example embodiment.

As illustrated in FIGS. 15 and 16, each of the fourth support members 73 includes a pair of fixed portions 730, a pair of upright portions 731, and a coupling portion 732. The pair of fixed portions 730 are arranged so as to be spaced apart from each other in the horizontal direction. The pair of upright portions 731 have lower ends connected one each to the pair of fixed portions 730 and extend substantially vertically from the pair of fixed portions 730 so as to be in an upright position. The coupling portion 732 connects upper ends of the pair of upright portions 731 to each other. Upper surfaces of the coupling portions 732 of the fourth support members 73 are placement surfaces 733 that are formed in a planar shape substantially parallel to the base plate 55 and on which the fuel tank 40 and the hydraulic fluid tank 61 are installed. The coupling portion 732 (placement surface 733) has threaded hole(s) therein in the up-down direction, and externally threaded fastener(s) to fix the fuel tank 40 and the hydraulic fluid tank 61 are screwed into the threaded hole(s). In the present example embodiment, each of the fourth support members 73 is formed by bending a single metal plate. The pair of fixed portions 730 extend outward from lower end portions of the pair of upright portions 731 in directions away from each other (outward along the direction in which the pair of upright portions 731 face each other).

The pair of fixed portions 730 have through holes H8 for insertion of the externally threaded fasteners B3 (which are threaded fasteners) to fix the fourth support member 73 to the base plate 55. In the present example embodiment, each of the fixed portions 730 has a plurality of through holes H8. In each fixed portion 730, the plurality of through holes H8 are arranged so as to be spaced apart from each other in a direction along the plate surface of the corresponding upright portion 731.

Support protrusions 522 are provided at the positions where the fixed portions 730 are arranged on the base plate 55, and upper surfaces of the support protrusions 522 have been machined (the flatness thereof is ensured). In the support protrusions 522 and the base plate 55, threaded holes S10 are provided at positions that correspond to the through holes H8 of the fixed portions 730. Accordingly, the externally threaded fasteners B3 are inserted into the through holes H8 of the fixed portions 730 and are screwed into the support protrusions 522 and the threaded holes S10 of the base plate 55, so that the fourth support members 73 are fixed to the base plate 55.

As illustrated in FIG. 16, each of the fifth support members 74 has the same configuration as each of the third support members 72. In other words, each of the fifth support members 74 includes a base 740 that serves as a fixed portion that is attached to an placement surface 521a of one of support protrusions 521, which are provided on the base plate 55, a pillar portion 741 that extends in an upright position from the base 740, and an placement surface 743 that is formed at an upper surface of the pillar portion 741 and on which one of support plates 75 each of which has a flat plate-like shape is installed. The placement surfaces 743 each have a threaded hole S12 formed therein in the up-down direction. Externally threaded fasteners B5 that fix the support plate 75 in place are screwed into the threaded holes S12.

Lower portions of the pillar portions 741 are fitted into through holes H9 that are formed in the bases 740, and the periphery of each of the pillar portions 741 is welded to the corresponding base 740 in a state where a lower end portion (a projecting portion 742) projects downward from the lower surface of the corresponding base 740. Each of the bases 740 is a metal plate and has one of the through holes H9 formed at a position that is offset toward one end of the base 740 from a center portion of the base 740, and a lower portion of the corresponding pillar portion 741 is inserted into the through hole H9. Each of the bases 740 further has a through hole H11 formed at a position that is offset toward the other end of the base 740 from the center portion, and a threaded fastener B4 is inserted into the through hole H11.

The support protrusions 521 are provided at the positions where the fifth support members 74 are arranged on the base plate 55 of the swivel base 52. Positioning holes H10 into which the projecting portions 742 are fitted and threaded holes S11 into which the threaded fasteners B4 are screwed are formed in the support protrusions 521 and the base plate 55 such that the positioning holes H10 of the support protrusions 521 and the positioning holes H10 of the base plate 55 communicate with each other in the plate-thickness directions of the support protrusions 521 and the base plate 55 and such that the threaded holes S11 of the support protrusions 521 and the threaded holes S11 of the base plate 55 communicate with each other in the plate-thickness directions. The placement surfaces 521a of the support protrusions 521 and the lower surfaces of the bases 740 are surfaces machined to be flat.

The heightwise positions of the placement surfaces 733 and 743 of the fourth and fifth support members 73 and 74, on which the support plates 75 are arranged, are located on the same (common) imaginary plane.

In the present example embodiment, as illustrated in FIG. 9, the plurality of (two) fourth support members 73 are arranged so as to be spaced apart from each other in the longitudinal direction, and the fifth support members 74 are arranged behind the rear one of the plurality of (two) fourth support members 73 so as to be spaced apart from the rear fourth support member 73. As illustrated in FIG. 10, FIG. 11, FIG. 15, and FIG. 16, the working machine 1 includes, as the support plates 75, the front support plate 75 that is provided so as to extend across the plurality of fourth support members 73 and the rear support plate 75 that is provided so as to extend across the rear fourth support member 73 and the fifth support members 74. The fuel tank 40 is supported on the front support plate 75, and the hydraulic fluid tank 61 is supported on the rear support plate 75.

In the present example embodiment, another installed component (the swing cylinder 36a or the like in the present example embodiment) that is provided on the base plate 55 is positioned between the swivel base 52 (the base plate 55) and the support plates 75 or the coupling portion 732 (see FIG. 9).

The operator's seat (a seat for sitting) 50, operation equipment, and the like are arranged on the step 57, and the operator's seat protector 54 covers the surroundings of the operator's seat 50 and other components. In other words, the operator's seat protector 54 defines, together with the step 57, the operator's cab DR in which the operator's seat 50 and other components are arranged.

In the operator's cab DR, the operator's seat 50 is provided at the rear on the step 57, and the operation equipment is provided in the vicinity of the operator's seat 50.

The operator's seat protector 54 according to the present example embodiment is a so-called cabin, and as illustrated in FIG. 4 and FIG. 5, it includes a roof 540 constituting an upper portion of the operator's cab DR and wall portions 541, 542, 543, and 544 covering the front, rear, left, and right of the operator's seat 50. In other words, the operator's seat protector 54 includes wall portions that isolate the inside and the outside of the operator's cab DR from each other. The operator's seat protector (cabin) 54 of the present example embodiment includes, as the wall portions, the front window 541 positioned at the front, the rear window 542 positioned at the rear, the entry door 543 and the side window 544 positioned on the one side in the transverse direction, and another side window (not illustrated) on the other side in the transverse direction. A partition wall 9 (described later) is provided at a lower rear portion of the operator's cab DR to separate the operator's cab DR from a prime mover chamber in which the prime mover 4 is provided.

Figure 17:
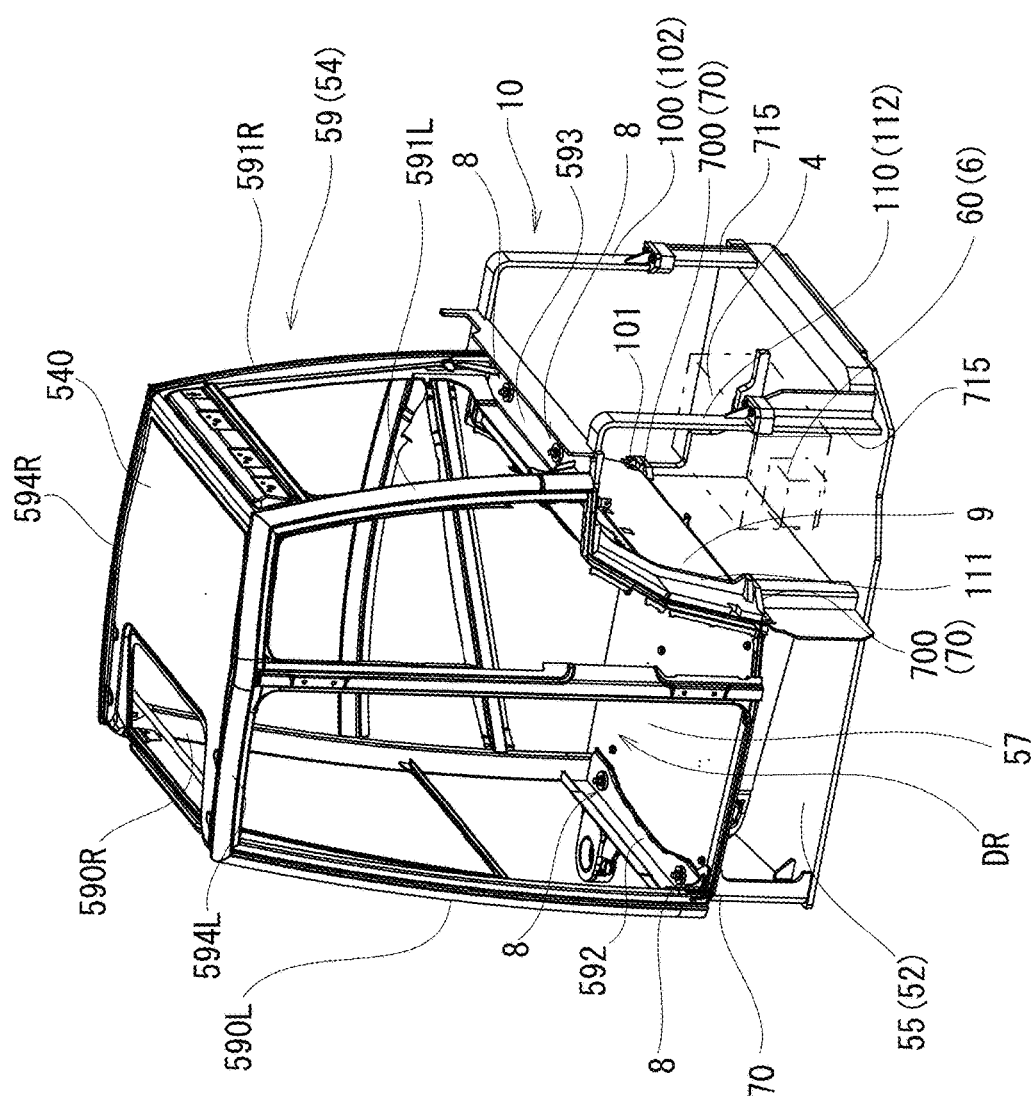
FIG. 17 is a partial perspective view of the operator's seat protector of the working machine according to the first example embodiment, illustrated with its exterior removed.

As illustrated in FIG. 17, the operator's seat protector 54 includes the roof 540 provided above the operator's seat 50 and the frame 59 supporting the roof 540. In other words, the operator's seat protector 54 includes the frame 59 that is a framework for supporting the roof 540 and a window frame and protecting the inside of the operator's cab DR at the time of collision or rollover. A left front portion of the frame 59 is supported in a vibration-isolating manner on the first support member 70 that is attached to a left front portion of the base plate 55 with a vibration isolation mount (a vibration isolation mechanism) 8. A right front portion of the frame 59 is supported in a vibration-isolating manner on the protector support 711a of the second support member 71 with another vibration isolation mount (vibration isolation mechanism) 8. A left rear portion and a right rear portion of the frame 59 are each supported in a vibration-isolating manner on the support frame 10 (described later) with another vibration isolation mount (vibration isolation mechanism) 8. As a result, the operator's seat protector 54 is entirely supported by the swivel base 52.

The frame 59 according to the present example embodiment is formed as a framework by assembling a plurality of members. The frame 59 includes pillars 590R, 590L, 591R, and 591L each extending in the up-down direction. More specifically, the frame 59 includes the four pillars 590R, 590L, 591R, and 591L as serving pillars extending in the up-down direction at four positions, which are front, rear, left, and right positions. In other words, the frame 59 includes the pair of front pillars 590R and 590L that are arranged on the front side in the longitudinal direction so as to be spaced apart from each other in the transverse direction, the pair of rear pillars 591R and 591L that are arranged on the rear side in the longitudinal direction so as to be spaced apart from each other in the transverse direction, a front fixed portion 592 that is coupled to lower ends of the pair of front pillars 590R and 590L in order to couple the pair of front pillars 590R and 590L to the swivel base 52, and a rear fixed portion 593 that is coupled to lower ends of the pair of rear pillars 591R and 591L so as to couple the pair of rear pillars 591R and 591L to the swivel base 52.

In the present example embodiment, the frame 59 includes a pair of side frames 594R and 594L. The side frame 594R connects an upper end of the front pillar 590R and an upper end of the rear pillar 591R to each other, and The side frame 594L connects an upper end of the front pillar 590L and an upper end of the rear pillar 591L to each other.

As described above, the front fixed portion 592 is coupled to the lower ends of the front pillars 590R and 590L. In the present example embodiment, the front fixed portion 592 extends in the transverse direction and is provided so as to overlap a front end portion of the upper surface of the step 57. In the present example embodiment, the length of the front fixed portion 592 is set such as the front fixed portion 592 extends across the pair of front pillars 590R and 590L, and the lower ends of the pair of front pillars 590R and 590L are coupled to each other. In other words, the lower ends of the pair of front pillars 590R and 590L are coupled to the common (same) front fixed portion 592.

In the present example embodiment, the front fixed portion 592 is formed in a plate-like shape. As illustrated in FIG. 18, through holes H12 are formed in the front fixed portion 592, and the externally threaded fasteners 82 that are to be fixed (coupled) to the swivel base 52 are inserted into the through holes H12. In the present example embodiment, the working machine 1 includes vibration isolation mechanisms 8 for suppressing vibration of the frame 59. As illustrated in FIG. 17, the vibration isolation mechanisms 8 for the front fixed portion 592 are provided at two positions spaced apart from each other in the transverse direction. Accordingly, the through holes H12 of the front fixed portion 592 are provided at two positions spaced apart from each other in the transverse direction.

More specifically, the front fixed portion 592 is coupled to the first support members 70 and the second support member 71 that support the step 57. Accordingly, as illustrated in FIG. 18, the step 57 has a hole-shaped or cutout-shaped relief portion 570 that is provided at a position corresponding to the protector support 711a. In other words, in the step 57, the relief portion 570 extends through the step 57 in the up-down direction and is provided at a position that avoids the position where the step 57 is fixed in place and that corresponds to the position where the front fixed portion 592 is fixed in place. In the present example embodiment, the relief portion 570 is formed in the shape of a round hole. Accordingly, in the present example embodiment, the relief portion 570 is referred to as a "relief hole". The relief portion 570 is not limited to being formed in the shape of a round hole and may have a cutout shape that is open at an end edge of the step 57.

The frame 59 is directly or indirectly supported by the protector support 711a via the relief portion 570. In the present example embodiment, the frame 59 (operator's seat protector 54) is fixed to the swivel base 52 via the vibration isolation mechanism 8 that is provided in the relief portion 570. Here, the vibration isolation mechanism 8 that is interposed between the front fixed portion 592 and the second support member 71 will be described as an example. The vibration isolation mechanism 8 is interposed between the protector support 711a and the frame 59. The vibration isolation mechanism 8 according to the present example embodiment includes an elastic member 80 for vibration isolation that is provided between the protector support 711a and the frame 59. The elastic member 80 is provided in the relief portion 570 of the step 57.

More specifically, the vibration isolation mechanism 8 includes the elastic member 80 that is interposed between the second support member 71, which is fixed to the swivel base 52, and the front fixed portion 592 and that has a through hole 800 extending therethrough in the up-down direction, a collar 81 that has a cylindrical shape and that is inserted into the through hole 800 of the elastic member 80, one of the externally threaded fastener 82 that is inserted into the collar 81 and that passes through a corresponding one of the through holes H12 of the front fixed portion 592 in the up-down direction, while being secured against coming off from the second support member 71, and one of internal thread members 83 that is screwed onto the externally threaded fastener 82 and that applies a compressive force to the elastic member 80 positioned between the placement surface 712 of the second support member 71 and the front fixed portion 592.

In the vibration isolation mechanism 8 illustrated in FIG. 18, the through hole H12 of the front fixed portion 592 has a diameter larger than the outer diameter of the collar 81 and is formed to allow the collar 81 to be loosely inserted therein. Accordingly, the elastic member 80 has a larger-diameter portion 80a whose diameter is set to be larger than the through hole H12 of the front fixed portion 592 and that is provided between the front fixed portion 592 and the support member (second support member) 71 and a smaller-diameter portion 80b that projects from an upper surface of the larger-diameter portion 80a while being positioned concentrically with the larger-diameter portion 80a and that can be fitted into the through hole H12 of the front fixed portion 592. The through hole 800 of the elastic member 80 passes through the center (middle) of the larger-diameter portion 80a and the center (middle) of the smaller-diameter portion 80b. In the present example embodiment, the smaller-diameter portion 80b extends through the through hole H12 of the front fixed portion 592 and projects from the upper surface of the front fixed portion 592.

In the present example embodiment, each of the externally threaded fasteners 82 is a so-called stud bolt (cut-to-size bolt) a so-called stud bolt (partially threaded bolt) that has a screw thread along its entire length. Accordingly, one end portion of the externally threaded fastener 82 is screwed into the threaded hole S6 of the second support member 71. As a result, the other end portion of the externally threaded fastener 82 is located upward, and the externally threaded fastener 82 stands upright perpendicular or substantially perpendicular to the upper surface (placement surface 712) of the support main body 711. In the present example embodiment, the other end portion of the externally threaded fastener 82 extends through the second support member 71 to be exposed at the lower surface of the second support member 71. A locking nut 85 is screwed onto the other end portion of the externally threaded fastener 82.

Based on the premise that each of the vibration isolation mechanisms 8 according to the present example embodiment has the above-described configuration, the vibration isolation mechanism 8 includes a pressing member 84 for transmitting an axial force that is generated in the externally threaded fastener 82 due to the engagement of the internal thread member 83 and the externally threaded fastener 82 to the elastic member 80. The pressing member 84 is a member that is provided on the side on which the upper surface of the front fixed portion 592 is present, and the pressing member 84 has a through hole 840a into which the externally threaded fastener 82 is inserted.

More specifically, the pressing member 84 includes a plate portion 840 that is made of a metal and that has rigidity. The plate portion 840 is a doughnut-shaped when viewed in plan view and has a through hole into which the externally threaded fastener 82 is inserted. Accordingly, when the internal thread member 83 is screwed onto the externally threaded fastener 82, which is inserted into the through hole of the plate portion 840, the internal thread member 83 pushes the plate portion 840 downward (toward the front fixed portion 592) and applies a compressive force to the elastic member 80.

In the present example embodiment, the pressing member 84 includes a pressing elastic member 841 that is provided on a lower surface side of the plate portion 840. Similar to the plate portion 840, the pressing elastic member 841 is doughnut-shaped when viewed in plan view and has a through hole into which the externally threaded fastener 82 is inserted. The pressing member 84 further includes a positioning collar 842 that has a cylindrical shape projecting downward from the lower surface of the plate portion 840.

In the present example embodiment, the through hole 840a of the pressing member 84 is formed by the continuous connection of the through hole of the plate portion 840 and an inner hole of the positioning collar 842. The positioning collar 842 has an inner diameter and an outer diameter that are equal or substantially equal to those of the above-mentioned collar 81, and the inner diameter is set to be larger than the hole diameter of the through hole of the plate portion 840. Accordingly, the positioning collar 842 is inserted into the through hole in a state where the pressing elastic member 841 overlaps the lower surface of the plate portion 840. The thickness (the length in the up-down direction) of the pressing elastic member 841 is set to be thicker (longer) than the length of the positioning collar 842 in the same direction.

By tightening the internal thread member 83, the plate portion 840 of the pressing member 84 is pushed downward, pressing the front fixed portion 592 and the elastic member 80 downward through the pressing elastic member 841. At this time, the elastic deformation (elastic force) of the pressing elastic member 841 also acts. In the pressing member 84 according to the present example embodiment, in a state where the plate portion 840 has been moved downward by a predetermined distance (a state where a predetermined pressing force acts on the front fixed portion 592 and the elastic member 80) as a result of tightening the internal thread member 83, the positioning collar 842 comes into contact (interferes) with the collar 81, restricting further downward movement. This prevents the pressing member 84 from being pushed downward beyond a specified value, facilitating easier torque management.

In the present example embodiment, the front fixed portion 592 is fixed to the swivel base 52 at two positions that are spaced apart from each other in the transverse direction, and the vibration isolation mechanisms 8 each having the above-described configuration are arranged at these fixing positions (support positions). The rear fixed portion 593 is also fixed to the swivel base 52 at two positions that are spaced apart from each other in the transverse direction, and the vibration isolation mechanisms 8 each having the above-described configuration are arranged at these fixing positions (support positions). Since the above description is on the assumption that the front fixed portion 592 is coupled to the second support member 71, the object to be fixed (coupled) is the second support member 71, and the same applies to the case where the front fixed portion 592 is coupled to the first support members 70.

As illustrated in FIG. 17, the rear fixed portion 593 is provided at a position higher than the front fixed portion 592. Thus, the rear fixed portion 593 is coupled to the support frame 10 that is fixed to the upper surface of the base plate 55 and that supports the rear fixed portion 593 at a predetermined height. Thus, the above description of the vibration isolation mechanism 8 becomes a description of the fixation (coupling) of the front fixed portion 592 to the first support members 70 or the fixation (coupling) of the rear fixed portion 593 to the support frame 10 by substituting the support member (second support member) 71 with the first support members 70 or the support frame 10.

Returning to FIG. 4, as described above, the operator's seat 50 is provided at the rearmost position in the operator's cab DR (space) in the operator's seat protector 54. In other words, the operator's seat 50 is provided in front of the rear fixed portion 593 of the frame 59. More specifically, the operator's seat 50 includes a seat portion having a seat surface on which an operator sits and a backrest on which the operator sitting on the seat portion (seat surface) leans, and when viewed in plan view, the operator's seat 50 is fixed to the step 57 such that the seat surface is positioned in a region located rearward of the center of step 57 in the longitudinal direction. The seat surface and the backrest of the operator's seat 50 are slidable in the longitudinal direction, and the backrest is tiltable (reclinable). As a result, the backrest of the operator's seat 50 is located forward of the rear end of the step 57 in the longitudinal direction but is maintained at a position that is located forward of the rear fixed portion 593.

The guard member 58 is a protective member that is made of a metal and is provided for protecting the operator's seat protector 54 (particularly, the front window 541) from an operation of the working device 3 and from flying objects scattered during the work performed by the working device 3. Accordingly, the guard member 58 is provided in front of the front window 541 so as to overlap the entire surface of the front window 541. Accordingly, the guard member 58 is configured such that the situation ahead can be visually recognized from the operator's seat 50 (operator's cab DR). In other words, the guard member 58 is formed in a lattice pattern or a grid pattern. In the present example embodiment, the guard member 58 is formed in a grid pattern.

The prime mover 4 is located rearward of the step 57 and the operator's seat 50 (obliquely downward and rearward of the seat surface).

The working machine 1 includes the partition wall 9 that isolates the operator's cab DR (the region where the operator's seat 50 is provided) from the region where the prime mover 4 is provided (the prime mover chamber). As illustrated in FIG. 11 and FIG. 17, the partition wall 9 is attached to a rear portion of the operator's seat protector 54 and a front portion of the support frame 10, which supports equipment and the like arranged at a rear portion of the machine body 5.

Figure 19:
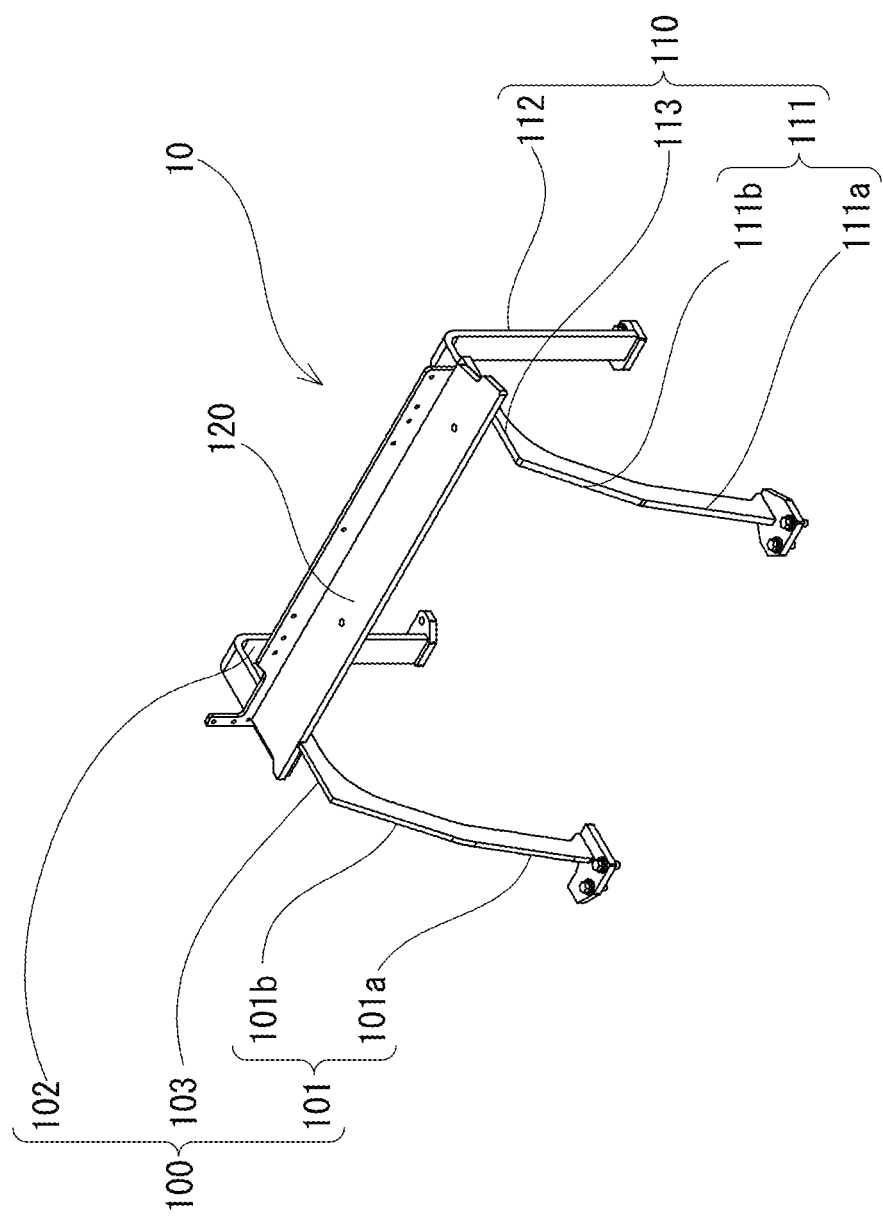
FIG. 19 is a schematic overall perspective view of a support frame of the working machine according to the first example embodiment.

As illustrated in FIG. 19, the support frame 10 includes a pair of support legs 100 and 110 that are arranged so as to be spaced apart from each other in the transverse direction and a leg coupling portion 120 that couples the support legs 100 and 110 to each other.

The pair of support legs 100 and 110 include front leg portions 101 and 111 arranged at the front, rear leg portions 102 and 112 arranged behind the front leg portions 101 and 111, and beam portions 103 and 113 extending in the longitudinal direction and coupling the front leg portions 101 and 111 to the rear leg portions 102 and 112, respectively.

The lower ends of the front leg portions 101 and 111 are attached one each to the first support members 70 and 70, which are vertically provided on the base plate 55. The front leg portions 101 and 111 include first inclined portions 101a and 111a that are slightly inclined rearward as they extend upward and second inclined portions 101b and 111b that are connected to the upper ends of the first inclined portions 101a and 111a, respectively, and that are inclined rearward as they extend upward at an inclination angle larger than that of the first inclined portions 101a and 111a. Lower end portions of the front leg portions 101 and 111 are coupled to and supported by the two first support members 70, which support the left rear corner and the right rear corner of the step 57, respectively.

The lower ends of the rear leg portions 102 and 112 are connected one each to the rear-end support members 715 and 715, which are vertically provided on a rear end portion of the base plate 55, and the rear leg portions 102 and 112 extend in the up-down direction (a direction substantially perpendicular to the swivel base 52 (base plate 55)). Lower end portions of the rear leg portions 102 and 112 are coupled to and supported by the rear-end support members 715 and 715, which are vertically provided on the rear end portion of the base plate 55, respectively.

The front ends of the beam portions 103 and 113 are connected one each to the upper ends of the second inclined portions 101b and 111b, and the beam portions 103 and 113 extend rearward in a substantially horizontal direction. The rear ends of the beam portions 103 and 113 are connected one each to the upper ends of the rear leg portions 102 and 112.

The height of each of the pair of support legs 100 and 110 in the up-down direction is set to be substantially the same as the height of a corresponding one of the beam portions 103 and 113.

One end of the leg coupling portion 120 is coupled to the beam portion 103 of the support leg 100, and the other end of the leg coupling portion 120 is coupled to the beam portion 113 of the support leg 110 while the leg coupling portion 120 extends in the horizontal direction.

The rear fixed portion 593 of the frame 59 is coupled to the leg coupling portion 120 of the support frame 10 with the vibration isolation mechanism 8 interposed therebetween. As described above, the coupling configuration between the rear fixed portion 593 and the leg coupling portion 120, which is to be coupled to the rear fixed portion 593, is similar to the coupling configuration between the front fixed portion 592 and the second support member 71. In other words, in the vibration isolation mechanism 8 for the rear fixed portion 593, the externally threaded fastener (stud bolt) 82 is screwed into the leg coupling portion 120 so as to stand upright perpendicular or substantially perpendicular to the upper surface (placement surface) of the leg coupling portion 120 with the other end portion thereof positioned upward, and based on this, the elastic member 80, the pressing member 84, and the like are incorporated onto the leg coupling portion 120. In the vibration isolation mechanism 8 that is provided on the first support member 70 supporting the left front of the step 57, the externally threaded fastener (stud bolt) 82 is screwed into the threaded hole S5 so as to stand upright perpendicular or substantially perpendicular to the upper surface (placement surface) of the placement surface 700 with the other end portion thereof positioned upward, and based on this, the elastic member 80, the pressing member 84, and the like are incorporated onto the leg coupling portion 120.

Figure 20:
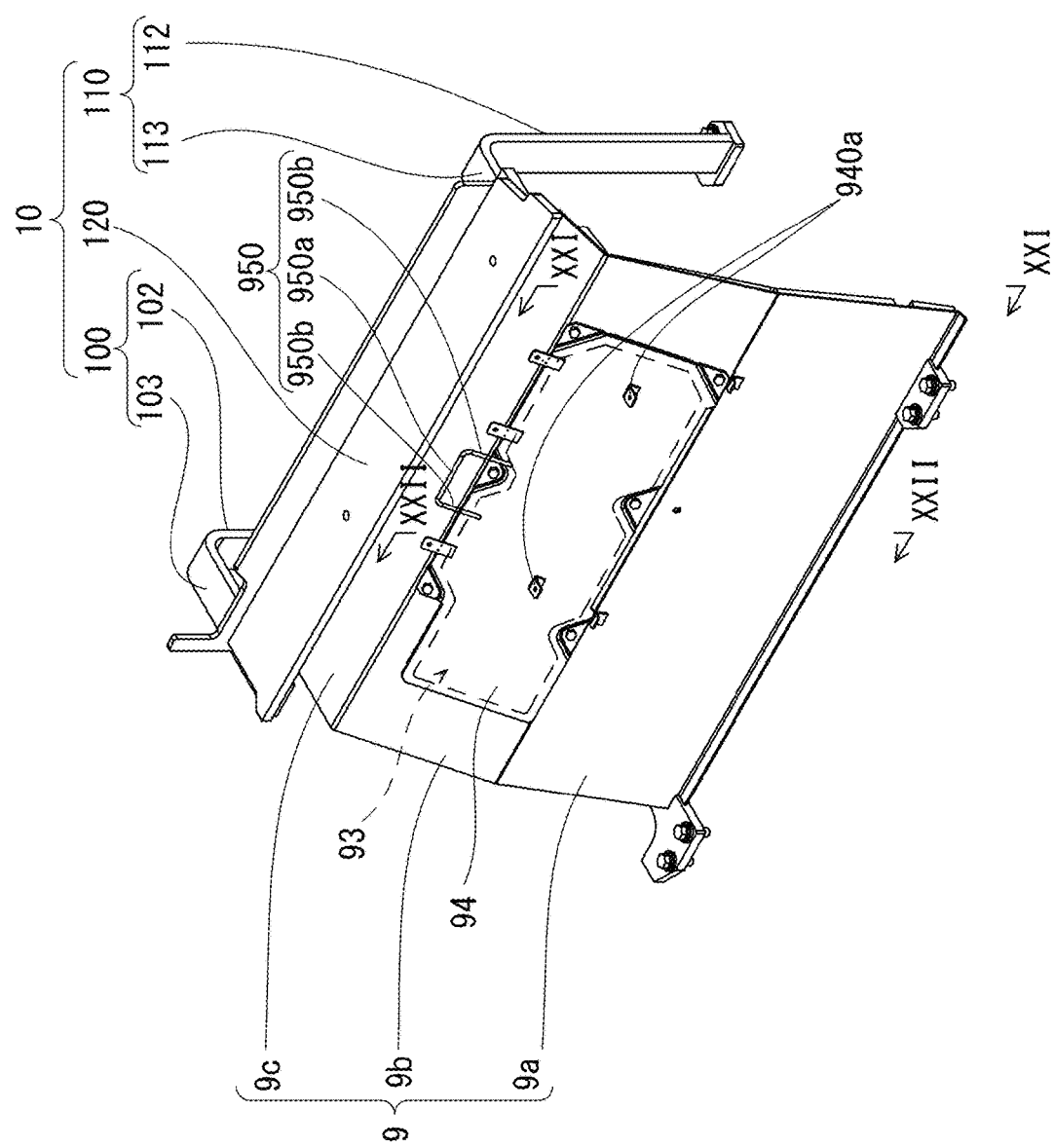
FIG. 20 is an overall perspective view of a partition wall of the working machine according to the first example embodiment.

As illustrated in FIG. 20, the partition wall 9 is positioned so as to close (block) the space between the pair of support legs 100 and 110, which are included in the support frame 10, and is attached to the pair of support legs 100 and 110. More specifically, the partition wall 9 includes a first inclined partition wall portion 9a, a second inclined partition wall portion 9b, and a ceiling partition wall portion 9c. The first inclined partition wall portion 9a covers a region between the first inclined portions 101a and 111a of the support legs 100 and 110. The second inclined partition wall portion 9b covers a region between the second inclined portions 101b and 111b of the support legs 100 and 110. The ceiling partition wall portion 9c covers a region in front of the leg coupling portion 120 between the beam portions 103 and 113 of the support legs 100 and 110. The second inclined partition wall portion 9b of the partition wall 9 has an inspection port 93 that allows access from the operator's seat 50 to the prime mover 4 and a closure body 94 that is capable of closing the inspection port 93.

Figure 21:
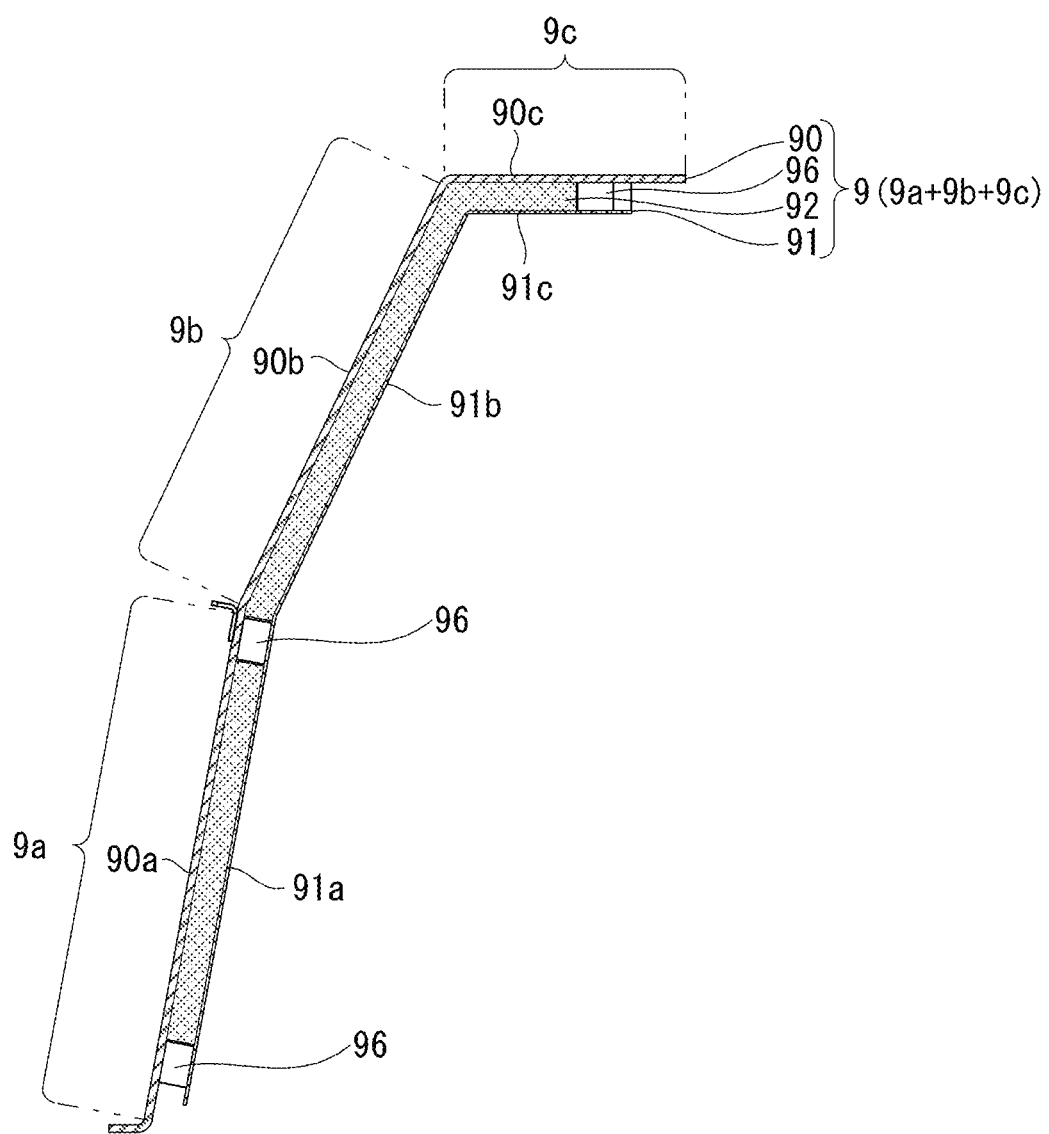
FIG. 21 is a cross-sectional view taken along line XXI-XXI of FIG. 20.

The partition wall 9 is a sound-absorbing wall (soundproof wall) to suppress propagation of sound generated in the prime mover compartment (driving sound of the prime mover 4 and the like) to the operator's cab DR. More specifically, as illustrated in FIG. 21, the partition wall 9 includes a pair of metal plates 90 and 91 (one of the metal plates is hereinafter referred to as the "first metal plate 90", and the other metal plate is hereinafter referred to as the "second metal plate 91"), a sound-absorbing member 92, and spacing members (spacers) 96. The pair of metal plates 90 and 91 are arranged so as to face each other with a space therebetween in a direction from the operator's seat 50 toward the prime mover compartment. The sound-absorbing member 92 and the spacing members (spacers) 96 are arranged between the first metal plate 90 and the second metal plate 91. The partition wall 9 also has a function of suppressing propagation of heat generated in the prime mover compartment to the operator's cab DR.

The metal plates 90 and 91 are each formed by bending a single plate made of a metal, so that the first inclined partition wall portion 9a, the second inclined partition wall portion 9b, and the ceiling partition wall portion 9c are integrally formed. Each of the metal plates 90 and 91 may be formed of a plurality of plates that are integrated with each other by welding or the like or may be divided into a plurality of regions. In the present example embodiment, the second metal plate 91 is formed of a plate thinner than the first metal plate 90.

Figure 22:
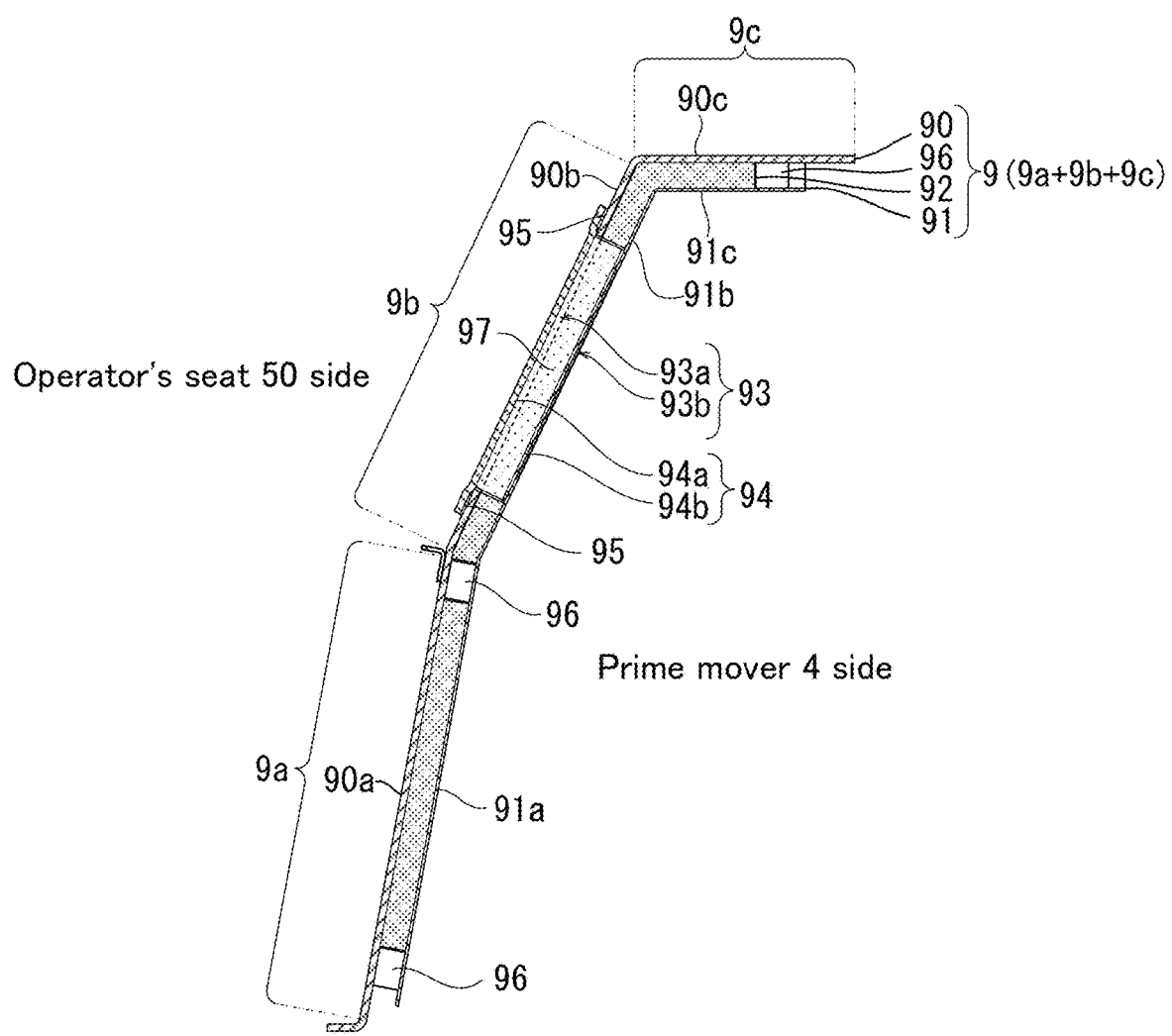
FIG. 22 is a cross-sectional view taken along line XXII-XXII of FIG. 20.

The spacing members 96 are arranged between the first metal plate 90 and the second metal plate 91 so as to maintain a space between the first metal plate 90 and the second metal plate 91 at a predetermined interval. The spacing members 96 are each a prism-shaped member that extends from the side on which the support leg 100 is provided toward the side on which the support leg 110 is provided. In the present example embodiment, as illustrated in FIG. 22, the spacing members 96 are provided at three locations that are an upper portion and a lower portion of the first inclined partition wall portion 9a and a rear portion of the ceiling partition wall portion 9c. In the present example embodiment, the spacing members 96 are fixed to the second metal plate 91 (91a, 91c) by welding. However, the spacing members 96 are not limited to this and may be fixed to the first metal plate 90 or may be fixed to both the first metal plate 90 and the second metal plate 91. The spacing members 96 may function as reinforcing members that reinforce the first metal plate 90 and/or the second metal plate 91.

The partition wall 9 is attached to the support frame 10 by welding or screw fastening in a state where the two side ends of a lower portion 91a of the second metal plate 91 are in tight contact with the front surfaces of the first inclined portions 101a and 111a of the support legs 100 and 110, where the two side ends of a center portion 91b of the second metal plate 91 are in tight contact with the front surfaces of the second inclined portions 101b and 111b of the support legs 100 and 110, and where the two side ends of an upper portion 91c of the second metal plate 91 are in tight contact with the upper surfaces of the beam portions 103 and 113 of the support legs 100 and 110. A portion of the first metal plate 90 and a portion of the second metal plate 91 may be integrated with each other by welding, bolting, or the like, or the first metal plate 90 and the second metal plate 91 may be separately fixed to the support frame 10.

The sound-absorbing member 92 is made of a foamed resin (foamed urethane foam) and is in tight contact with the pair of metal plates 90 and 91 (the first metal plate 90 and the second metal plate 91). However, the material of the sound-absorbing member 92 is not limited to this and may be another foamed resin or may be a material having a sound-absorbing property or a sound-insulating property other than the foamed resin. It is preferable that the sound-absorbing member 92 have a heat insulation property for reducing the propagation of heat from the prime mover compartment to the operator's cab DR.

Figure 23:
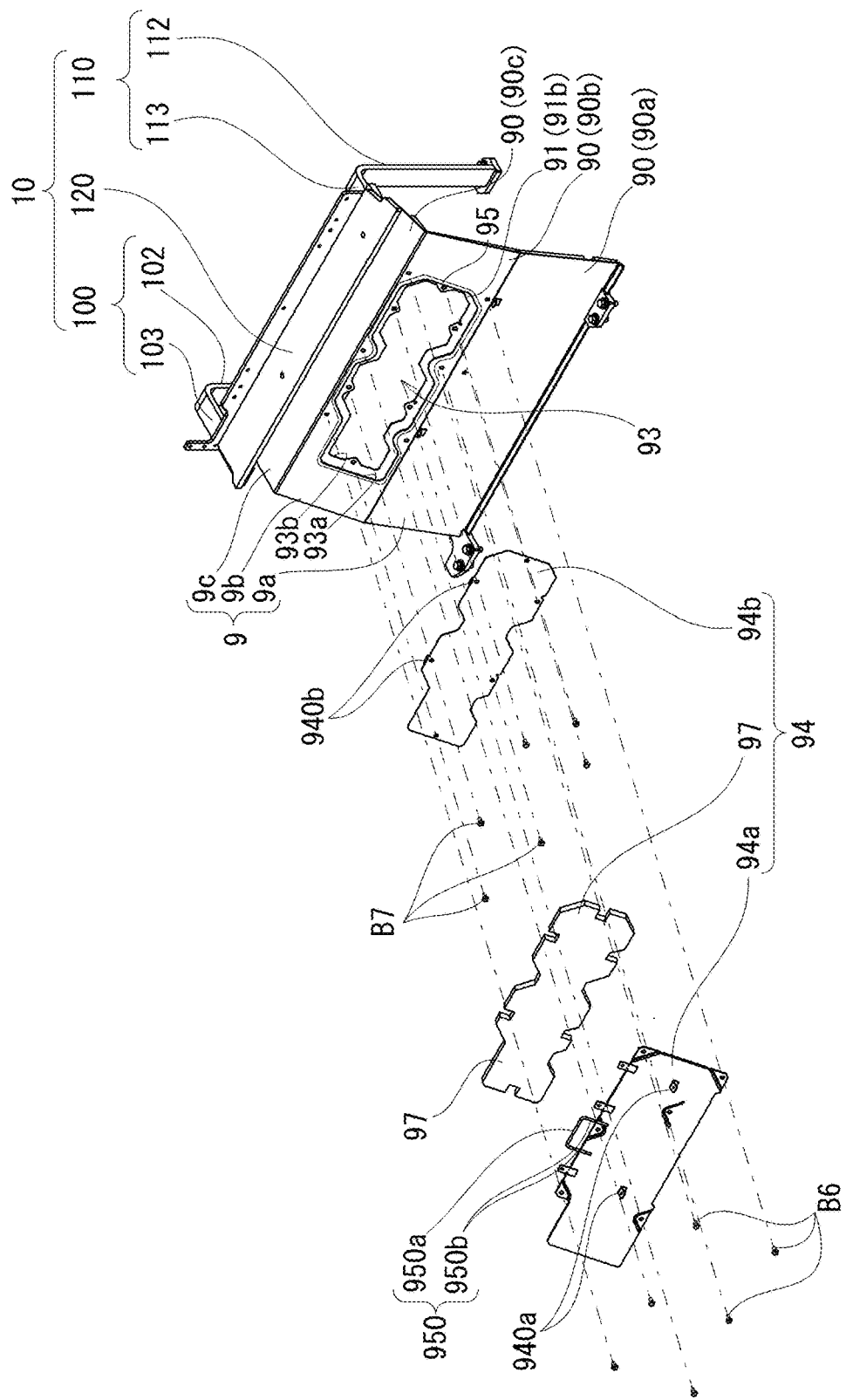
FIG. 23 is a perspective view illustrating a state where a closure body is removed from the partition wall of the working machine according to the first example embodiment.

As illustrated in FIG. 22 and FIG. 23, the inspection port 93 has a first opening 93a formed in the first metal plate 90, which faces the operator's seat 50, and a second opening 93b formed in the second metal plate 91, which faces the prime mover 4, at a position corresponding to the first opening 93a. In the present example embodiment, the opening area of the second opening 93b is slightly smaller than that of the first opening 93a.

The closure body 94 includes a first closure plate 94a and a second closure plate 94b. The first closure plate 94a is made of metal and closes the inspection port 93 such that the first closure plate 94a is placed on a surface, facing the operator's seat 50, of a portion of the first metal plate 90 (90b) that surrounds the first opening 93a. The second closure plate 94b is made of metal and closes the inspection port 93 such that the second closure plate 94b is placed on a surface, facing the operator's seat 50, of a portion of the second metal plate 91 (91b) that surrounds the second opening 93b.

Figure 24:
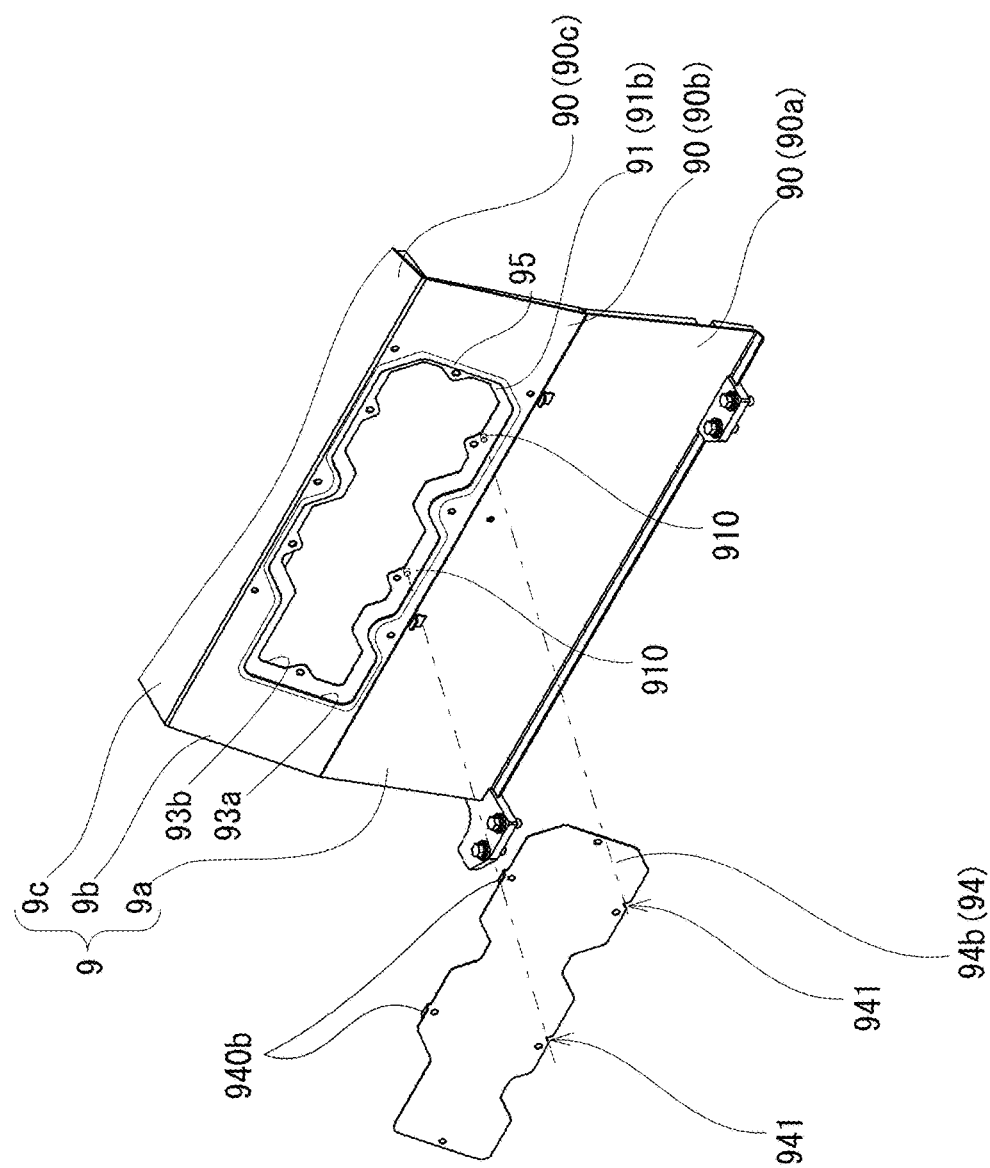
FIG. 24 is a partial perspective view for explaining the relationship between the partition wall and a second closure plate of the working machine according to the first example embodiment.

As illustrated in FIG. 24, a plurality of cylindrical supports 910 that are capable of supporting the second closure plate 94b are provided on the second metal plate 91 so as to project toward the first metal plate 90. A lower end portion of the second closure plate 94b has cutout portions 941 each of which can be fitted into a corresponding one of the supports 910. The shapes and the number of the supports 910 and the cutout portions 941 are not limited to those mentioned above may be any shapes as long as the second closure plate 94b can be supported. The closure body 94 further includes a sound-absorbing member 97 that is interposed between the first closure plate 94a and the second closure plate 94b.

As illustrated in FIG. 23, the first closure plate 94a is provided with grip tabs 940a projecting from it, and the second closure plate 94b is provided with grip tabs 940b projecting from it. The grip tabs 940a of the first closure plate 94a project toward the operator's seat 50 from a surface of the first closure plate 94a, the surface facing the operator's seat 50. In contrast, the grip tabs 940b of the second closure plate 94b project from the upper end of the second closure plate 94b toward the operator's seat 50.

In addition to the grip tabs 940a, a handle 950 that is grippable is attached to the first closure plate 94a. The handle 950 includes extension portions 950b and 950b that extend upward from the upper end of the first closure plate 94a and a gripping portion 950a that couples the upper ends of the extension portions 950b and 950b to each other.

In the present example embodiment, the handle 950 is formed by bending a round bar, and the gripping portion 950a and the extension portions 950b and 950b are continuously integrated with each other. End portions of the extension portions 950b and 950b are fixed (welded in the present example embodiment) to an outer surface of the first closure plate 94a, the outer surface facing the operator's seat 50.

The first closure plate 94a is screw-fastened to the first metal plate 90 via externally threaded fasteners B6. The second closure plate 94b is screw-fastened to the second metal plate 91 via externally threaded fasteners B7. In the present example embodiment, each of the first metal plate 90 and the second metal plate 91 has through holes into which the externally threaded fasteners B6 and B7 are inserted, and nuts (back nuts) that are concentric with the through holes are attached to their surfaces facing the prime mover chamber.

In the present example embodiment, a seal member 95 is interposed between the first closure plate 94a and the first metal plate 90 to fill a gap. The seal member 95 can be made of, for example, a foamed resin, rubber, or the like. In addition, a seal member 98 (or a seal member 95) may be interposed between the second closure plate 94b and the second metal plate 91.

As a material of the sound-absorbing member 97 of the closure body 94, for example, urethane foam can be used. The sound-absorbing member 97 is sandwiched between the first closure plate 94a and the second closure plate 94b and its thickness is set to be thick enough to come into close contact (preferably, pressure contact) with each of the first closure plate 94a and the second closure plate 94b.

The sound-absorbing member 97 of the closure body 94 is formed in a shape that substantially matches the planar shape of the second closure plate 94b and can be fitted into the first opening 93a toward the second metal plate 91. An opening having a shape corresponding to the sound-absorbing member 97 of the closure body 94 is formed in the sound-absorbing member 92 of the partition wall 9 (the sound-absorbing member 92 provided between the first metal plate 90 and the second metal plate 91), and the sound-absorbing member 97 of the closure body 94 is fitted into this opening, so that the sound-absorbing members 92 and 97 are arranged over the entire inner region of the partition wall 9.

The working machine 1 according to the first example embodiment of the present invention is as described above. Next, the working machine 1 according to a second example embodiment of the present invention will be described.

The working machine 1 of the second example embodiment has a configuration the same as that of the working machine 1 of the first example embodiment, except with regard to the partition wall 9. Accordingly, in the following description, detailed explanations regarding components other than the partition wall 9 will be omitted by referencing to the description of the first example embodiment, and only the partition wall 9 and the components necessary for the description of the partition wall 9 will now be described. With reference to the description of the first example embodiment, the same names and the same reference signs as in the first example embodiment will be given to the components that are the same as or equivalent to those described in the first example embodiment. Also in the present example embodiment, the following description is based on the standard posture.

Figure 25:
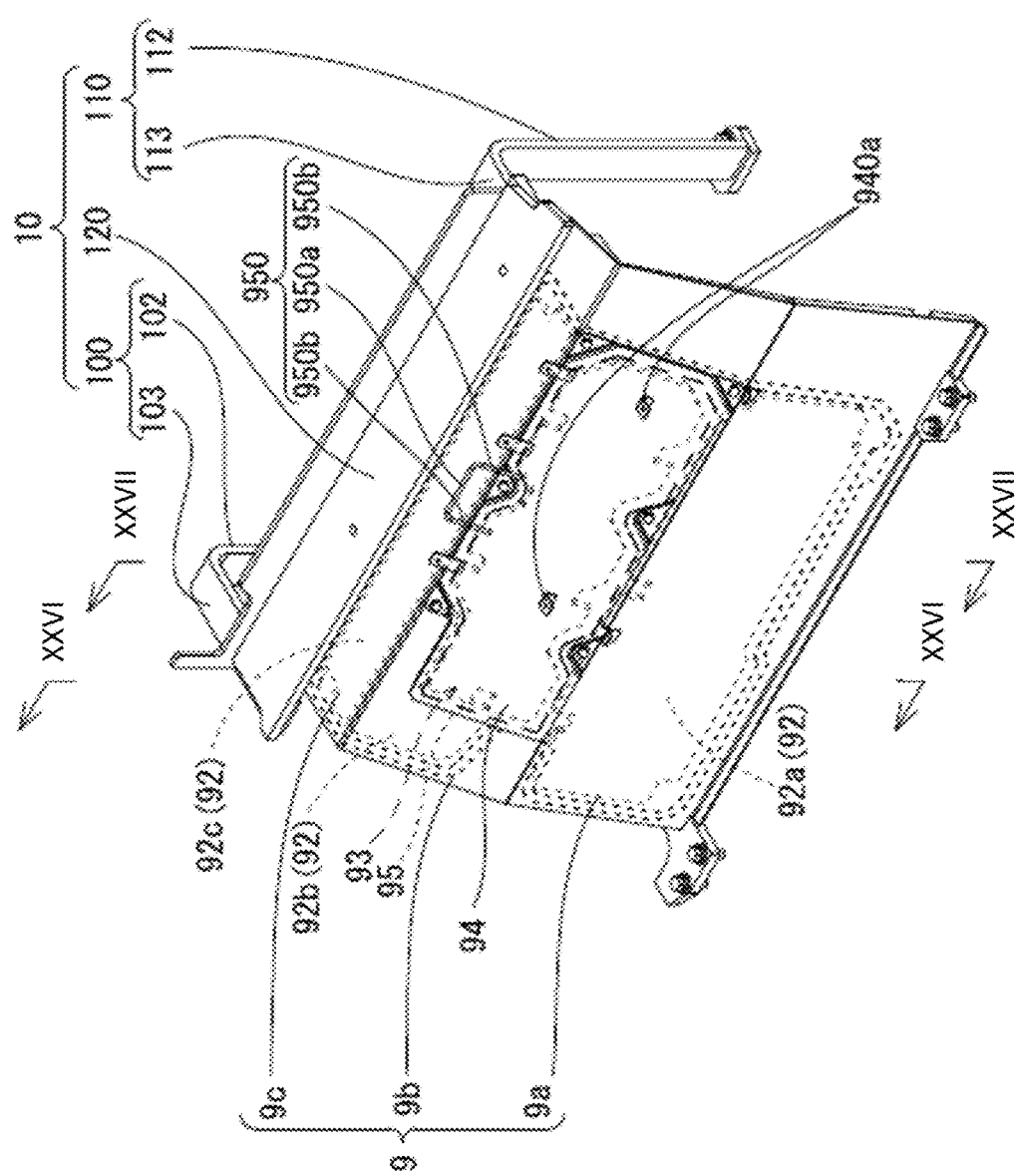
FIG. 25 is an overall perspective view of a partition wall of a working machine according to a second example embodiment of the present invention.

The partition wall 9 is a sound-absorbing wall (soundproof wall) for suppressing propagation of sound generated in the prime mover compartment (driving sound of the prime mover 4 and the like) to the operator's cab DR. Accordingly, the partition wall 9 is provided between the operator's cab DR and the prime mover chamber and isolates the operator's cab DR from the prime mover chamber. More specifically, as illustrated in FIG. 25, the partition wall 9 is provided so as to close (block) the space between the pair of support legs 100 and 110, which are included in the support frame 10, and is attached to the pair of support legs 100 and 110.

The partition wall 9 has a plurality of regions. As in the first example embodiment, the partition wall 9 of the present example embodiment includes the first inclined partition wall portion 9a, the second inclined partition wall portion 9b, and the ceiling partition wall portion 9c. Accordingly, the partition wall 9 has three regions of the first inclined partition wall portion 9a, the second inclined partition wall portion 9b, and the ceiling partition wall portion 9c. The partition wall 9 has the inspection port 93 that allows access from the operator's seat 50 to the prime mover 4 and the closure body 94 that is capable of closing the inspection port 93. In the partition wall 9 of the present example embodiment, the inspection port 93 and the closure body 94 are provided at the second inclined partition wall portion 9b.

Figure 26:
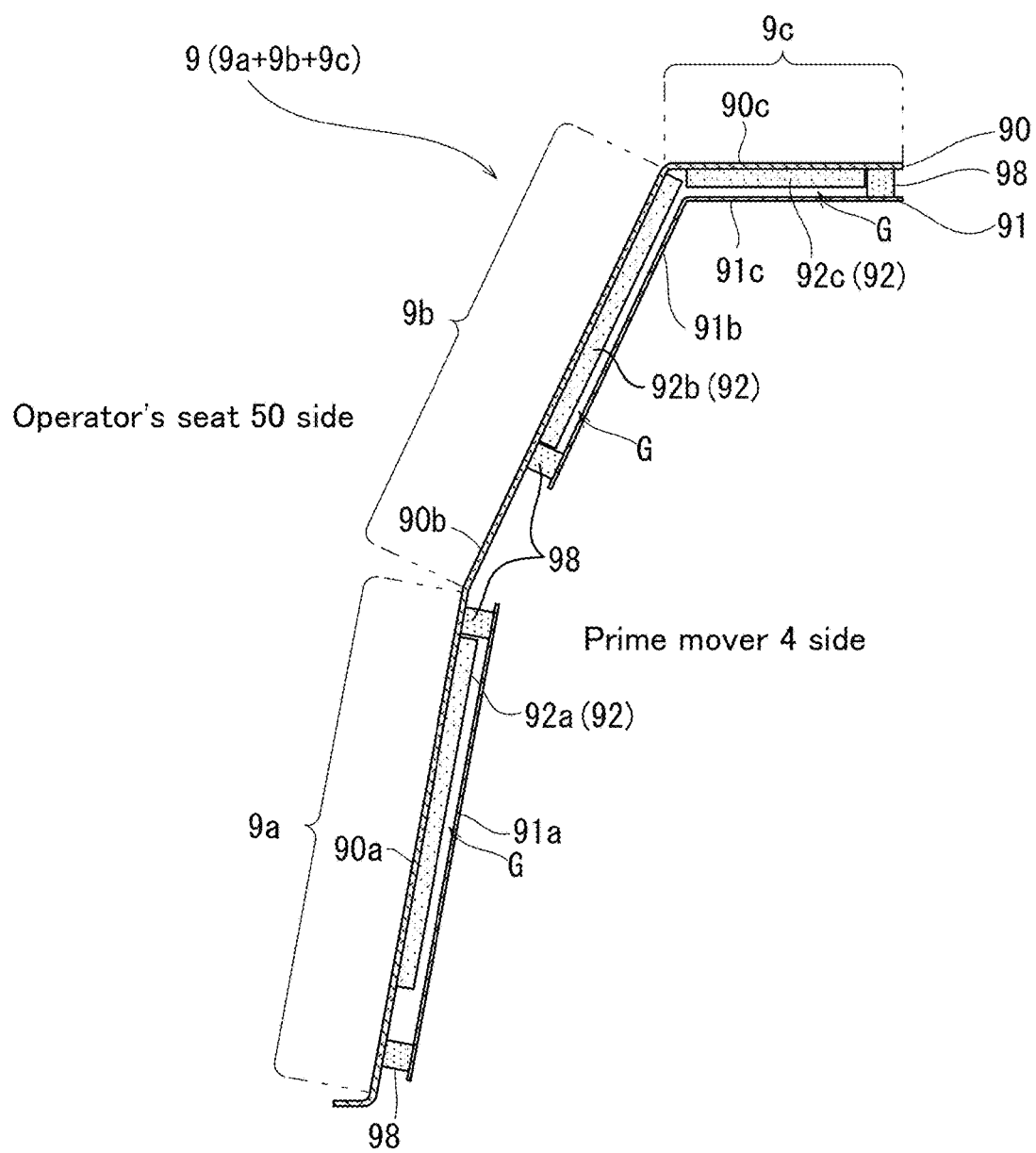
FIG. 26 is a cross-sectional view taken along line XXVI-XXVI of FIG. 25.
Figure 27:
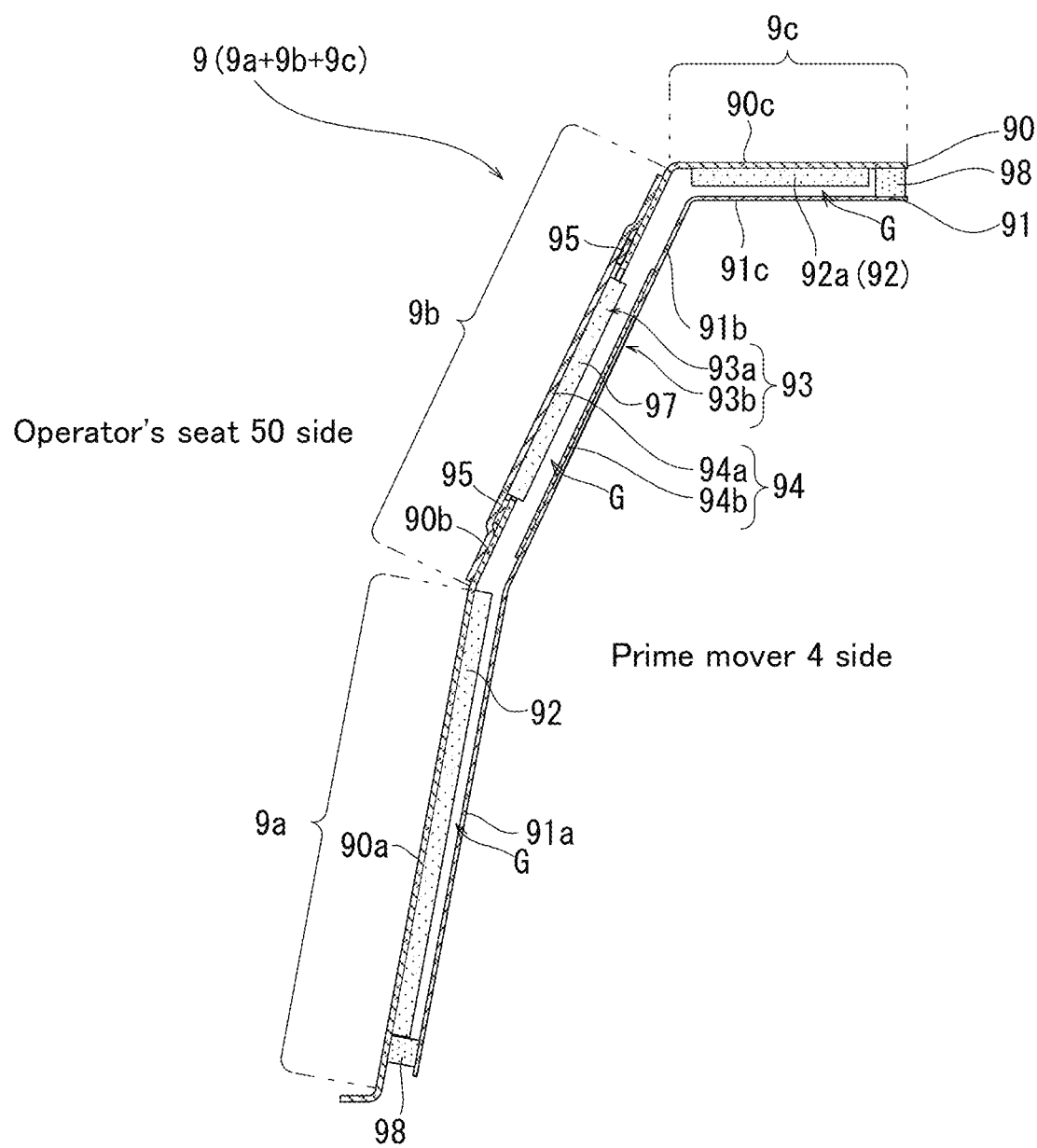
FIG. 27 is a cross-sectional view taken along line XXVII-XXVII of FIG. 25.
Figure 28:
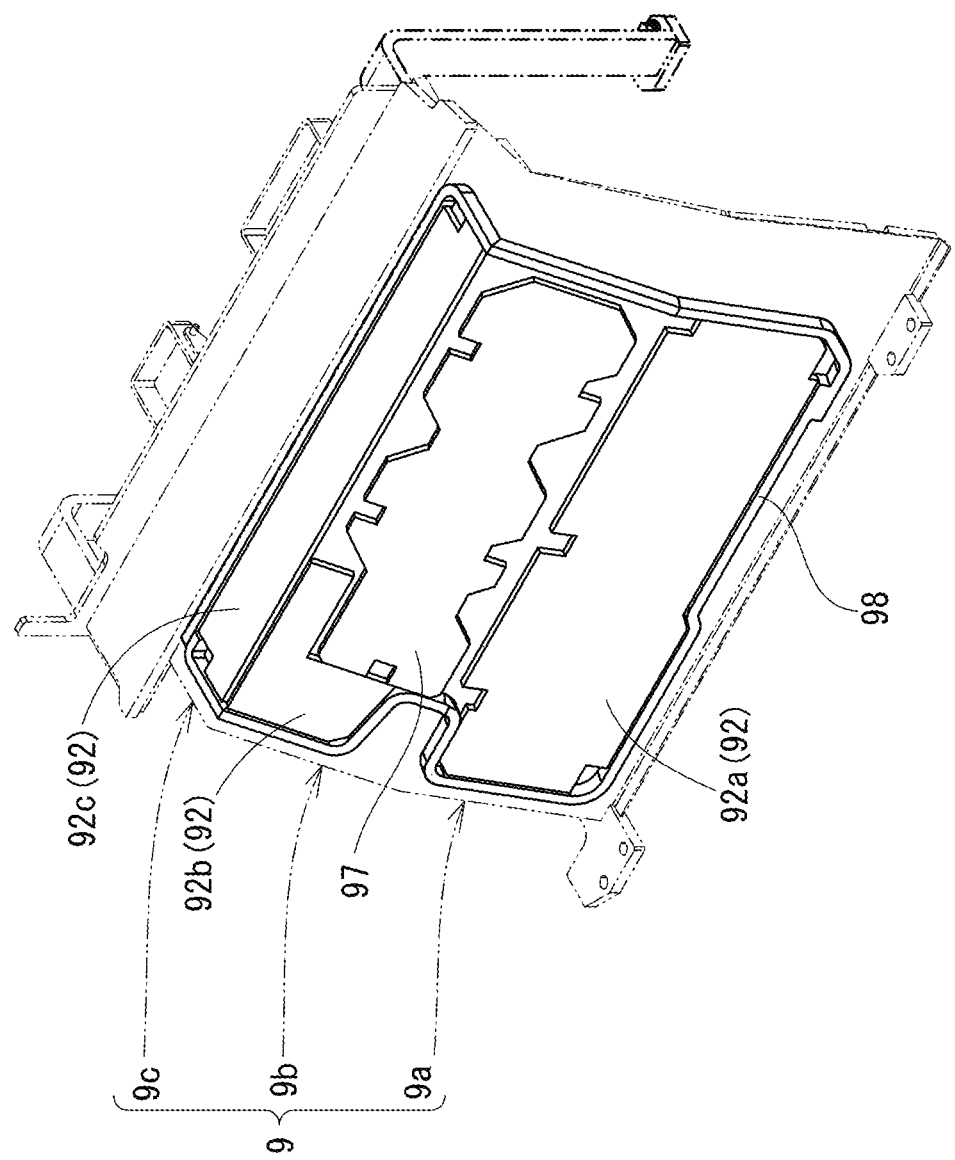
FIG. 28 is a perspective view for explaining the arrangement of the sound absorbing material and the sealing material of the partition wall of the working machine according to the second example embodiment.

As illustrated in FIG. 26 and FIG. 27, the partition wall 9 includes the pair of metal plates 90 and 91 that are arranged so as to face each other with a space therebetween in the direction from the operator's seat 50 toward the prime mover compartment and the sound-absorbing member 92 that is provided between the pair of metal plates 90 and 91. In the present example embodiment, as illustrated in FIG. 26 to FIG. 28, the partition wall 9 includes the seal member 98 having elasticity. The sound-absorbing member 92 is sandwiched between the pair of metal plates 90 and 91 and surrounds the sound-absorbing member 92, which is provided between the pair of metal plates 90 and 91.

Although the pair of metal plates 90 and 91 (the first metal plate 90 and the second metal plate 91) may be formed to have the same shape and the same size, they are formed to have different shapes in the present example embodiment. More specifically, an end portion of the second metal plate 91 on the other side in the transverse direction has a cutout portion that extends to the one side in the transverse direction. Thus, the surfaces of the pair of metal plates 90 and 91 (the first metal plate 90 and the second metal plate 91) do not entirely face each other, and the first metal plate 90 has a non-facing region that does not face the second metal plate 91. In other words, the outline (outer periphery) of the first metal plate 90 and the outline (outer periphery) of the second metal plate 91 do not coincide with each other when viewed from the direction in which the first metal plate 90 and the second metal plate 91 are arranged.

As illustrated in FIG. 26 and FIG. 27, the second metal plate 91 is a plate thinner than the first metal plate 90. In other words, the plate thickness of the first metal plate 90 is thicker than the plate thickness of the second metal plate 91. More specifically, the plate thickness of the first metal plate 90 is set to be 1.5 times or more that of the second metal plate 91. In the present example embodiment, the plate thickness of the first metal plate 90 is 3.2 mm, and the plate thickness of the second metal plate 91 is 2 mm. Thus, the plate thickness of the first metal plate is set to be 1.6 times that of the second metal plate.

The sound-absorbing member 92 is provided between the pair of metal plates 90 and 91. The sound-absorbing member 92 and the pair of metal plates 90 and 91 face each other with their surfaces, with a gap G formed between the sound-absorbing member 92 and at least one of the pair of metal plates 90 and 91. The sound-absorbing member 92 is in tight contact with one of the pair of metal plates 90 and 91 and is spaced apart from the other of the pair of metal plates 90 and 91 such that the gap G is formed between the sound-absorbing member 92 and the other of the pair of metal plates 90 and 91. In the present example embodiment, the sound-absorbing member 92 is in tight contact with the first metal plate 90, which is the one of the pair of metal plates 90 and 91 and which is closer to the operator's seat 50, and is spaced apart from the second metal plate 91, which is the other of the pair of metal plates 90 and 91, and the gap G is formed between the sound-absorbing member 92 and the second metal plate 91.

More specifically, as in the first example embodiment, the sound-absorbing member 92 is made of a foamed resin (foamed urethane foam) and is formed in a plate-like shape. The thickness of the sound-absorbing member 92 is set to be smaller than the distance between the pair of metal plates 90 and 91. In other words, the sound-absorbing member 92 is thick enough to absorb sound and is thick to the extent that can leave the gap G between the sound-absorbing member 92 and one of the metal plates 90 and 91 when provided between the pair of metal plates 90 and 91 (the first metal plate 90 and the second metal plate 91).

As described above, since the partition wall 9 of the present example embodiment has the plurality of regions (the first inclined partition wall portion 9a, the second inclined partition wall portion 9b, and the ceiling partition wall portion 9c), as illustrated in FIG. 28, the sound-absorbing member 92 is divided into a plurality of portions and these portions are arranged in their respective regions. In other words, the partition wall 9 includes, as the sound-absorbing member 92, a plurality of divided sound-absorbing members 92a, 92b, and 92c corresponding to the regions where they are arranged.

More specifically, the sound-absorbing member 92 includes, as the plurality of divided sound-absorbing members 92a, 92b, and 92c, the first sound-absorbing member 92a for the first inclined partition wall portion 9a, the second sound-absorbing member 92b for the second inclined partition wall portion 9b, and the third sound-absorbing member 92c for the ceiling partition wall portion 9c. Since the partition wall 9 has the inspection port 93 and the closure body 94 that closes the inspection port 93, the sound-absorbing member 92 further includes a fourth sound-absorbing member 97 for the closure body 94.

The first sound-absorbing member 92a, the second sound-absorbing member 92b, the third sound-absorbing member 92c, and the fourth sound-absorbing member 97 are each formed in a plate-like shape and each have a thickness necessary for sound absorption. As illustrated in FIGS. 26 and 27, the first sound-absorbing member 92a, the second sound-absorbing member 92b, the third sound-absorbing member 92c, and the fourth sound-absorbing member 97 are each thick to the extent that, when provided between the pair of metal plates 90 and 91 (the first metal plate 90 and the second metal plate 91), can leave the gap G between the sound-absorbing member and one of the metal plates 90 and 91 that faces the sound-absorbing member.

The first sound-absorbing member 92a and the third sound-absorbing member 92c are formed in a substantially rectangular shape in a plan view. In other words, the first sound-absorbing member 92a is formed in a rectangular shape in plan view slightly smaller than the size of the first inclined partition wall portion 9a (90a, 91a), and the second sound-absorbing member 92b is formed in a rectangular shape in plan view slightly smaller than the size of the ceiling partition wall portion 9c (90c, 91c). In other words, the first sound-absorbing member 92a has a size that is set to be capable of being provided in the first inclined partition wall portion 9a while ensuring a space for the seal member 98, and the third sound-absorbing member 92c has a size that is set to be capable of being provided in the ceiling partition wall portion 9c while ensuring a space for the seal member 98.

In the present example embodiment, since the inspection port 93 and the closure body 94 are provided at the second inclined partition wall portion 9b, the second sound-absorbing member 92b is provided so as to avoid the inspection port 93, and the fourth sound-absorbing member 97 is formed in accordance with the opening size and the opening shape of the inspection port 93. In the present example embodiment, the second sound-absorbing member 92b is provided on the other side in the transverse direction with respect to the inspection port 93. Thus, the second sound-absorbing member 92b is formed in a shape that is set to avoid the cutout portion of the second metal plate.

In the present example embodiment, the first sound-absorbing member 92a is bonded to the first metal plate 90 (90a) of the first inclined partition wall portion 9a, the second sound-absorbing member 92b is bonded to the first metal plate 90 (90b) of the second inclined partition wall portion 9b, and the third sound-absorbing member 92c is bonded to the first metal plate 90 (90c) of the ceiling partition wall portion 90c. The fourth sound-absorbing member 97 is bonded to the first closure plate 94a, which is made of a metal and which is included in the closure body 94. In other words, in the partition wall 9 of the present example embodiment, the sound-absorbing members 92 (the first sound-absorbing member 92a, the second sound-absorbing member 92b, the third sound-absorbing member 92c, the fourth sound-absorbing member 97) are attached to the metal plates 90 and 94a which face the operator's cab DR.

The seal member 98 is an elongated body made of urethane rubber. The seal member 98 is bendable in a direction perpendicular to or crossing its elongated (longitudinal) direction. In the present example embodiment, the seal member 98 is formed to have a rectangular cross section. An outer dimension of the seal member 98 in the direction perpendicular to the elongated (longitudinal) direction is set to be larger than the distance between the pair of metal plates 90 and 91 (the first metal plate 90 and the second metal plate 91). In other words, the size of the seal member 98 is set to allow the seal member 98 to be provided between the pair of metal plates 90 and 91 and compressed by being sandwiched between the pair of metal plates 90 and 91.

In the present example embodiment, the cross-sectional shape of the seal member 98 as viewed from the elongated (longitudinal) direction is a rectangular shape with four sides in its outline (outer shape). Accordingly, at least two of the four sides constituting the outline of the seal member 98, the two sides extending in the same direction, each have a length that is set to be longer than the distance between the pair of metal plates 90 and 91 (the first metal plate 90 and the second metal plate 91). In the present example embodiment, the cross-sectional shape of the seal member 98 is a square shape, and the length of each of the four sides is set to be longer than the distance between the pair of metal plates 90 and 91 (the first metal plate 90 and the second metal plate 91).

The seal member 98 surrounds the sound-absorbing member 92. In the present example embodiment, the partition wall 9 includes the plurality of divided sound-absorbing members 92a, 92b, 92c, and 97 (first sound-absorbing member 92a, second sound-absorbing member 92b, third sound-absorbing member 92c, and fourth sound-absorbing member 97) as the sound-absorbing member 92. Thus, the seal member 98 collectively surrounds all of the plurality of divided sound-absorbing members 92a, 92b, 92c, and 97 (first sound-absorbing member 92a, second sound-absorbing member 92b, third sound-absorbing member 92c, and fourth sound-absorbing member 97) between the pair of metal plates 90 and 91. In other words, the seal member 98 is provided so as to extend across the plurality of regions of the partition wall 9, thereby surrounding all the plurality of divided sound-absorbing members 92a, 92b, 92c, and 97 (first sound-absorbing member 92a, second sound-absorbing member 92b, third sound-absorbing member 92c, and fourth sound-absorbing member 97) together.

The seal member 98 is provided along the outer peripheral portion of the metal plates 90 and 91. In the present example embodiment, as described above, the outlines (outer peripheries) of the pair of metal plates 90 and 91 do not coincide with each other, and the planar area of the second metal plate 91 is smaller than the planar area of the first metal plate 90. In other words, the entire surface of the second metal plate 91 faces the first metal plate 90, whereas the first metal plate 90 has a portion projecting from the second metal plate 91.

Accordingly, in the partition wall 9 of the present example embodiment, the seal member 98 is provided along the outer peripheral portion of the second metal plate 91 and is sandwiched between and is in tight contact with the pair of metal plates 90 and 91 (the first metal plate 90 and the second metal plate 91). As a result, the seal member 98 is provided in an annular shape. In other words, the seal member 98 is annularly provided between the pair of metal plates 90 and 91, and the sound-absorbing member 92 (more specifically, the plurality of divided sound-absorbing members 92a, 92b, 92c, and 97) is provided in the region surrounded by the seal member 98.

The working machine 1 of the present example embodiment is has the above-described configuration, the sound-absorbing effect (quietness) of the partition wall 9 is further enhanced, and the comfort of the operator's cab DR can be obtained. More specifically, since the partition wall 9 includes, in addition to the pair of metal plates 90 and 91, the sound-absorbing member 92 and the gap (space) G that are located between the pair of metal plates 90 and 91, and thus, the sound transmission rate from the prime mover 4 can be reduced, and the sound that propagates to the operator's cab DR can be reduced.

Since the sound-absorbing member 92 is in close contact only with the first metal plate 90 (one of the metal plates, or one metal plate 90), the resonance frequency of the partition wall 9 is changed, and thus, it is possible to suppress generation of resonance sound.

Since the sound-absorbing member 92 is separated from the second metal plate 91 (the other of the metal plates, or the other metal plate 90), air bubbles of the sound-absorbing member 92, which is made of foam material, will not be crushed, and the energy of the sound that has transmitted through the second metal plate 91 is absorbed (attenuated) by the air present in the gap G. As a result, the energy of the sound that has been weakened is converted into thermal energy by further transmitting through the sound-absorbing member 92 (air bubbles), resulting in additional attenuation. Thus, the energy of the sound transmitted through the first metal plate 90 (one metal plate 90) becomes very small or is eliminated. Therefore, the quietness of the operator's cab DR is improved.

In particular, since the plate thickness of the first metal plate 90 (one metal plate 90) is thicker than the plate thickness of the second metal plate 91 (the other metal plate 91), the mass of the first metal plate 90 is also larger than that of the second metal plate 91. Consequently, according to the mass law, the amount of sound transmission loss in the first metal plate 90 (one metal plate 90) is large, and thus, the sound insulation performance on the operator's cab DR side is enhanced, and the quietness of the operator's cab DR is further improved.

Since the seal member 98 sandwiched between the pair of metal plates 90 and 91 surrounds the sound-absorbing member 92 (the plurality of divided sound-absorbing members 92a, 92b, 92c, and 97 (first sound-absorbing member 92a, second sound-absorbing member 92b, third sound-absorbing member 92c, and fourth sound-absorbing member 97)), it suppresses sound leakage from the partition wall 9 (the transmission of sound in a direction perpendicular to the traveling direction of the sound), thereby also reducing sound leakage into the operator's cab DR. In particular, by providing the seal member 98 along the outer peripheral portion of the second metal plate 91 (the other metal plate 91), the vibration (shaking) of the pair of metal plates 90 and 91 is suppressed, and the propagation (transmission) of sound can be suppressed, thereby contributing to the improvement of the quietness within the operator's cab DR.

The working machine 1 according to the second example embodiment of the present invention is as described above. Next, the working machine 1 according to a third example embodiment of the present invention will be described.

The working machine 1 of the third example embodiment has ta configuration the same as that of the working machine 1 of the first example embodiment, except with regard to the support member (second support member) 71 that supports the operator's seat protector 54. Thus, the same names and the same reference signs as in the first example embodiment will be given to the components that are the same as or equivalent to those described in the first example embodiment, and the descriptions of the components will be omitted.

Figure 29:
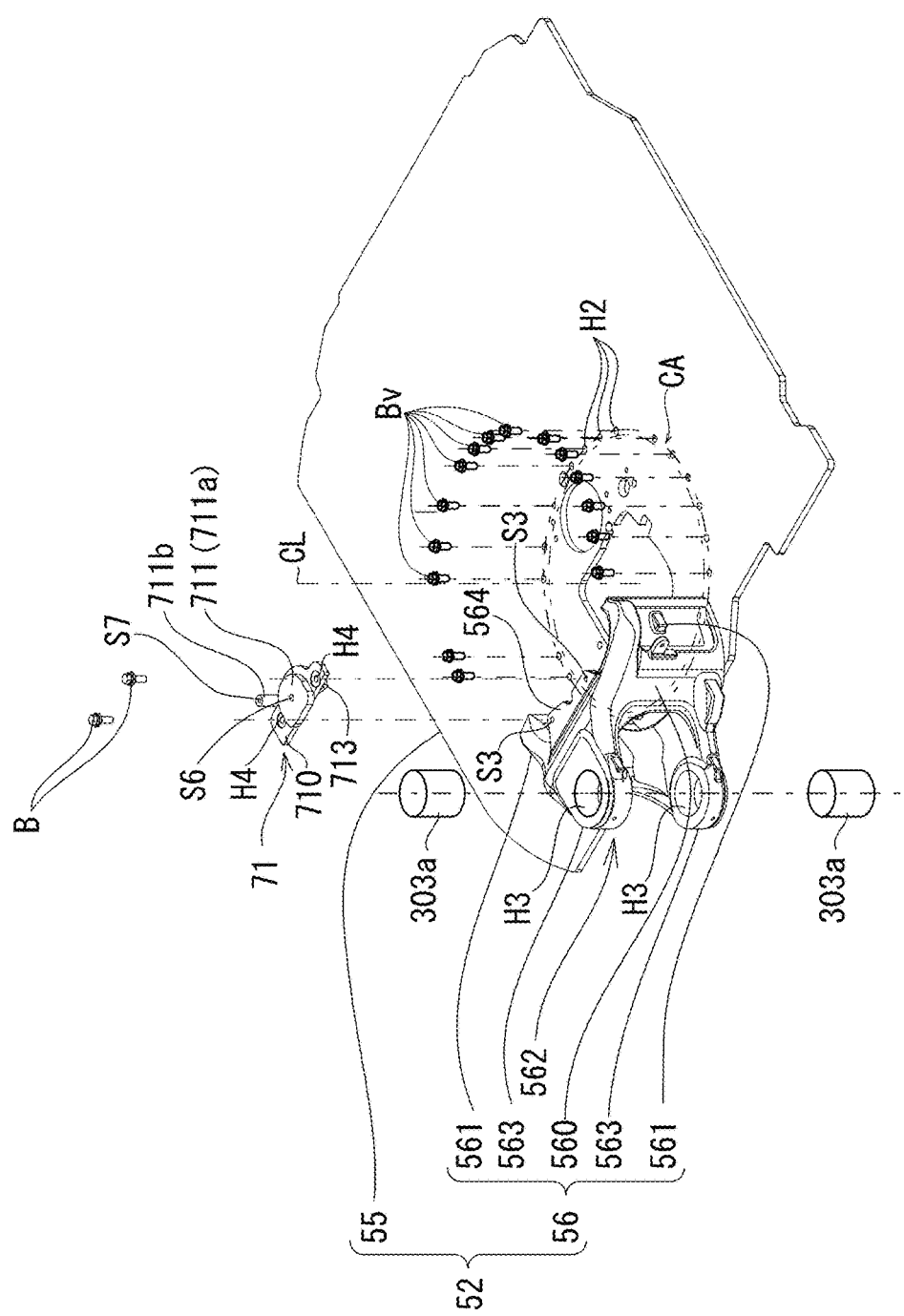
FIG. 29 is a schematic overall perspective view of a swivel base and a support member of a working machine according to a third example embodiment of the present invention.
Figure 30:
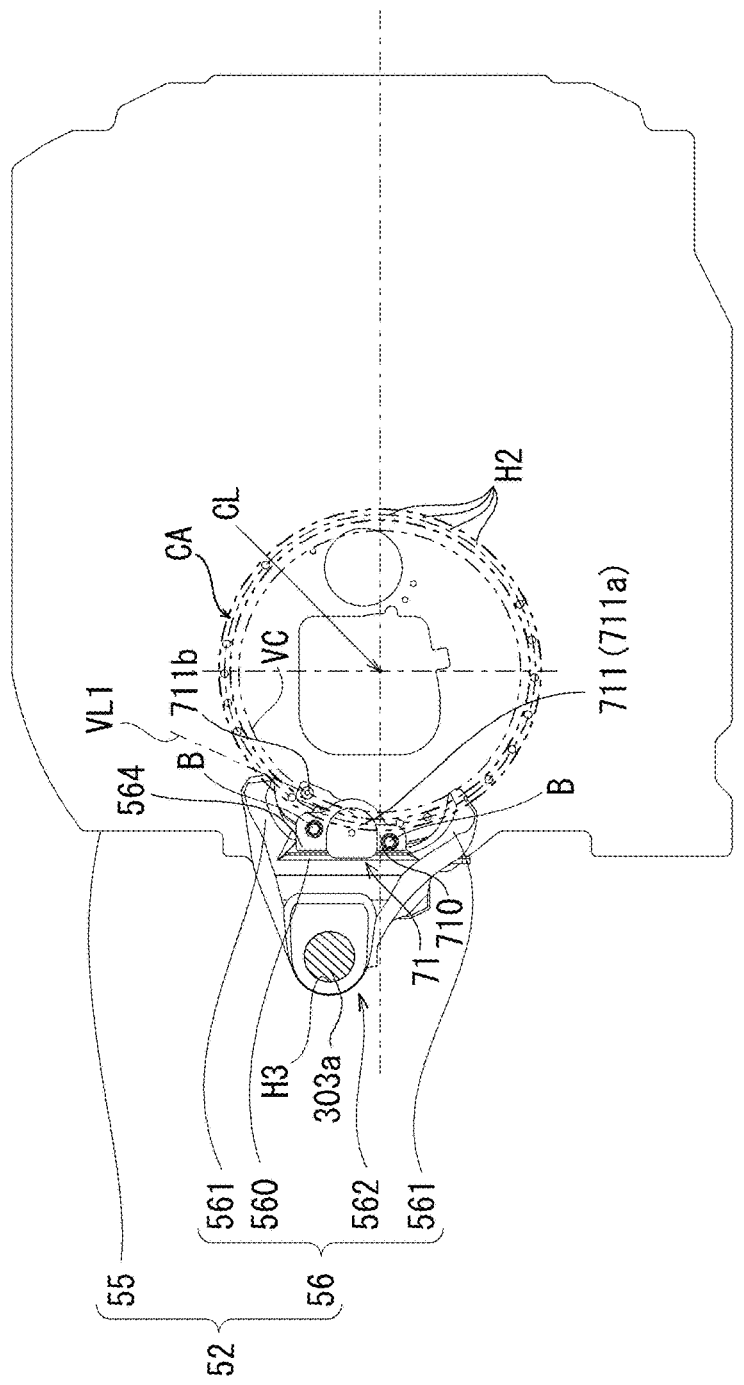
FIG. 30 is a schematic plan view illustrating a state where the support member is incorporated in the swivel base of the working machine according to the third example embodiment.

As in the first example embodiment, as illustrated in FIG. 29 and FIG. 30, the working machine 1 of the present example embodiment includes the support member 71 that is detachably attached to the device support 56, which is attached to the base plate 55 so as to support the working device 3, and that supports the operator's seat protector 54.

The device support 56 is provided at a position slightly offset to one side (the right side when the longitudinal direction serves as a reference) with respect to the center in the transverse direction. In contrast, the operator's cab DR is provided on the other side in the transverse direction when the device support 56 serves as a reference.

Accordingly, the step 57 is provided on the other side in the transverse direction when the device support 56 serves as a reference. The step 57 is supported at a plurality of positions, and one of the positions (one corner (right corner)) of the step 57 in a plan view) is supported by the support member 71 attached to the device support 56. The other positions are supported by the other support members (third support members) 72.

Figure 31:
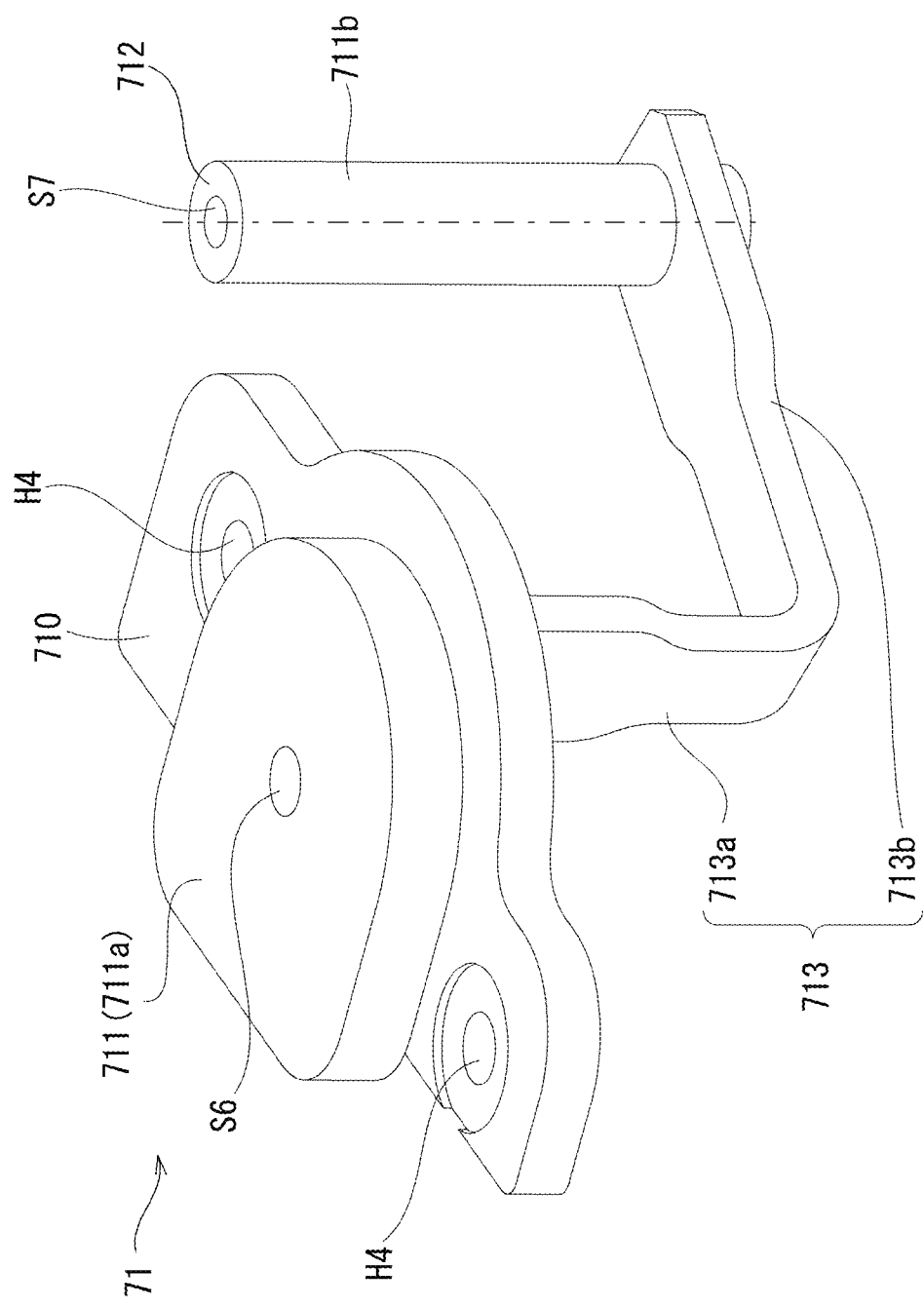
FIG. 31 is a perspective view of the support member of the working machine according to the third example embodiment.
Figure 32:
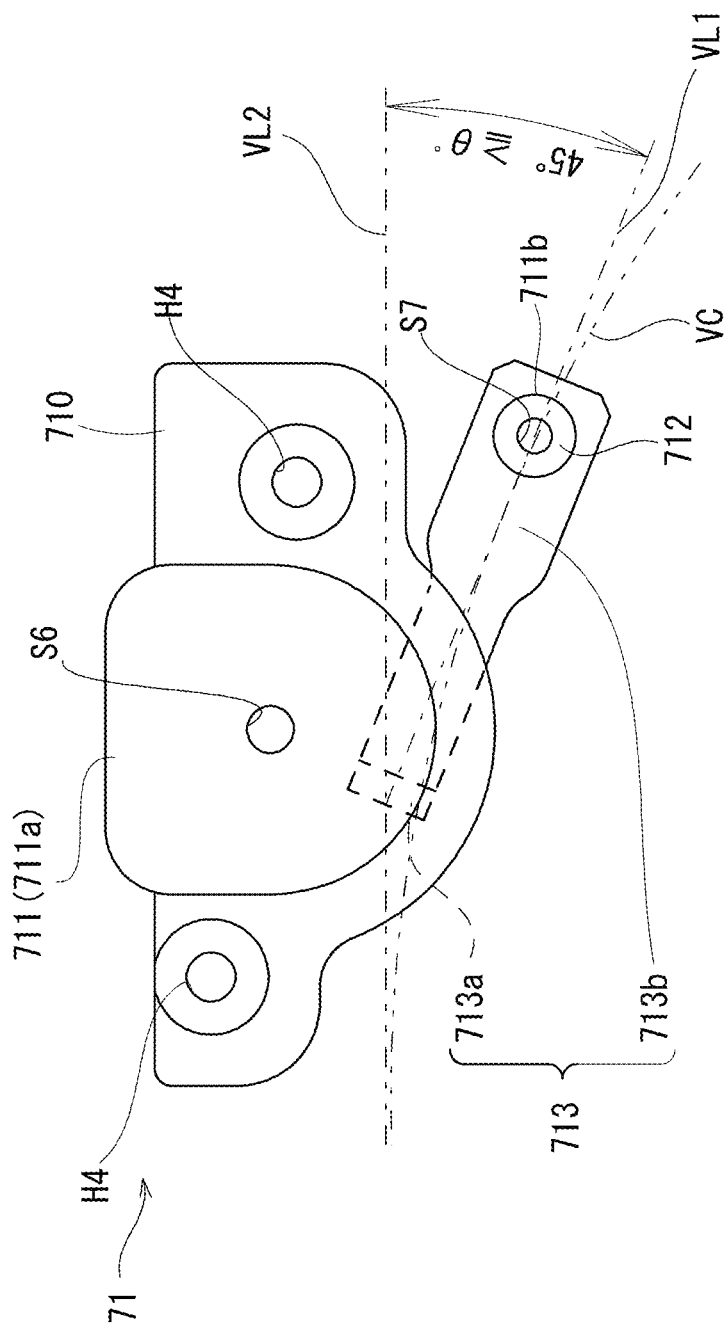
FIG. 32 is a plan view of the support member of the working machine according to the third example embodiment.

As illustrated in FIG. 30 to FIG. 32, the support member 71 includes the base portion 710 attached to the device support 56 and the support main body 711 coupled to the base portion 710.

The base portion 710 is provided on the placement surface 564 of the device support 56. Accordingly, the pair of through holes H4 and H4 are formed in the base portion 710 in the up-down direction at positions where they communicate with the pair of threaded holes S3 and S3, which are formed in the placement surface 564 of the device support 56, and the externally threaded fasteners B that fix the second support member 71 to the device support 56 are inserted into the pair of through holes H4 and H4.

Also in the present example embodiment, the support member 71 includes the protector support 711a, which supports the operator's seat protector 54, and the step support 711b, which supports the step 57. In the present example embodiment, the support main body 711 includes only the protector support 711a, which supports the operator's seat protector 54. In other words, the support main body 711 is the protector support 711a, and the step support 711b is a different body from the support main body 711 (the protector support 711a). Accordingly, in the present example embodiment, the support member 71 includes, in addition to the protector support 711a and the step support 711b, a support coupler 713 that couples the base portion 710 or the support main body 711 to the step support 711b and that supports the step support 711b at a predetermined position.

The support main body 711 (protector support 711a) is provided on the upper surface of the base portion 710. The support main body 711 is fixed to the base portion 710 so as to avoid the pair of through holes H4 and H4 (is fixed between the pair of through holes H4 and H4). In the present example embodiment, the base portion 710 provided on the placement surface 564 of the device support 56 projects rearward in the longitudinal direction from the placement surface 564 of the device support 56. In contrast, unlike the first example embodiment, the rear side of the support main body 711 (protector support 711a) in the longitudinal direction is accommodated within the upper surface of the base portion 710. The front side of the support main body 711 (protector support 711a) in the longitudinal direction projects forward from the base portion 710.

Figure 33:
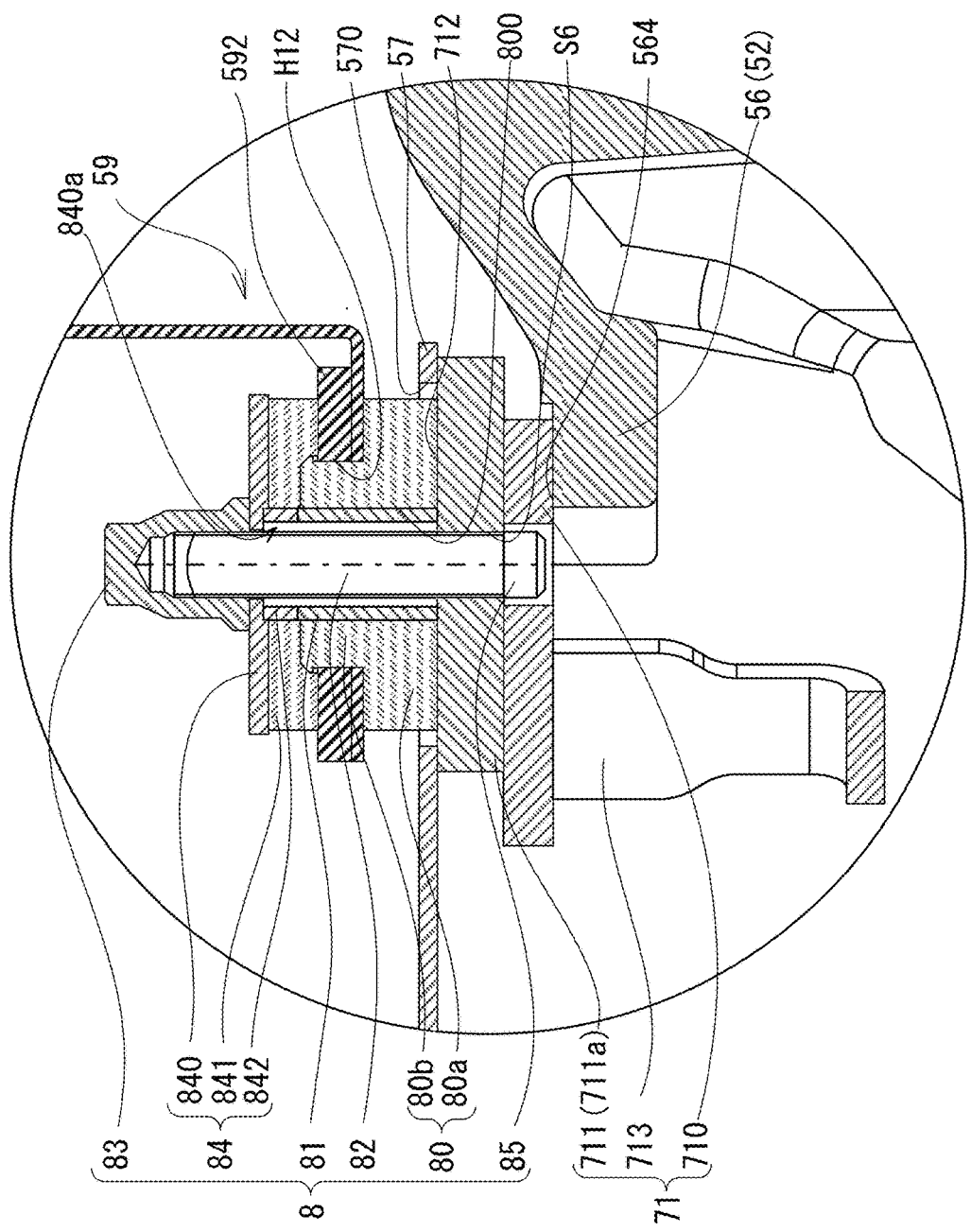
FIG. 33 is an enlarged cross-sectional view of the support member and a vibration isolation mechanism of the working machine according to the third example embodiment.

The support main body 711 (protector support 711a) includes the threaded hole S6 into which the externally threaded fastener B1 for fixing the operator's seat protector 54 (frame 59) in place is screwed in the up-down direction. Accordingly, as illustrated in FIG. 33, the support main body 711 (protector support 711a) of the support member 71 is coupled to and supports the operator's seat protector 54 (the frame 59) with the vibration isolation mechanism 8 interposed therebetween as in the first example embodiment.

Figure 34:
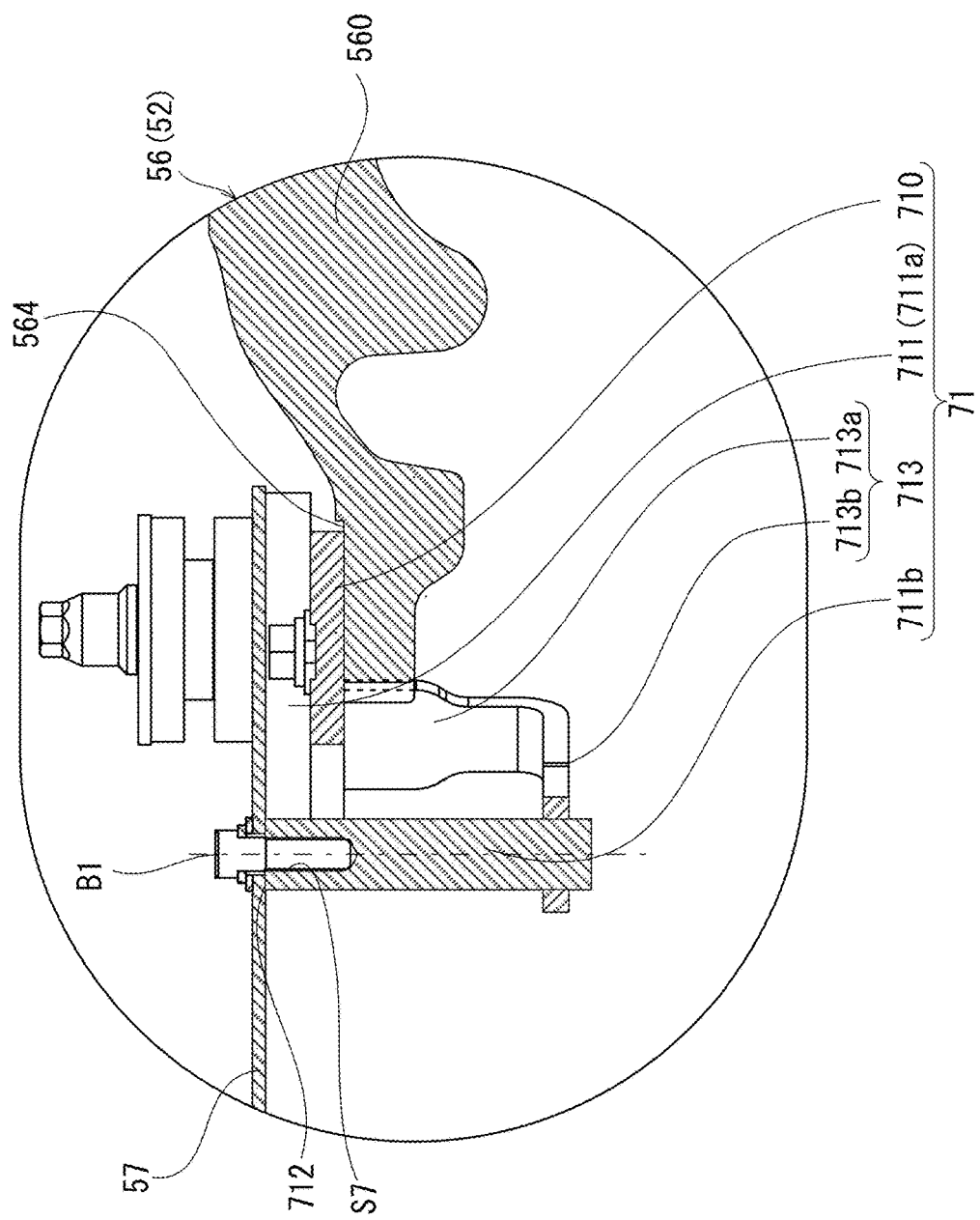
FIG. 34 is a partially enlarged cross-sectional view including the support member (second support member) of the working machine according to the third example embodiment.

As illustrated in FIG. 34, the step 57 is fixed in place in a state of being placed on the step support 711b. In the present example embodiment, the step 57 is screwed into the step support 711b. In other words, the working machine 1 includes the externally threaded fastener B1 that fixes the step 57 to the step support 711b and that is inserted into the step 57 in the up-down direction so as to be screwed into the step support 711b.

The step support 711b extends in the up-down direction and includes a lower end portion that is coupled to a support arm portion 713b and an upper end portion that is opposite to the lower end portion and that supports the step 57. In the present example embodiment, as illustrated in FIG. 31, the step support 711b extends in the up-down direction and has a lower end and an upper end in the up-down direction. Although the step support 711b is formed in a cylindrical shape in the present example embodiment, the shape of the step support 711b is not limited to this and may be, for example, a prismatic shape. The lower ends (a lower end portion) of the step support 711b is coupled (welded) to the support arm portion 713b, which will be described later, of the support coupler 713 in a state of extending through the support arm portion 713b.

As a result, the axial center (centerline) of the step support 711b extends in the up-down direction and extends upward from the support arm portion 713b. In other words, the step support 711b stands upright on the support arm portion 713b. As illustrated in FIG. 31 and FIG. 34, an end surface (upper end surface) of the upper end portion of the step support 711b is formed in a flat shape extending in a direction perpendicular to the centerline and constitutes the placement surface 712 on which the step 57 is installed (placed). In the upper end surface (upper surface) of the step support 711b has the threaded hole S7 into which the externally threaded fastener B1 that fixes the step 57 in place is screwed is formed in the up-down direction.

The length (height) of the step support 711b in the up-down direction is set with reference to the position (height) of the support arm portion 713b such that the upper end surface (placement surface 712) of the step support 711b can support the step 57 at a predetermined position (height).

As illustrated in FIG. 31 and FIG. 32, the support coupler 713 includes a support extension portion 713a that is connected to one of the base portion 710 and the support main body 711 and that extends in the up-down direction from the one of the base portion 710 and the support main body 711 and the support arm portion 713b that extends from the support extension portion 713a in a direction crossing the up-down direction and that is coupled to the step support 711b.

At least one of the support extension portion 713a and the support arm portion 713b is configured to be elastically deformable in at least a direction crossing the up-down direction. In the present example embodiment, both the support extension portion 713a and the support arm portion 713b are each elastically deformable in a direction crossing the up-down direction. In other words, the support extension portion 713a can be elastically deformed in a direction perpendicular to the up-down direction. In contrast, the support arm portion 713b is elastically deformable in a direction perpendicular to its extending direction. The term "deform" used herein includes not only being bent into a curved shape but also being twisted around a predetermined axis.

The above matter will now be described more specifically. The support extension portion 713a vertically extends from either the base section 710 or the support main body 711. In the present example embodiment, the support coupler 713 is connected to the base portion 710. More specifically, the support extension portion 713a is connected to a lower surface of a portion of the base portion 710, the portion projecting rearward from the placement surface 564 of the device support 56 in the longitudinal direction, and vertically extends from the lower surface of the base portion 710.

The support extension portion 713a and the support arm portion 713b of the present example embodiment are each in the shape of a long narrow plate. Thus, the support extension portion 713a and the support arm portion 713b each have a surface extending in a lengthwise direction and the lateral direction, which is perpendicular to the lengthwise direction, and each have a thickness in a direction that is perpendicular to the longitudinal direction and to the lateral direction. Accordingly, the support extension portion 713a and the support arm portion 713b each can be deformed (elastically deformed) into a curved shape in the thickness direction. The support extension portion 713a and the support arm portion 713b are each torsionally deformable (elastically deformable) around an axis (centerline) extending in the lengthwise direction. The support extension portion 713a and the support arm portion 713b are not limited to having a long narrow plate shape and may each be formed in, for example, a rod-like shape (a round rod-like shape or a square rod-like shape).

The support extension portion 713a vertically extends in the lengthwise direction. The support arm portion 713b extend in the lengthwise direction. In the present example embodiment, the support extension portion 713a and the support arm portion 713b form a right angle. More specifically, the support arm portion 713b is connected to a lower end portion of the support extension portion 713a and extends in a direction perpendicular to the direction (lengthwise direction) in which the support extension portion 713a vertically extends.

As described above, since the support extension portion 713a and the support arm portion 713b are each in the shape of a long narrow plate, the support arm portion 713b extends in the thickness direction of the support arm portion 713b. In the present example embodiment, the support extension portion 713a and the support arm portion 713b are integrally formed. More specifically, the support extension portion 713a and the support arm portion 713b are integrally formed by bending a long narrow metal plate. In the case where the support extension portion 713a and the support arm portion 713b are formed in a rod-like shape, they may be integrally formed by bending a metal rod-shaped member.

As illustrated in FIG. 30 and FIG. 32, the support arm portion 713b extends from the base portion 710 toward the rear end of the base plate 55. The support arm portion 713b extends in the direction of extension of an imaginary tangent VL1 to an imaginary circle VC centered on the swivel axis CL.

In the present example embodiment, as illustrated in FIG. 32, the support arm portion 713b extends in a direction in which the imaginary tangent VL1 extends. The imaginary tangent VL1 is an imaginary tangent to the imaginary circle VC centered on the swivel axis CL and is at a predetermined angle to an imaginary straight line VL2 (or another imaginary tangent to the imaginary circle VC). The imaginary straight line VL2 extends in a direction perpendicular to both the front-rear direction and up-down direction of the base plate 55.

More specifically, when viewed in plan view, the support arm portion 713b extends at an angle θ of 45 degrees (°) or less with respect to the imaginary straight line VL2 extending in the direction perpendicular to both the front-rear direction and up-down direction of the base plate 55. In other words, the direction in which of the support arm portion 713b extends (the angle θ) is set such that at least a force in the longitudinal direction, which is perpendicular to the up-down direction, acts as a load for causing the support coupler 713 to elastically deform. In the present example embodiment, when viewed in plan view, the support arm portion 713b extends with respect to the imaginary straight line VL2 at an angle of about 20 degrees.

The working machine 1 of the present example embodiment is as described above, and in addition to the operations and effects of the working machines 1 of the first and second example embodiments, it is possible to obtain effects of preventing loosening of the externally threaded fastener B1, which fixes the step 57 in place, and stably positioning the step 57.

Example embodiments (first to third example embodiments) of the present invention have been described, and example embodiments of the present invention provide working machines 1 described in the following items.

(Item 1-1) A working machine 1 including a prime mover 4, an operator's seat 50 provided at a distance from the prime mover 4, and a partition wall 9 provided between the prime mover 4 and the operator's seat 50, wherein the partition wall 9 includes a pair of metal plates 90, 91 facing each other with a space therebetween and arranged in a direction from the prime mover 4 toward the operator's seat 50.

With the working machine 1 according to item 1-1, the partition wall 9 is provided between the operator's seat 50 and the prime mover 4, and therefore the portion of the driving sound (operating sound) of the prime mover 4 in operation that propagates toward the operator's seat 50 is absorbed by the partition wall 9. Specifically, the partition wall 9 includes a pair of metal plates 90 and 91 arranged with a space therebetween in a direction from the prime mover 4 toward the operator's seat 50 (the direction in which the prime mover 4 and operator's seat 50 are spaced apart from each other), and therefore the driving sound of the prime mover 4 is attenuated by hitting the metal plate 91 located closer to the prime mover 4, and then propagates toward the operator's seat 50. However, since the pair of metal plates 90 and 91 are arranged with a space therebetween, the driving sound of the prime mover 4 propagating toward the operator's seat 50 is further attenuated by the space between the pair of metal plates 90 and 91, and is attenuated by hitting the metal plate 90 located closer to the operator's seat 50. With this, the driving sound (operating sound) of the prime mover 4 is absorbed in multiple stages by the partition wall 9. Therefore, with the working machine 1 according to item 1-1, the quietness of the operator's seat 50 can be further improved.

In particular, the pair of metal plates 90 and 91 included in the partition wall 9 are each made of metal and thus has a large mass (surface density), and therefore delivers high sound transmission loss and is excellent in silencing effect, thus achieving high quietness at the area where the operator's seat 50 is provided. Since each of the metal plates 90 and 91 delivers high sound transmission loss, high silencing effect can be achieved even if the metal plates 90 and 91 are thin. However, as the thickness (weight) increases, higher silencing effect can be achieved. Furthermore, since the partition wall 9 is a double wall, the propagation of heat toward the operator's seat 50 is also efficiently reduced.

(Item 1-2) The working machine 1 according to item 1-2, wherein the partition wall 9 includes a sound-absorbing member 92 provided between the pair of metal plates 90, 91.

With the working machine 1 according to item 1-2, the sound-absorbing member 92 between the pair of metal plates 90 and 91 effectively absorbs the sound of the prime mover 4. In other words, the sound-absorbing member 92 is a favorable material specifically made to absorb sound, and therefore the sound received by the metal plate 90 located closer to the operator's seat 50 has already been attenuated significantly. Therefore, since the metal plate 90 located closer to the operator's seat 50 further attenuates the sound that has been attenuated by the sound-absorbing member 92, no or little sound is transmitted to the operator's seat 50, thus further improving the quietness in the operator's seat 50.

(Item 1-3) The working machine 1 according to item 1-2, wherein the sound-absorbing member 92 is provided between the pair of metal plates 90, 91 such that surfaces of the sound-absorbing member 92 face surfaces of the pair of metal plates 90, 91 with a gap G between the sound-absorbing member 92 and at least one of the pair of metal plates 90, 91.

With the working machine 1 according to item 1-3, the sound transmittance of the entire partition wall 9 can be reduced by the sound-absorbing member 92 and the gap (space) G which are provided between the pair of metal plates 90 and 91. With this, the propagation of the sound of the prime mover 4 toward the operator's seat 50 can be reduced, and the quietness in the operator's seat 50 is further improved.

(Item 1-4) The working machine 1 according to item 1-3, wherein the sound-absorbing member 92 is in tight contact with one (metal plate 90) of the pair of metal plates 90, 91 and is separated from the other (metal plate 91) of the pair of metal plates 90, 91 with the gap G between the sound-absorbing member 92 and the other (metal plate 91) of the pair of metal plates 90, 91.

With the working machine 1 according to item 1-4, the sound-absorbing member 92 is in tight contact with one of the pair of metal plates 90 and 91, so that the resonance frequency of the partition wall 9 is changed, making it possible to prevent or reduce the generation of resonance sound. Furthermore, since the sound-absorbing member 92 is separated from the other metal plate 91 such that the gap G is present between the sound-absorbing member 92 and the other metal plate 91, it is possible to eliminate or reduce the likelihood that the sound-absorbing member 92 will be squashed (pressed). With this, the sound-absorbing member 92 can sufficiently effect its function.

(Item 1-5) The working machine 1 according to item 1-4, wherein the sound-absorbing member 92 is in tight contact with the one (metal plate 90) of the pair of metal plates 90, 91 that is closer to the operator's seat 50 than the other (metal plate 91) of the pair of metal plates 90, 91 and is separated from the other (metal plate 91) of the pair of metal plates 90, 91 with the gap G between the sound-absorbing member 92 and the other (metal plate 91) of the pair of metal plates 90, 91.

With the working machine 1 according to item 1-5, since the sound-absorbing member 92 is in tight contact with the one metal plate 90 is located closer to the operator's seat 50, the generation of resonance sound at the area where the operator's seat 50 is present can be prevented or reduced. Furthermore, the sound having lost its energy by passing through the other metal plate 91 and the gap G is to pass through the one metal plate 90 and the sound-absorbing member 92. Thus, the weakened sound energy is further absorbed by the combination of the one metal plate 90 and the sound-absorbing member 92. With this, the propagation of the sound of the prime mover 4 toward the operator's seat 50 can be prevent or reduced, and the quietness in the operator's seat 50 is further improved.

(Item 1-6) The working machine 1 according to item 1-5, wherein the one (metal plate 90) of the pair of metal plates 90, 91 is greater in plate thickness than the other (metal plate 91) of the pair of metal plates 90, 91.

With the working machine 1 according to item 1-6, since the plate thickness of the one metal plate 90 is thicker than that of the other metal plate 91, the mass (weight) of the one metal plate 90 is also larger (heavier) than that of the other metal plate 91. Thus, according to the mass law, the sound transmittance of the one metal plate 90 closer to the operator's seat 50 is smaller than the other, and the sound absorption on the operator's seat 50 side can be increased.

(Item 1-7) The working machine 1 according to any one of items 1-3 to 1-6, wherein the partition wall 9 includes an elastic seal member 98 sandwiched between the pair of metal plates 90, 91 such that the seal member 98 surrounds the sound-absorbing member 92 provided between the pair of metal plates 90, 91.

With the working machine 1 according to item 1-7, the sound-absorbing member 92 is surrounded by the seal member 98, so that sound leakage in directions perpendicular to the direction in which the pair of metal plates 90 and 91 face each other can also be prevented or reduced.

(Item 1-8) The working machine 1 according item 1-7, wherein the seal member 98 is provided along an outer peripheral portion of at least one (metal plate 91) of the pair of metal plates 90, 91.

With the working machine 1 according to item 1-8, the seal member 98 is provided along the outer peripheral portion of the metal plate 91, so that generation of vibrations in the metal plates 90 and 91 can also be prevented or reduced, and in addition, the occurrence of vibrational noise (so-called chattering noise) in the metal plates 90 and 91 can be prevented or reduced.

(Item 1-9) The working machine 1 according to any one of items 1-2 to 1-8, wherein the sound-absorbing member 92 is in tight contact with the pair of metal plates 90, 91.

With the working machine 1 according to item 1-9, the sound-absorbing member 92 is in tight contact with the pair of metal plates 90 and 91, and therefore the driving sound of the prime mover 4 is absorbed continuously and in multiple stages. With this, the absorption rate of the sound that propagates toward the operator's seat 50 can be increased.

(Item 1-10) The working machine 1 according to any one of items 1-2 to 1-9, wherein the sound-absorbing member 92 includes a foamed resin.

With the working machine 1 according to item 1-10, the sound-absorbing member 92 is made of a foamed resin, and therefore the partition wall 9 has an excellent sound-absorbing effect. Specifically, since a foamed resin has a large number of air bubbles (cavities), the foamed resin has excellent sound attenuation effect. Thus, by providing the sound-absorbing member 92 made of a foamed resin between the pair of metal plates 90 and 91, the quietness in the operator's seat 50 is increased.

(Item 1-11) The working machine 1 according to any one of items 1-1 to 1-10, wherein the pair of metal plates 90, 91 include a first metal plate 90 and a second metal plate 91, the first metal plate 90 being located closer to the operator's seat 50 than the second metal plate 91, the second metal plate 91 being located closer to the prime mover 4 than the first metal plate 90, the partition wall 9 includes an inspection port 93 to allow access from an area where the operator's seat 50 is present to an area where the prime mover 4 is present, and a closure body 94 configured to close the inspection port 93, the first metal plate 90 includes a first opening 93a included in the inspection port 93, the second metal plate 91 includes a second opening 93b included in the inspection port 93, and the closure body 94 includes a first closure plate 94a made of metal to close the first opening 93a such that the first closure plate 94a is placed on a surface, facing the operator's seat 50, of a portion of the first metal plate 90 that surrounds the first opening 93a, and a second closure plate 94b made of metal to close the second opening 93b such that the second closure plate 94b is placed on a surface, facing the operator's seat 50, of a portion of the second metal plate 91 that surrounds the second opening 93b.

With the working machine 1 according to item 1-11, the inspection port 93 is caused to open by removing the closure body 94, allowing access to the prime mover 4 and the like through the inspection port 93 from the operator's seat 50 and enabling inspection and maintenance. Furthermore, the closure body 94 to close the inspection port 93 includes the first closure plate 94a made of metal to close the first opening 93a of the inspection port 93 such that the first closure plate 94a lies on the first metal plate 90 located closer to the operator's seat 50, and the second closure plate 94b made of metal to close the second opening 93b of the inspection port 93 such that the second closure plate 94b lies on the second metal plate 91 located closer to the prime mover 4. Therefore, even though the inspection port 93 is provided, the first closure plate 94a and the second closure plate 94b absorb the driving sound (operating sound) of the prime mover 4 similar to the pair of metal plates 90 and 91 included in the partition wall 9.

(Item 1-12) The working machine 1 according to item 1-11, wherein the first opening 93a has a shape to allow the second closure plate 94b to pass therethrough in a direction from the operator's seat 50 toward the second metal plate 91.

With the working machine 1 according to item 1-12, the first opening 93a has a shape to allow the second closure plate 94b to pass therethrough in the direction from the operator's seat 50 toward the second metal plate 91, and therefore, when the inspection port 93 is opened or closed, both the first closure plate 94a and the second closure plate 94b can be attached or detached from the area where the operator's seat 50 is present.

(Item 1-13) The working machine 1 according to item 1-11 or 1-12, wherein the first closure plate 94a is screw-fastened to the first metal plate 90, and the second closure plate 94b is screw-fastened to the second metal plate 91.

With the working machine 1 according to item 1-13, the first closure plate 94a and the second closure plate 94b are screw-fastened to the metal plates 90 and 91, respectively, and therefore the first closure plate 94a and the second closure plate 94b can be attached and detached merely by fastening and unfastening screws. That is, the inspection port 93 can be easily opened and closed.

(Item 1-14) The working machine 1 according to any one of items 1-11 to 1-13, wherein a seal member 95 is provided at at least one of an overlap portion where the first closure plate 94a and the first metal plate 90 overlap each other or an overlap portion where the second closure plate 94b and the second metal plate 91 overlap each other.

With the working machine 1 according to item 1-14, even in cases where a gap is present at an overlap portion where the first closure plate 94a and the first metal plate 90 overlap each other and/or an overlap portion where the second closure plate 94b and the second metal plate 91 overlap each other, the seal member 95 fills this gap, thus eliminating or reducing the likelihood that sound not absorbed in a preceding stage will leak out through the gap. This also eliminates or reduce the likelihood that the first closure plate 94a and the one metal plate 90 will dynamically interfere (chattering will occur) and the second closure plate 94b and the other metal plate 91 will dynamically interfere (chattering will occur) due to vibrations.

(Item 1-15) The working machine 1 according to any one of items 1-1 to 1-14, wherein the partition wall 9 includes a spacing member 96 provided between the pair of metal plates 90, 91 to maintain a space between the pair of metal plates 90, 91.

With the working machine 1 according to item 1-15, the distance between the pair of metal plates 90 and 91 is kept constant by the presence of the spacing members 96, and therefore the distance is maintained to be suitable for absorbing the driving sound (operating sound) of the prime mover 4.

(Item 1-16) The working machine 1 according to any one of items 1-11 to 1-15, wherein the second metal plate 91 has provided thereon a support 910 to support thereon the second closure plate 94b, the support 910 projecting toward the first metal plate 90.

With the working machine 1 according to item 1-16, the second closure plate 94b can be placed (supported) on the support(s) 910 when it is attached or detached, making it possible to eliminate or reduce the likelihood that the second closure plate 94b will be dropped accidentally. Specifically, since the second closure plate 94b is made of a heavy metal, the second closure plate 94b may be dropped between the pair of metal plates 90 and 91 when it is attached to or detached from the second metal plate 91. However, the second closure plate 94b can be attached and detached without being dropped accidentally by being held (supported) on the support(s) 910.

(Item 2-1) A working machine 1 including a machine body 5, a traveling device 2 to support the machine body 5 such that the machine body 5 is allowed to travel, and a working device 3 (3a) attached to the machine body 5, wherein the machine body 5 includes a base plate 55 supported on the traveling device 2 and rotatable about a swivel axis CL extending in an up-down direction, a device support 56 attached to the base plate 55 to support the working device 3 (3a), an operator's seat 50 provided on the base plate 55, and an operator's seat protector 54 to protect the operator's seat 50, and the device support 56 has detachably attached thereto a support member 71 to support the operator's seat protector 54.

With the working machine 1 according to item 2-1, the support member 71 to support the operator's seat protector 54 is attachable and detachable to and from the device support 56 of the swivel base 52, and therefore the support member 71 can be removed from the device support 56. With this, if the support member 71 hinders work performed on the base plate 55 (swivel base 52), by removing the support member 71, it is possible to efficiently perform assembling or maintenance work on the base plate 55. Thus, the working machine 1 according to item 2-1 makes it possible to mount the operator's seat protector without reducing the ease of assembly and maintenance of components arranged on the swivel base.

(Item 2-2) The working machine 1 according to item 2-1, further including a swivel bearing 53 supported on the traveling device 2, wherein the base plate 55 is fixed to the swivel bearing 53 via a plurality of externally threaded fasteners Bv arranged within an annular region CA which overlaps the swivel bearing 53 in projection view as seen in the up-down direction, and the support member 71 includes a base portion 710 attached to the device support 56 at a position which does not overlap the externally threaded fasteners Bv in projection view as seen in the up-down direction, and a support main body 711 coupled to the base portion 710 and at least partially overlaps the externally threaded fasteners Bv in projection view as seen in the up-down direction, and the support main body 711 includes a protector support 711a to support the operator's seat protector 54.

With the working machine 1 according to item 2-2, the support main body 711 including the protector support 711a, which supports the operator's seat protector 54, is provided at a position which overlaps externally threaded fastener(s) Bv which fix the swivel bearing 53, in projection view as seen in the up-down direction. However, if the support member 71 (support main body 711) hinders work when the base plate 55 is attached to the swivel bearing 53 or inspection/maintenance relating to the fixation (coupling) between the swivel bearing 53 and the base plate 55 is performed, by removing the base portion 710 from the device support 56, the entire support member 71 is detached and therefore the base plate 55 and the externally threaded fasteners Bv can be easily accessed.

In particular, the base portion 710 of the support member 71 is attached to the device support 56 at a position away from a portion overlapping the externally threaded fasteners Bv in projection view as seen in the up-down direction, and therefore, when the support member 71 (base portion 710) is detached from the device support 56, the externally threaded fasteners Bv can be accessible directly from above. In other words, since the device support 56 or the like is not present directly above the externally threaded fasteners Bv, a tool (e.g., a wrench such as a box wrench) can access the externally threaded fasteners Bv from directly above. With this, the tool can be appropriately connected to the externally threaded fasteners Bv and appropriately operated, making it possible to appropriately manage the torque of the externally threaded fasteners Bv which fix the swivel bearing 53, for example.

(Item 2-3) The working machine 1 according to item 2-2, wherein the device support 56 includes, at an upper surface thereof, a flat placement surface 564 for placement of the support member 71, the base portion 710 is provided on the placement surface 564 and is fixed to the device support 56 by a threaded fastener B, and the protector support 711a is provided at at least one of the base portion 710 or the support main body 711 such that the protector support 711a does not overlap the placement surface 564 in projection view as seen in the up-down direction.

According to item 2-3, the protector support 711a is provided at at least one of the base portion 710 or the support main body 711 such that the protector support 711a does not overlap the placement surface 564 in projection view as seen in the up-down direction, and therefore the protector support 711a is present at a position not included in the region of the placement surface 564. With this, the protector support 711a of the support member 71 overlaps the annular region CA in projection view as seen in the up-down direction, and therefore the operator's seat protector 54 is supported such that the operator's seat protector 54 is displaced in the direction from the swivel bearing 53 to the device support 56. With this, the operator's seat 50 can also be provided such that it is displaced in the direction from the swivel bearing 53 to the device support 56. That is, the operator's seat 50 and the operator's seat protector 54 are provided at positions that are spaced apart from the working device 3 (3a). This makes it possible to eliminate or reduce the likelihood that the operation of the working device 3 (3a) will affect the operator's seat 50 and the like.

(Item 2-4) The working machine 1 according to item 2-3, wherein the threaded fastener B includes a head and a threaded portion smaller in diameter than the head, the base portion 710 includes a through hole H4 for insertion of the threaded portion, the placement surface 564 includes a threaded hole S3 to allow the threaded portion to be screwed therein, the support main body 711 is coupled to the base portion 710 and positioned in an area of an upper surface of the base portion 710 that excludes the through hole H4, and a thickness of the support main body 711 in an up-down direction is greater than a height of the head.

With the working machine 1 according to item 2-4, the thickness of the support main body 711 in the up-down direction is larger than the height of the head, and therefore the threaded fasteners B that fix the support member 71 do not project from the upper surface of the support main body 711. This eliminates or reduces the likelihood that the frame 59 will contact the threaded fasteners B.

(Item 2-5) The working machine 1 according to item 2-2 or 2-3, further including a vibration isolation mechanism 8 to support the operator's seat protector 54 in a vibration-isolating manner, wherein the vibration isolation mechanism 8 is interposed between the protector support 711a and the operator's seat protector 54.

With the working machine 1 according to item 2-5, the vibration isolation mechanism 8 is interposed between the protector support 711a and the operator's seat protector 54, reducing the vibration of the entire operator's seat protector 54.

(Item 2-6) The working machine 1 according to any one of items 2-2 to 2-5, further including a step 57 which includes a floor plate to support the operator's seat 50, wherein the support member 71 includes the protector support 711a and a step support 711b to support the step 57.

With the working machine 1 according to items 2-6, the support member 71 includes the protector support 711a and the step support 711b to support the step 57, and therefore a single support member 71 can support the step 57 in addition to the operator's seat protector 54. In other words, it is possible to support the step 57 without separately and independently providing a support member to support the step 57 at a corresponding predetermined position.

(Item 2-7) The working machine 1 according to item 2-6, wherein the step 57 is placed on and fixed to the step support 711b, and the support member 71 includes a support coupler 713 to couple one of the base portion 710 and the support main body 711 to the step support 711b and support the step support 711b at a predetermined position, the support coupler 713 being elastically deformable in at least a direction crossing the up-down direction.

With the working machine 1 according to item 2-7, it is possible to eliminate or reduce the likelihood that a force transmitted from the working device 3 in operation to the device support 56 will affect (damage) the boundary between the step 57 and the step support 711b (the portion of the step 57 that is fixed to the step support 711b). Specifically, a force applied to the working device 3 during operation (force the front-rear direction or lateral direction (vehicle width direction) crossing (perpendicular to) the up-down direction) also acts on the device support 56 supporting the working device 3, and further acts on the base portion 710 and the support main body 711 attached to the device support 56. However, since the working machine 1 according to item 2-7 includes the support coupler 713 to couple the base portion 710 or the support main body 711 to the step support 711b, and the support coupler 713 is elastically deformable in at least a direction crossing the up-down direction, when a large force acts in a direction crossing the up-down direction, the support coupler 713 elastically deforms to absorb the force from the working device 3. This eliminates or reduces the likelihood that the force from the working device 3 will affect (damage) the boundary between the step 57 and the step support 711b (the portion of the step 57 that is fixed to the step support 711b).

(Item 2-8) The working machine 1 according to item 2-7, further including an externally threaded fastener B1 to fix the step 57 to the step support 711b, the externally threaded fastener B1 being inserted through the step 57 in the up-down direction and screwed in the step support 711b.

With the working machine 1 according to item 2-8, the step 57 can be removed from the step support 711b by removing the externally threaded fastener B1, and therefore maintenance and the like can be easily performed. When the step 57 is fixed to the step support 711b using the externally threaded fastener B1, if a large force is repeatedly acts in a direction crossing the up-down direction on the boundary between the step 57 and the step support 711b (the portion of the step 57 that is fixed to the step support 711b), the externally threaded fastener B1 tends to loosen. However, with the working machine 11 according to item 2-8, since the support coupler 713 is elastically deformable in at least a direction crossing the up-down direction, when a large force acts in the direction crossing the up-down direction, the support coupler 713 elastically deforms to absorb the force from the working device 3.

Therefore, a large force (impact force) does not repeatedly act on the boundary between the step 57 and the step support 711b (the portion of the step 57 that is fixed to the step support 711b), so that loosening of the externally threaded fastener B1 is prevented or reduced, and the step 57 can be maintained in a fixed state.

(Item 2-9) The working machine 1 according to item 2-7 or 2-8, wherein the support coupler 713 includes a support extension portion 713a connected to one of the base portion 710 and the support main body 711 and extending in the up-down direction from the one of the base portion 710 and the support main body 711, and a support arm portion 713b extending in a direction crossing the up-down direction from the support extension portion 713a and coupled to the step support 711b, and at least one of the support extension portion 713a or the support arm portion 713b is elastically deformable in at least a direction crossing the up-down direction.

With the working machine 1 according to item 2-9, the step support 711b can be provided at a desired and appropriate position, and at least one of the support extension portion 713a or the support arm portion 713b is elastically deformed in at least a direction crossing the up-down direction, eliminating or reducing the likelihood that the boundary between the step 57 and the step support 711b (the portion of the step 57 that is fixed to the step support 711b) will be affected (damaged).

(Item 2-10) The working machine 1 according to item 2-9, wherein the support extension portion 713a extends downward from one of the base portion 710 and the support main body 711.

With the working machine 1 according to item 2-10, the support extension portion 713a vertically extends from the base portion 710 or the support main body 711, and therefore the support extension portion 713a is located lower than the base portion 710 or the support main body 711. Thus, the position of the step support 711b (the position at which the step support 711b supports the step 57) can be set within the range from a position lower than the base portion 710 or the support main body 711 to a position higher than the base portion 710 or the support main body 711.

(Item 2-11) The working machine 1 according to item 2-9 or 2-10, wherein the support extension portion 713a is elastically deformable in a direction perpendicular to the up-down direction, and the support arm portion 713b is elastically deformable in a direction perpendicular to a direction in which the support arm portion 713b extends.

With the working machine 1 according to item 2-11, the support extension portion 713a and the support arm portion 713b are elastically deformable, and therefore the elastic deformation of them (the deformation achieved by the combination) absorbs forces in directions perpendicular to the up-down direction which are not limited to a force in a specific direction.

(Item 2-12) The working machine 1 according to any one of items 2-9 to 2-11, wherein the support extension portion 713a and the support arm portion 713b are each in the shape of a long narrow plate, the support extension portion 713a extends downward in a lengthwise direction thereof, and the support arm portion 713b extends outward in a lengthwise direction thereof.

With the working machine 1 according to item 2-12, the support extension portion 713a and the support arm portion 713b are each in the shape of a long narrow plate, and the lengthwise direction thereof is along the direction of downward extension thereof or the direction of extension thereof. Thus, the support extension portion 713a and the support arm portion 713b are elastically deformable not only in the thickness direction but also in the twisting direction (rotational direction) around an axis extending in the lengthwise direction, making it possible to absorb forces in many directions.

(Item 2-13) The working machine 1 according to item 2-12, wherein the support extension portion 713a and the support arm portion 713b are integrally formed by bending a long narrow metal plate.

With the working machine 1 according to item 2-13, the support extension portion 713a and the support arm portion 713b are integrally formed by bending a long narrow metal plate, and therefore it is not necessary to perform welding or the like at a connection portion where the support extension portion 713a and the support arm portion 713b are connected to each other. Since the support extension portion 713a and the support arm portion 713b are continuous with each other, the support coupler 713 can be elastically deformed as a whole.

(Item 2-14) The working machine 1 according to any one of items 2-9 to 2-13, wherein the support arm portion 713b extends at an angle of 45 degrees or less with respect to an imaginary line VL2 extending in a direction perpendicular to a front-rear direction and an up-down direction of the base plate 55.

With the working machine 1 according to item 2-14, when a force in the front-rear direction and a force in a direction perpendicular to or crossing the front-rear direction of the base plate 55 are applied, the support arm portion 713b is more easily elastically deformable and can absorb such forces.

(Item 2-15) The working machine 1 according to item 2-14, wherein the support arm portion 713b extends in a direction of extension of an imaginary tangent VL1 to an imaginary circle VC centered on the swivel axis Cl.

With the working machine 1 according to item 2-15, when a force transmitted from the working device 3 in operation to the device support 56 acts in a direction perpendicular to or crossing the imaginary tangent VL1 to the imaginary circle VC centered on the swivel axis CL, the support arm portion 713b is easily elastically deformable and can absorb such forces. Specifically, by defining the direction of extension of the support arm portion 713b based on the imaginary tangent VL1 to the imaginary circle VC centered on the swivel axis CL, even if the base plate 55 slews about the swivel axis CL and the position of the device support 56 changes, the support arm portion 713b is easily elastically deformable under the forces transmitted thereto from the working device 3 and can absorb the forces.

(Item 2-16) The working machine 1 according to any one of items 2-9 to 2-15, wherein the step support 711b includes opposite end portions one of which is a lower end portion extending in the up-down direction and coupled to the support arm portion 713b, and the other of which is an upper end portion to support the step 57.

With the working machine 1 according to item 2-16, the step support 711b extends in the up-down direction, and therefore the upper end that supports the step 57 can be located at an appropriate position (height).

(Item 2-17) The working machine 1 according to any one of items 2-6 to 2-16, wherein the protector support 711a and the step support 711b are provided at an upper surface of the support main body 711, the step 57 includes a relief portion 570 which is a hole or a cutout in a position corresponding to the protector support 711a, and the operator's seat protector 54 is directly or indirectly supported on the protector support 711a via the relief portion 570.

With the working machine 1 according to item 2-17, the protector support 711a and the step support 711b which supports the step 57 are provided at the upper surface of the support main body 711, and therefore the step 57 can be supported in addition to the operator's seat protector 54. That is, it is possible to support the step 57 without separately and independently providing a support member to support the step 57 at a corresponding predetermined position. In particular, the step 57 has the hole-shaped or cutout-shaped relief portion 570 provided at a position corresponding to the protector support 711a, and the operator's seat protector 54 is directly or indirectly supported on the protector support 711a via the relief portion 570. Thus, the protector support 711a reliably supports the operator's seat protector 54 without the step 57 therebetween.

(Item 2-18) The working machine 1 according to item 2-17, further including a vibration isolation mechanism 8 to support the operator's seat protector 54 in a vibration-isolating manner, wherein the vibration isolation mechanism 8 is located at least partially in the relief portion 570.

With the working machine 1 according to item 2-18, at least a portion of the vibration isolation mechanism 8 is located in the relief portion 570. Thus, the step 57 is not interposed between the vibration isolation mechanism 8 and the protector support 711a, and the vibration isolation mechanism 8 can be provided between the protector support 711a and the operator's seat protector 54, allowing the vibration isolation mechanism 8 to sufficiently and appropriately effect its function.

(Item 2-19) The working machine 1 according to any one of items 2-1 to 2-18, wherein the device support 56 is provided at a front portion of the base plate 55, the working device 3 (3a) is attached to the device support 56 such that the working device 3 is swingable in the up-down direction, the support member 71 supports a front portion of the operator's seat protector 54, and a front end portion of the operator's seat protector 54 is positioned such that the front end portion overlaps the device support 56 in projection view as seen in the up-down direction.

With the working machine 1 according to item 2-19, the support member 71 supports a front portion of the operator's seat protector 54, and a front end portion of the operator's seat protector 54 is positioned such that the front end portion overlaps the device support 56 in projection view as seen in the up-down direction. Thus, the load at the front end portion of the operator's seat protector 54 is transmitted to the device support 56 via the support member 71. That is, the device support 56 which is rigid enough to support the working device 3 (3a) reliably supports the operator's seat protector 54.

(Item 2-20) The working machine 1 according to item 2-3 or according to any one of items 2-4 to 2-19 taken in combination with item 2-3, wherein the device support 56 includes a main body 560 and a pair of legs 561 extending rearward from the main body 560 and supported on the base plate 55, and the placement surface 564 is provided at a portion of the main body 560 that is between the pair of legs 561.

With the working machine 1 according to item 2-20, the placement surface 564 is provided in a region between the pair of legs 561 which extend rearward from the main body 560, and therefore, even if the support member 71 is placed on the placement surface 564 and projects rearward along the front-rear direction from the placement surface 564, the support member 71 does not contact the legs 561 because the legs 561 are not present below the support member 71.

(Item 2-21) The working machine 1 according to item 2-20, wherein the device support 56 includes cast iron, and the placement surface 564 is obtained by machining an upper surface of the device support 56.

With the working machine 1 according to item 2-21, the entire device support 56 is integrally formed from cast iron, and therefore the device support 56 has sufficient strength and the flatness of the placement surface 564 is improved by machining. Thus, the appropriate position and posture of the support member 71 can be achieved. This makes it possible to appropriately support the operator's seat protector 54 with sufficient strength.

(Item 2-22) The working machine 1 according to any one of item 2-1 to 2-21, wherein the operator's seat protector 54 includes a cabin including wall portions to cover front, rear, left, and right sides of the operator's seat 50 and a roof 540 to cover a top of the operator's seat 50 or a canopy including a plurality of pillars 590L, 590R, 591L, and 591R each of which extends vertically and which are arranged around the operator's seat 50, and a roof 540 supported above the operator's seat 50 by the plurality of pillars 590L, 590R, 591L, and 591R.

With the working machine 1 according to item 2-22, the cabin or the canopy can be provided at a position where it does not contact the working device 3 (3a), and, even with such positioning, the ease of assembly, maintenance, or other workability does not decrease.

(Item 3-1) A working machine 1 including a traveling device 2, a base plate 55 supported on the traveling device 2 rotatably about a swivel axis CL extending in an up-down direction, a support member 71, 72, 73 provided vertically on the base plate 55, and an installed component 57, 40, 61 supported on the support member 71, 72, 73, 74, wherein the support member 71, 72, 73, 74 is attached to the base plate 55 by a threaded fastener B2, B3, B4.

With the working machine 1 according to item 3-1, the support member(s) 71, 72, 73, and 74 to support the installed component(s) 57, 40, and 61 are attached to the base plate 55 via the threaded fastener(s) B2, B3, and B4, and therefore, during assembly or maintenance, the support members 71, 72, 73, and 74 can be attached or detached by fastening or unfastening the threaded fasteners B2, B3, and B4. This facilitates the ease of assembly and maintenance operations.

Furthermore, since the threaded fasteners B2, B3, and B4 are arranged in a fixed manner, the threaded fasteners B2, B3, and B4 are attached to the support members 71, 72, 73, and 74 at predetermined positions and in predetermined postures. The support members 71, 72, 73, and 74 and the base plate 55 are not subjected to heat such as heat generated from fixation by welding, and therefore the support members 71, 72, 73, and 74 and the base plate 55 are fixed to each other with no or little distortion etc. With this, the support members 71, 72, 73, and 74 are fixed to the swivel base 52 in an appropriate posture and manner, and therefore the installed components 57, 40, and 61 can be supported in an appropriate state. If there are distortions or other the like in the shapes of the support members 71, 72, 73, and 74, they can be corrected by removing the support members 71, 72, 73, and/or 74 from the base plate 55, and thus, the correction can be performed significantly more easily than in the case where the support members 71, 72, 73, and 74 are integral with the swivel base 52 which is subjected to the surrounding environment (conditions). Therefore, with the working machine 1 according to item 3-1, the installed components 57, 40, and 61 spaced apart from the swivel base 52 can be arranged at appropriate positions without performing complex operations.

(Item 3-2) The working machine 1 according to item 3-1, wherein the support member 71, 72, 73, 74 includes a fixed portion 720, 730, 740 placed on and fixed to the base plate 55 by the threaded fastener B2, B3, B4, and an upright portion 721, 731, 741 including a lower end portion connected to the fixed portion 720, 730, 740 and extending upward, and the upright portion 721, 731, 741 directly or indirectly supports the installed component 57, 40, 61 at an upper end portion thereof.

With the working machine 1 according to item 3-2, the fixed portion(s) 720, 730, and 740 are fixed to the base plate 55 via the threaded fastener(s) B2, B3, and B4, so that the support member(s) 72, 73, and 74 can be entirely attached to the base plate 55. Since the upright portion(s) 721, 731, and 741 extend upward and directly or indirectly support the installed component(s) 57, 40, and 61 at upper end portion(s), the installed components 57, 40, and 61 can be arranged at positions corresponding to the heights of the upright portions 721, 731, and 741. That is, the installed components 57, 40, and 61 are arranged at positions each of which is spaced apart from the base plate 55 by a distance corresponding to the height of a corresponding one of the upright portions 721, 731, and 741. With this, other installed component(s) 57, 40, and/or 61 can be provided between installed component(s) 57, 40, and/or 61 and the base plate 55.

(Item 3-3) The working machine 1 according to item 3-1, wherein the support member 73 includes a pair of fixed portions 730 fixed to the base plate 55 by one or more threaded fasteners B3 such that the pair of fixed portions 730 are arranged with a gap therebetween on the base plate 55, a pair of upright portions 731 including respective lower end portions connected to the respective pair of fixed portions 730, and a coupling portion 732 to connect upper ends of the pair of upright portions 731 to each other, and the installed component 40, 61 is provided on an upper surface of the coupling portion 732.

With the working machine 1 according to item 3-3, when the pair of fixed portions 730 are fixed to the base plate 55 by the threaded fasteners B3, the upper ends of the pair of upright portions 731 connected to each other via the coupling portion 732 do not move away from each other, and the lower ends of the pair of upright portions 731 also do not move away from each other, so that the entire support member 73 is installed (placed) in a stable state. When the installed component(s) 40, 61 is/are installed on the upper surface (placement surface) 733 of the coupling portion 732 connecting the upper ends of the pair of upright portions 731 to each other, the pair of upright portions 731 receive the load of the installed component(s) 40, 61 in a distributed manner, which is appropriate for supporting the heavy installed component(s) 40, 61.

(Item 3-4) The working machine 1 according to item 3-2, wherein the upright portion 721, 741 includes a pillar portion in the shape of a rod extending in the up-down direction, and the installed component 57, 40, 61 is provided on an upper end surface of the pillar portion 721, 741.

With the working machine 1 according to item 3-4, since the upright portion(s) 721, 741 is a rod-shaped pillar portion and the installed component(s) 57, 40, 61 is installed on the upper end surface of the pillar portion(s) 721, 741, the weight of the installed component(s) 57, 40, 61 acts on the pillar portion(s) 721, 741 in the axial direction. With this, the weight (load) of the installed component(s) 57, 40, 61 does not act as an offset load on the support member(s) 72, 74, and the installed component(s) 57, 40, and 61 can be stably supported.

(Item 3-5) The working machine 1 according to any one of items 3-2 to 3-4, wherein the support member 72, 74 includes a projecting portion 722, 742 projecting downward relative to a lower surface of the fixed portion 720, 740, and the base plate 55 includes, at a portion where the support member 72, 74 is positioned, a positioning hole H6, H10 to allow the projecting portion 722, 742 to be fitted and removed therein and therefrom.

With the working machine 1 according to item 3-5, when the projecting portion(s) 722, 742 of the support member(s) 72, 74 is fitted into the positioning hole(s) H6, H10 in the base plate 55, the support member 72, 74 is positioned such that the central axis (projecting direction) of the projecting portion 722, 742 and the center of the positioning hole H6, H10 (the center of the hole S9, S11) coincide with each other. That is, the support member 72, 74 is located at a predetermined position and positioned in a predetermined posture. With this, when the fixed portion 720, 740 is fixed to the base plate 55 via the threaded fastener B2, B4, the support member 72, 74 is fixed to the base plate 55 in an appropriate state, making it possible to support the installed component 57, 40, 61 in an appropriate state.

(Item 3-6) The working machine 1 according to item 3-4, wherein the fixed portion 720, 740 includes a through hole H5, H9 for insertion of a lower portion of the pillar portion 721, 741, the pillar portion 721, 741 is fixed to the fixed portion 720, 740 such that the pillar portion 721, 741 is inserted through the through hole H5, H9 and a lower end portion of the pillar portion 721, 741 projects downward relative to the fixed portion 720, 740, and the base plate 55 includes, at a portion where the support member 72, 74 is positioned, a positioning hole H6, H10 to allow the lower end portion of the pillar portion 721, 741 to be fitted and removed therein and therefrom.

With the working machine 1 according to item 3-6, the lower portion of the pillar portion 721, 741 is inserted into the through hole H5, H9 of the fixed portion 720, 740 and projects downward from the fixed portion 720, 740, and therefore the portion projecting downward from the fixed portion 720, 740 is concentric with the pillar portion 721, 741 located above the fixed portion 720, 740. When the lower end portion of the pillar portion 721, 741 is fitted into the positioning hole H6, H10, the support member 72, 74 is positioned in place and positioned in a predetermined posture. With this, when the fixed portion 720, 740 is fixed to the base plate 55 via the threaded fastener B2, B4, the support member 72, 74 is fixed to the base plate 55 in an appropriate state, making it possible to support the installed component 57, 40, 61 in an appropriate state.

(Item 3-7) The working machine 1 according to any one of items 3-2 to 3-4, further including a support protrusion 520, 521, 522 at a portion of the base plate 55 where the fixed portion 720, 730, 740 of the support member is positioned, the support protrusion 520, 521, 522 projecting upward from an upper surface of the base plate 55, wherein the fixed portion 720, 730, 740 is placed on and fixed to an upper surface of the support protrusion 520, 521, 522.

With the working machine 1 according to item 3-7, when the support member 72, 73, 74 is to be placed on the base plate 55, the support member 72, 73, 74 overlaps the support protrusion 520, 521, 522 projecting from the base plate 55, and therefore the position and the posture of the support member 72, 73, 74 are more appropriate. Furthermore, since the support protrusion 520, 521, 522 protrudes from the base plate 55, when the flatness of the surface on which the support member 72, 73, 74 are placed is to be increased in order to increase the positioning (installation) accuracy of the support member 72, 73, 74, it is not necessary to subject the entire upper surface of the base plate 55 to machining, and only a small area including the upper surface of the partially projecting support protrusion 520, 521, 522 needs to be subjected to machining, thus improving machining efficiency.

(Item 3-8) The working machine 1 according to item 3-7, wherein the fixed portion 720, 730, 740 includes a through hole H7, H8, H11 extending in the up-down direction to allow insertion of the threaded fastener B2, B3, B4, and the support protrusion 520, 521, 522 includes a hole S9, S10, S11 to allow the threaded fastener B2, B3, B4, inserted through the through hole H7, H8, H11, to be inserted or screwed therein.

With the working machine 1 according to item 3-8, a common threaded fastener B2, B3, B4 passes through the hole S9, S10, S11 of the support protrusion 520, 521, 522 and the through hole H7, H8, H11 of the fixed portion 720, 730, 740, making it possible to eliminating or reducing the likelihood that the support member 72, 73, 74 will tilt due to the fastening force of the threaded fastener B2, B3, B4. That is, since the fixed portion 720, 730, 740 is fixed by the threaded fastener B2, B3, B4 in a region where the support member 72, 73, 74 and the support protrusion 520, 521, 522 are in surface contact with each other, it is possible to eliminate or reduce the likelihood that the support member 72, 73, 74 will tilt about the outer periphery (edge) of the support protrusion 520, 521, 522. With this, it is possible to place the support member 71, 73, 74 in an appropriate posture.

(Item 3-9) The working machine 1 according to item 3-7, wherein a receiving surface of the support protrusion 520, 521, 522 that receives the fixed portion 720, 730, 740 and a received surface of the fixed portion 720, 730, 740 that is received by the receiving surface 520a, 521a are flat surfaces obtained by machining.

With the working machine 1 according to item 3-9, the flatness of the receiving surface 520a, 521a and the received surface that comes into surface contact with each other is increased, and therefore the posture and the like when the support member 72, 73, 74 is installed are appropriate.

The present invention is not limited to the above-described example embodiments, and modifications may be made within the gist of the present invention.

For example, in the above example embodiments, although a backhoe has been described as an example of the working machine 1, the working machine 1 is not limited to a backhoe. The working machine 1 may be another construction machine, an agricultural machine, a utility vehicle (UV), or the like. More specifically, the working machine 1 may be a tractor, a skid-steer loader, a wheel loader, or the like.

Figure 35:
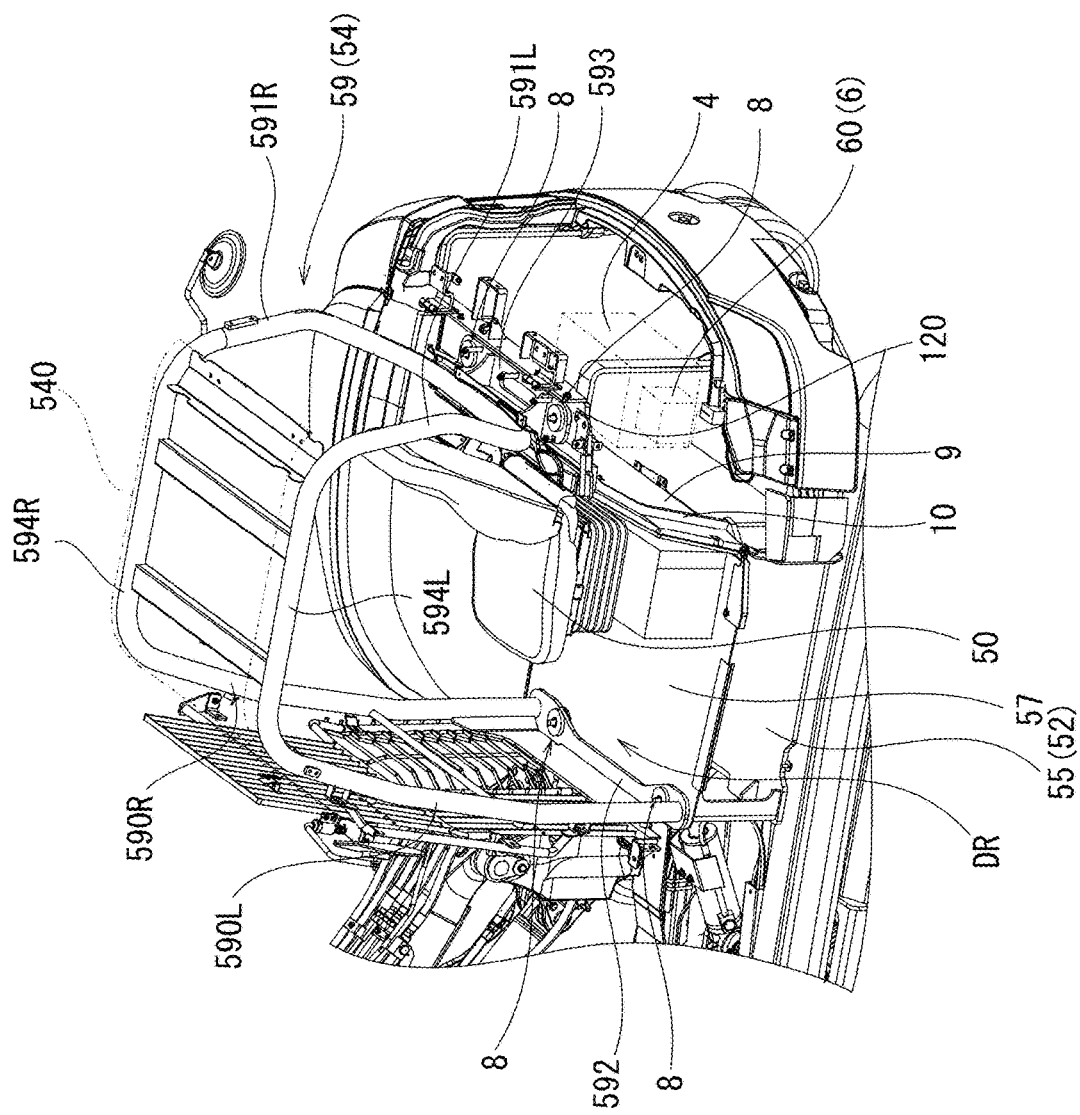
FIG. 35 is a partial perspective view of a working machine according to another example embodiment of the present invention, with some portions omitted.

In the above-described example embodiments, the working machine 1 includes, as the operator's seat protector 54, a cabin that defines the operator's cab DR including the operator's seat 50 (a space with specified dimensions in the transverse, longitudinal, and up-down directions). However, the present invention is not limited to this. For example, as illustrated in FIG. 35, the working machine 1 may include a so-called canopy that includes the plurality of pillars 590L, 590R, 591L, and 591R, which are vertically arranged around the operator's seat 50, and the roof 540, which is supported above the operator's seat 50 by the pillars 590L, 590R, 591L, and 591R. Although a frame 59 of the canopy is different in appearance (design) from the frame 59 of the cabin 54, they are structurally common, and thus, the description of the frame 59 of the cabin 54 in the above example embodiments can be interpreted as the description of the frame of the canopy. Thus, the description of the frame of the cabin 54 in the above-described example embodiment can be read as the description of the frame of the canopy.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a prime mover;
an operator's seat provided at a distance from the prime mover; and
a partition wall provided between the prime mover and the operator's seat; wherein
the partition wall includes:
  a pair of metal plates facing each other with a space therebetween and arranged in a direction from the prime mover toward the operator's seat;
  a sound-absorbing member provided between the pair of metal plates; and
  an elastic seal member sandwiched between the pair of metal plates such that the seal member surrounds the sound-absorbing member provided between the pair of metal plates, and
the sound-absorbing member is provided such that surfaces of the sound-absorbing member face surfaces of the pair of metal plates with a gap between the sound-absorbing member and at least one of the pair of metal plates.

2. The working machine according claim 1, wherein the seal member is provided along an outer peripheral portion of at least one of the pair of metal plates.

3. The working machine according to claim 1, wherein the sound-absorbing member includes a foamed resin.

4. A working machine comprising:
a prime mover;
an operator's seat provided at a distance from the prime mover; and
a partition wall provided between the prime mover and the operator's seat; wherein
the partition wall includes a pair of metal plates facing each other with a space therebetween and arranged in a direction from the prime mover toward the operator's seat,
the pair of metal plates include a first metal plate and a second metal plate, the first metal plate being located closer to the operator's seat than the second metal plate, the second metal plate being located closer to the prime mover than the first metal plate;
the partition wall includes:
  an inspection port to allow access from an area where the operator's seat is present to an area where the prime mover is present; and
  a closure body configured to close the inspection port;
the first metal plate includes a first opening included in the inspection port;
the second metal plate includes a second opening included in the inspection port; and
the closure body includes:
  a first closure plate made of metal to close the first opening such that the first closure plate is placed on a surface, facing the operator's seat, of a portion of the first metal plate that surrounds the first opening; and
  a second closure plate made of metal to close the second opening such that the second closure plate is placed on a surface, facing the operator's seat, of a portion of the second metal plate that surrounds the second opening.

5. The working machine according to claim 4, wherein the first opening has a shape to allow the second closure plate to pass therethrough in a direction from the operator's seat toward the second metal plate.

6. The working machine according to claim 4, wherein the first closure plate is screw-fastened to the first metal plate, and the second closure plate is screw-fastened to the second metal plate.

7. The working machine according to claim 4, wherein a seal member is provided at at least one of an overlap portion where the first closure plate and the first metal plate overlap each other or an overlap portion where the second closure plate and the second metal plate overlap each other.

8. The working machine according to claim 4, wherein the second metal plate has provided thereon a support to support thereon the second closure plate, the support projecting toward the first metal plate.

\* \* \* \* \*